(12) United States Patent
Mukhopadhyay et al.

(10) Patent No.: US 9,240,955 B1
(45) Date of Patent: Jan. 19, 2016

(54) SYSTEM AND ARCHITECTURE FOR ROBUST MANAGEMENT OF RESOURCES IN A WIDE-AREA NETWORK

(71) Applicants: Supratik Mukhopadhyay, Baton Rouge, LA (US); S. Sitharama Iyengar, Davie, FL (US)

(72) Inventors: Supratik Mukhopadhyay, Baton Rouge, LA (US); S. Sitharama Iyengar, Davie, FL (US)

(73) Assignee: Board of Supervisors of Louisiana State University and Agriculture and Mechanical College, Baton Rouge, LA (US)

( * ) Notice: Subject to any disclaimer, the term of this patent is extended or adjusted under 35 U.S.C. 154(b) by 208 days.

(21) Appl. No.: 13/938,936

(22) Filed: Jul. 10, 2013

Related U.S. Application Data

(63) Continuation of application No. 13/153,388, filed on Jun. 3, 2011.

(60) Provisional application No. 61/481,667, filed on May 2, 2011.

(51) Int. Cl.
*G06F 15/173* (2006.01)
*H04L 12/911* (2013.01)
*G06N 99/00* (2010.01)

(52) U.S. Cl.
CPC .............. *H04L 47/70* (2013.01); *G06N 99/005* (2013.01)

(58) Field of Classification Search
None
See application file for complete search history.

(56) References Cited

U.S. PATENT DOCUMENTS

| | | | | |
|---|---|---|---|---|
| 6,237,042 B1 * | 5/2001 | Kolb | ............................. | 709/251 |
| 7,774,363 B2 * | 8/2010 | Lim | ............................. | 707/781 |
| 2002/0147797 A1 * | 10/2002 | Paul | ............................. | 709/220 |
| 2007/0061487 A1 * | 3/2007 | Moore et al. | ................... | 709/246 |
| 2007/0174456 A1 * | 7/2007 | Yellepeddy | ................... | 709/225 |
| 2011/0249551 A1 * | 10/2011 | Rollins | ......................... | 370/222 |

* cited by examiner

*Primary Examiner* — Ryan Jakovac
(74) *Attorney, Agent, or Firm* — Raymond G. Areaux; J. Matthew Miller, III; Carver, Darden, Koretzky, Tessier, Finn, Blossman & Areaux, LLC

(57) ABSTRACT

A system and method of management of communication in a potentially unreliable wide-area network that contains one or more nodes connected to said network, each potentially having access to one or more inputs and/or outputs and capable of evaluating said inputs and directing said outputs, a global address space (GAS) accessible by said nodes, and a communication system using said GAS that provides communications between said nodes.

78 Claims, 18 Drawing Sheets

SYSTEM AND ARCHITECTURE FOR ROBUST MANAGEMENT OF RESOURCES IN A WIDE-AREA NETWORK

CROSS-REFERENCE TO RELATED APPLICATIONS

This application claims priority from U.S. Provisional Application No. 61/481,667 (Mukhopadhyay et al.), filed May 2, 2011, which is incorporated herein by reference as if set forth in full below.

This application is a continuation of and claims priority to U.S. Non-provisional application Ser. No. 13/153,388 (Mukhopadhyay et al.), filed Jun. 3, 2011, which is incorporated herein by reference as if set forth in full below.

BACKGROUND OF THE INVENTION

I. Field of the Invention

The present invention relates generally to computer networks, and relates more specifically to systems and methods for using network resources.

II. General Background

Computer networks can suffer from a variety of problems or limitations. In particular, certain computer network applications require that computers on a network be able to reliably access, process, evaluate and take action based on information acquired by other computers on said network even in cases where portions of the network become unreliable or inaccessible.

In view of the foregoing, there is a continuing need for a system and method of management of communication in an unreliable wide-area network that contains one or more resources, including any suitable input or source of information, an output that can include any suitable receiver of information or a data output device, a global address space (GAS), and a communication system for resources on the network.

SUMMARY OF THE INVENTION

In view of the aforementioned problems, it is an object of the present invention to allow computers on a network to reliably access, process, evaluate and take action based on information acquired by other computers on said network.

In an exemplary embodiment, the system includes one or more computers connected to a network. One or more of the computers connected to said network also contain instruments to measure the environment. In addition, one or more of the computers connected to said network also contain devices to take action on the environment.

In an exemplary embodiment, one or more of the computers connected to said network are specially programmed to contain (1) a moderating component which controls other processes of said computer; (2) an evaluating component which accesses available information and takes action based on internal logic; (3) a GAS which provides information to the evaluating component and coordinates the distribution of information through the GAS to other computers in the network; and (4) a communications component which passes information from the evaluating component to the GAS and provides the evaluating component access to information from the GAS.

The above and other objects and features of the present invention will become apparent from the drawings, the description given herein, and the appended claims.

In an exemplary embodiment, one or more of the following features may be found:

a plurality of networked nodes, each node comprising: a computer, a data store for providing access to a global address space, and a logic process a communication system for communication between said nodes said communication system transmits information between said nodes through said data stores each data store contains a local copy of all information available to said data stores said logic processes communicate via said communication system said data stores are key-value stores one or more inputs and one or more outputs, wherein each logic process has the capability (1) to read data acquired by an input communicably connected to said logic process; (2) to publish data to said communication system; (3) to retrieve and evaluate data from said communication system; and (4) to control one or more outputs communicably connected to said logic process said capability to evaluate data can be altered said alteration occurs as said logic process is reactivated.

said system has the capability to activate and deactivate said logic processes one or more of said logic processes can be deactivated and reactivated without information loss a change in information that occurs in one data store causes the same change in information to occur in all of said data stores said data stores are configured to form a pattern said change of information occurs in a sequence determined by said pattern said pattern is a ring said pattern is a multiring said sequence results in said change of information being communicated from one data store to only one other data store any two data stores can be transposed in said multiring a testing module that can perform a test of resource utilization of said nodes or said network or of both said nodes and said network, wherein said data store can prevent communication of said change to other data stores based on the results of said test said test comprises the steps of (1) recording the current time; (2) attempting transmission of one or more test packets to the next data store in said pattern; (3) measuring, for each test packet received by said next data store, the current resource utilization of said next data store; (4) recording, in each test packet, said current resource utilization; (5) repeating said measuring, attempting, and recording steps for each data store in said pattern; and (6) collecting all of said test packets that are received and retransmitted by all of said data stores said test packets are transmitted only around one subring of said multiring said test packets are transmitted to less than all of said data stores a learning module, wherein said learning module can learn from said tests said learning module can predict resource utilization said data store can prevent communication of said change to other data stores based on predictions made by said learning module said learning module learns using a machine learning algorithm said machine learning algorithm is suitable for a high-dimensional setting said machine learning algorithm is Vapnik's Support Vector Machine algorithm

BRIEF DESCRIPTION OF THE DRAWINGS

For a further understanding of the nature and objects of the present invention, reference should be had to the following description taken in conjunction with the accompanying drawings in which like parts are given like reference numerals and, wherein.

DETAILED DESCRIPTION OF THE INVENTION

Figure 1:
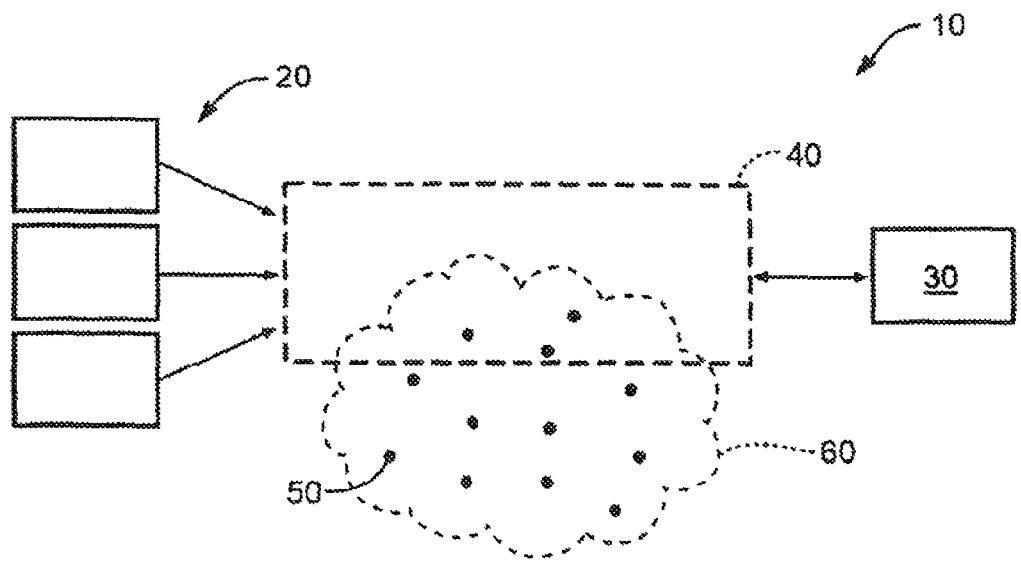
FIG. 1 is a block diagram of an embodiment of a shell for using network resources in connection with an output device.

This application incorporates by reference the specification of United States Patent Application Publication Number US 2009/0222921 (Mukhopadhyay et al.), filed Feb. 29, 2008.

As used herein, the terms "node" and "host" are used interchangeably to mean a general purpose computer particularly programmed to carry out the tasks as stated herein, wherein each general purpose computer is connected to a network and also includes a data storage device.

As used herein, the terms "instrument" and "input" are interchangeable and mean any device, now known or hereinafter invented, which is capable of acquiring information from the environment. The definition of "instrument" as well as "input" includes, but is not limited to, devices that measure pressure, heat, conductivity, one or more frequencies of electromagnetic radiation (including, without limitation, visible light and microwave radiation), moisture, the presence of elements or combinations of elements on the periodic table, and the presence of complex molecules or portions thereof (including proteins, viruses, DNA molecules). As such, this definition includes, but is not limited to, an accelerometer, an ammeter, an anemometer, a caliper, a calorimeter, a DNA sequencer, a dynamometer, an electrometer, an electroscope, an electrostatic analyzer, a gravimeter, an hygrometer, an inclinometer, an interferometer, a magnetograph, a magnetometer, a mass spectrometer, a micrometer, a microscope, an ohmmeter, an oscilloscope, a seismometer, a spectrogram, a spectrometer, a telescope, a thermocouple, and a voltmeter. This definition also includes combinations of instruments or inputs configured to provide more complex information. For example, this definition includes a device that determines whether a door is open or closed, and it also includes computer systems capable of face recognition.

As used herein, the terms "actuator" and "output" are interchangeable and mean anything that is capable of causing change in the environment. This definition includes, but is not limited to, solenoid valves powered by electricity or hydraulics, and may include a combination of actuators and other devices which, when used together, can effect change on the environment.

As used herein, the term "global address space" or "GAS" means one or more computers connected via a network and particularly programmed and configured to make a mutable set of data available to computers connected to the network. In certain embodiments, said computers may be configured to make a mutable set of data available make all of said data locally available to each computer that is part of the GAS. A distributed key-value store is one example of a GAS, but other technologies may be used. For example, relational databases configured with replication may be configured such that they provide a GAS. Also, multiprocessor systems such as high performance computing systems may be configured in a shared memory environment to provide a GAS.

As used herein, the term "API" means "application programming interface" and has its usual understood meaning to those skilled in the art.

The embodiments of the disclosure will be best understood by reference to the drawings, wherein like parts are designated by like numerals throughout. It will be readily understood that the components, as generally described and illustrated in the Figures herein, could be arranged and designed in a wide variety of different configurations. Thus, the following more detailed description of the embodiments of the system and method of the disclosure, as represented in FIGS. 1-17 is not intended to limit the scope of the disclosure, as claimed, but is merely representative of possible embodiments of the disclosure.

Much of the infrastructure that can be used with embodiments disclosed herein is already available, such as: general purpose computers; computer programming tools and techniques; computer networks and networking technologies; wireless communications; and digital storage media.

Suitable networks for configuration and/or use as described herein include one or more local area networks, wide area networks, metropolitan area networks, ham radio networks, and/or Internet Protocol networks such as the World Wide Web, a private Internet, a secure Internet, a value-added network, a virtual private network, an extranet, an intranet, or even standalone machines which communicate with other machines by physical transport of media. In particular, a suitable network may be formed from parts or entireties of two or more other networks, including networks using disparate hardware and network communication technologies. A network may incorporate wired or land line communication such as Ethernet over twisted pair, T-carrier, or other wired communications technologies. A network may also incorporate wireless communications technologies such as GPRS, EDGE, EV-DO, HSPA, HSDPA, and technologies based on the IEEE 802.11 set of standards.

The network may include communications or networking software such as software available from Novell, Microsoft, Artisoft, and other vendors, and may operate using TCP/IP, SPX, IPX, and other protocols over twisted pair, coaxial, or optical fiber cables, telephone lines, satellites, microwave relays, modulated AC power lines, physical media transfer, and/or other data transmission "wires" known to those of skill in the art. The network may encompass smaller networks and/or be connectable to other networks through a gateway or similar mechanism.

Suitable networks can include a server and several clients; other suitable networks may contain other combinations of servers, clients, and/or peer-to-peer nodes, and a given computer may function both as a client and as a server. Each network can include one or more computers, such as the server and/or clients. A computer may be a workstation, laptop computer, disconnectable mobile computer, server, mainframe, cluster, so-called "network computer" or "thin client", mobile telephone, personal digital assistant or other handheld computing device, "smart" consumer electronics device or appliance, or a combination thereof.

Suitable networks can also include one or more physical sensors and/or physical actuators that either communicate with nodes of a network or are themselves nodes of the network. For example, a network can include a wireless sensor network of physical sensors. Physical sensors can include one or more motion sensors, heat sensors, chemical sensors, moisture sensors, photo detectors, or any other suitable data-gathering device configured to sense a physical quantity. The physical sensors can deliver information regarding a physical quantity to the network in any suitable manner, such as by electrical or light signals. Physical actuators can be configured to receive instructions from the network and to produce a physical action as a result. For example, the physical actuators can include one or more motors, triggers, solenoids, or other suitable devices.

Each computer of a network may include a processor such as a microprocessor, microcontroller, logic circuitry or the like. The processor may include a special purpose processing device such as an ASIC, PAL, PLA, PLD, Field Programmable Gate Array, or other customized programmable device. The computer may also include a memory such as non-volatile memory, static RAM, dynamic RAM, ROM, CD-ROM, disk, tape, magnetic, optical, flash memory, or other computer storage medium (which memory can store computer software). It is understood that the computer may run software that is stored in such a computer readable medium. The computer may also include various input devices and/or output devices. The input device(s) may include a keyboard, mouse, touch screen, light pen, tablet, microphone, sensor, or other hardware with accompanying firmware and/or software. The output device(s) may include a keyboard, mouse, touch screen, light pen, tablet, microphone, sensor, or other hardware with accompanying firmware and/or software.

Aspects of certain of the embodiments described are illustrated as software modules or components. As used herein, a software module or component may include any type of computer instruction or computer executable code located within a memory device and/or transmitted as electronic signals over a system bus or wired or wireless network. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

The software modules tangibly embody a program, functions, and/or instructions that are executable by computer(s) to perform tasks as described herein. Suitable software, as applicable, may be readily provided by those of skill in the pertinent art(s) using the teachings presented herein and programming languages and tools including, but not limited to, XML, Java, Python, PHP, Pascal, C++, C, database languages, APIs, SDKs, assembly, firmware, microcode, and/or other languages and tools. Suitable signal formats may be embodied in analog or digital form, with or without error detection and/or correction bits, packet headers, network addresses in a specific format, and/or other supporting data readily provided by those of skill in the pertinent art(s).

Networks can suffer from a variety of problems or limitations. In particular, collaboration and coordination among various components of a given network can pose a variety of challenges, particularly for heterogeneous networks. For example, some networks include disparate sensing, computing, and/or actuating devices that interface via wired and/or wireless connections and/or that run on different platforms (for example, but not limited to, on different operating systems). Such networks are widely used in healthcare, military, automobile, building security, and space industries, among other, which often depend upon reliable delivery of service from elements of the network and upon secure and trustworthy exchange of information among network elements. Reliability and security are often complicated by such matters as timing requirements, security requirements, and/or fault tolerances of service and/or devices.

A variety of complications can arise in such networks. For example, clients or services can migrate from one physical location to another, which can complicate failure semantics. Clients or services may operate in limited resource environments (for example, but not limited to, on PDA's, cellular phones, Arduino systems, or other embedded systems) having bandwidth limitations and/or shortage of space or other resource limitations. In some instances, clients or services may communicate different types of data (e.g., voice information, multimedia information, etc.) through communication channels that are unreliable, are susceptible to eavesdropping, and/or conform to differing standards (e.g., 802.11, Zigbee, Land Mobile Radio (LMR), etc.). The exchange of information in some networks can involve passing messages that include semi-structured data, the integrity of which may be compromised due to the presence of possible faults or breaches in the network. Indeed, the diverse platforms, computing elements, and/or sensing elements of some networks may provide heterogeneous, semi-structured data having untraced or uncertified pedigrees, and individual nodes or even entire subnetworks of a given network may fail or be compromised.

Various embodiments described herein address some or all of the foregoing issues, as well as others that may or may not be discussed below. For example, in some embodiments, a coordination layer is provided that permits reliable communication between resources and output devices in a heterogeneous network. The coordination layer can promote the conformance of services and information exchanged over the network to the goals of a user and/or can promote observance of the performance desires that a user wishes for a system to exhibit. For example, in some embodiments, the coordination layer provides formal guarantees that user-defined system objectives and quality of service requirements are met. In some embodiments, the coordination layer can respond to diverse local policies governing computation and communication in individual computing elements and local networks, as well as changes to a network (such as failures or compromises of individual nodes of subnetworks). In some embodiments, the coordination layer can dynamically adapt to changes in the network, such as failures or security breaches of individual services or devices, and can automatically provide for the successful achievement of the goals or objectives of the network (which in some instances, are user-defined). Other features and advantages of various embodiments are described below and will be apparent to those of skill in the art from the disclosure herein.

In one embodiment, a distributed hash table (DHT) is used as the GAS, and the GAS uses a synchronization algorithm to coordinate the distribution of information across multiple devices. The DHT may also be thought of as a data store which provides GAS access. Instances of the DHT are configured to communicate with only two other instances. In these embodiments, the instances of the DHT self-arrange into a ring (one example of a pattern), whereby information is passed in one direction from instance to instance until all instances receive the communicated information. This behavior is part of generic DHT algorithms. It has been observed that this embodiment, inherent of generic DHT algorithms, cannot detect when either the nodes on the network or the network itself becomes congested or over utilized. In addition, we speculate that a generic DHT configured in a circular message passing (single ring) configuration does not perform well when configured in a network of more than 80 instances.

In one embodiment, the DHT may be the distributed transactional key-value store known as Scalaris. In this embodiment, the synchronization algorithm used is a non-blocking implementation of Lamport's Paxos algorithm.

In another embodiment, a generic DHT has been modified by us to test network and node congestion before passing information to another node. This improvement over known DHT implementations improves resource efficiency and allows for greater scalability. The quality control test comprises the steps of sending approximately 10 to 15 test packets along the ring of instances. However, more or less test packets may be used. As each instance of the DHT receives the test packet, said instance measures its recent resource use. This may occur, for example, by requesting the operating system to report a Unix-style load calculation known as a load average. Each instance records its resource use measurement in the test packet, which is then communicated to the next instance. As each test packet returns to the tester, the testing instance of the DHT (1) measures the time to traverse the network; (2) determines how many of the test packets return; and (3) calculates overall CPU resource utilization based on the measured CPU resource usage reported in each test packet. Based on this information, the testing instance of the DHT determines whether it is appropriate to send the information at the present time or whether it should wait for resources to become free before sending. However, it has been observed that, for certain configurations, current overall resource use does not accurately predict future overall resource use. In other words, a goal of measuring overall resource use is to attempt to use resources when resource use is low. In certain configurations, overall resource use may vary rapidly, for example, from relatively high usage at time 1, to relatively low usage at time 2, and then back to relatively high usage at time 3. In such a situation, a measurement of overall resource use at time 2 would suggest that current use is low. If the instance of the DHT then sends information at time 2, this message compounds the high network use at time 3.

Accordingly, another embodiment has been modified by us to use Vapnik's Support Vector Machine (SVM) algorithm with feedback to predict, based on observed patterns of overall resource usage, whether the instance of the DHT should use overall resource resources by communicating a message to another instance of the DHT. This improvement over known DHT implementations improves resource efficiency and allows for greater scalability. In this embodiment, before the DHT begins operations, the learning algorithm is primed with random data. As the DHT runs, each time an instance of the DHT tests the network, the then current resource utilization status is recorded and the learning algorithm is asked to determine whether resource use will be high or low based on the current and previously recorded states. The learning algorithm is given feedback in the form of subsequent observations of resource utilization, which is used by the learning algorithm to make more accurate predictions. Although Vapnik's SVM algorithm is used in this embodiment, it is understood that a wide variety of machine learning algorithms may be used such as, for example Bayesian classifiers, hidden Markov models, and neural networks. Also, machine learning algorithms enabled by Waikato Environment for Knowledge Analysis (WEKA) may be used.

Because we speculate that certain configurations of DHTs do not perform well when configured in a network of more than 80 instances, another embodiment of the invention overcomes this limitation of DHTs by self-arranging into multiple connected communications rings. This improvement over known DHT implementations improves resource efficiency and allows for greater scalability.

In another embodiment, the GAS is a DHT (again, which may be thought of as a data store) which allows for retrieval of information based on key ranges or intervals. In addition, the DHT may be Scalaris as modified to allow for retrieval of information based on key ranges or intervals.

In certain embodiments, the system clocks of hosts are synchronized. Although it is understood that any number of time synchronization protocols such as the Network Time Protocol (NTP) may be used, in a preferred embodiment, a decentralized network time (DNT) algorithm is used. DNT algorithms are preferred because we perceive NTP to require centralized resources, whereas DNT algorithms do not. Accordingly, use of DNT algorithms enhances the availability and reliability of the group communication system. In certain embodiments, hosts collectively select one host to set the current time for all hosts. In certain embodiments, the host chosen by the group of hosts to set the time is the host with the earliest time. In certain embodiments, hosts communicate time through the GAS. In addition, the DNT algorithm may be Mattern's GVT algorithm, GVT algorithms based on Mattern's GVT algorithm, or other GVT algorithms such as the TQ-GVT algorithm described by Chen et al.

An embodiment of the invention includes a framework for conducting asynchronous communications. Processes may use this framework to communicate with other processes via the GAS, which may provide access to a tuple space similar to that of the Linda coordination language developed at Yale University by David Gelernter and Nicholas Carriero. In one embodiment, the GAS may provide access to the tuple space via a DHT. This framework allows processes to form, join, and leave groups, keeping track of group membership and consistency data in the tuple space. This framework also allows for processes to publish information to, or read information from, the tuple space. The framework also allows for information to be sequentially ordered and time stamped. Accordingly, information transmitted by the framework into the tuple space may include associated sequential order information and may include an associated time stamp provided by a DNT or other time synchronization algorithm. Processes may also remove information that is no longer needed by the framework in a process of garbage collection. The communications framework provides asynchronous communication capability, allowing components of the system to continue operation when communications become unreliable or certain components become unreachable over the network. As described more completely herein, the communications framework, in conjunction with other improved components of the system, allows for dynamic reconfiguration of components of the system.

The group communications framework (also a group communications system or an integrated communication framework) as described herein, together with the GAS, act together as middleware. There are a number of projects taking various approaches to implementing this type of middleware. Each of these projects or approaches have a number of characteristics, such as consistency, availability, tolerance to network partitions, tolerance to nodes continuously leaving and joining the system, reconfigurability, and timely response. These characteristics are described as follows:

Partition Tolerance

A communication system is tolerant to network partitions if there is a network failure that splits the processing nodes into, for example, two groups that cannot talk to each other, but both subgroups continue to operate and process data independently until the partition is removed. In other words, a partition tolerant system continues to operate despite arbitrary message loss, which may partition the system into two or more groups. In our opinion partition tolerance is a good property for all communication systems.

A partition happens when there is a network failure that results in a communication gap between two nodes or groups of nodes in a system. A communication system is said to be tolerant to network partitions if, whenever there is any split in the communicating nodes due to network failure which creates subgroups of nodes, then the nodes in each subgroup continue to process information.

In a communication system, there will generally be three types of communication: node to node, node to a group of nodes, and between groups of nodes. So, for example, when there is a failure in the network which may cause interruption in communication between two groups of nodes, the individual groups (noting that a group may contain one or more nodes) will continue to operate independently in a partition tolerant system. Therefore, a system tolerant to network partitions may experience arbitrary message loss but continue to operate.

Churn Tolerance

When a node joins a group communication system, the system will generally have to reconfigure itself in order to incorporate the node into the system. This process may require system resources, and the reconfiguration may cause delays in communication among nodes already part of the system. Systems (and in particular, systems with many nodes) may have some nodes leave and other nodes join the system with high frequency. The ability to handle these changes efficiently is known as churn tolerance. We believe that churn tolerance is an important characteristic for all systems, but is less important for fixed networks.

Reconfigurability

A group communication system is said to be reconfigurable if its behavior can be dynamically modified. For the purposes of this property, this includes modification to a processing component of the system, such as a portion of a computer containing a software object compiled into executable bytecode. A component can be modified while running or can be removed from the system, modified, and continue processing without missing any messages. It is our opinion that reconfigurability is a good property for all communication systems, but is very desirable in systems used for exploratory, military, or expeditionary purposes or in other situations where there is an unknown or uncertain environment.

Timely Response

A group communication system should respond to messages in a timely fashion. Although the term "timely" may have a number of definitions in the art, we use the term timely to mean "faster than a human can calculate," and, more particularly, we use the term timely to mean that events detected by inputs or instruments can be evaluated and, where appropriate, acted upon (for example, by actuators), almost instantly. This may be accomplished, for example, where information is received, evaluated, and acted upon within, for example, less than 100 milliseconds. We believe that timely response is significantly important for all systems.

Because of how certain embodiments of this invention may be implemented (in particular, because of network disconnections and congestion), all components of the system may not always act timely. This is because where an input is received by a first node and the first node sends a message to a second node across a network, but a network disconnection causes said message to temporarily not reach said second node, then said second node cannot react to said input received by said first node "timely." However, said second node will still react timely to said input when the network disconnection or congestion is resolved, the partition event is over, and said second node receives the message.

Relational Operations

Relational operations are database tables which have data ordered and organized on the basis of different common characteristics in the form of tables. For example, data may be organized in third normal form. We believe that relational operations are essential to, for example, enterprise management systems, banking systems, employee record systems, enterprise resource planning (ERP) systems, and customer relationship management (CRM) systems.

Consistency

A communication system containing the nodes in a distributed computing environment is said to be consistent when each node in the system is consistent. Briefly, nodes are consistent where they contain the same information. A communication system may be consistent where it promises to have the familiar all-or-nothing semantics (i.e., a message must be received by all recipients before any can accept and process the message). Many systems achieve consistency via this all-or-nothing approach. In addition, some systems may also require that all messages be received and processed in order (i.e., no message reordering). The nodes in the system are said to be consistent if all nodes in the system have available the identical set of information. This may be achieved where:

all nodes in the system receive and accept the message in the same order; or either all nodes in the group will receive the message or none of them will receive the message.

In addition, when a node leaves or joins a communication system that is consistent, every node which is already a member of the system is notified of the update.

Availability

A communication system is said to be highly available when the system continues to operate even though there may be one or more failures in the system (such as, for example, failures of individual sensors, individual nodes, or network communications links). In a highly available system, node failure should not prevent other nodes from continuing to operate. If there is a failure in the node, then the system should have some type of contingency planning, such as switching to another node, to keep the overall system running.

In other words, we believe that a highly available group communication system should not have centralized components with a single point of failure. This is because where a group communication system has centralized components, the failure of any such centralized component can cause the entire system to shut down. Accordingly, we believe that highly available systems should be decentralized rather than centralized.

Brewer's CAP Theorem

According to the Brewer's CAP theorem, it is not possible for a distributed system to achieve the properties of consistency, availability, and tolerance to network partitions. Although some approaches attempt to approach achieving all three properties by relaxing the restraints required by one of the properties, it is our understanding that achieving such a relaxed set of goals is especially difficult in an asynchronous environment.

Although embodiments of the invention disclosed herein do not contradict Brewer's CAP theorem, the properties of consistency, availability, and tolerance to network partitions are achieved together by relaxing one of the three objectives. The approach taken by the invention disclosed herein relaxes one of the objectives: consistency. This is because, in our view, the other two objectives cannot be compromised by the distributed system in an asynchronous environment. Therefore, embodiments of the disclosed invention achieve all three properties by relaxing the consistency objective and replacing it with "eventual consistency."

"Eventual consistency" means that over a long time period where no updates are sent all updates will eventually propagate to all nodes and all the nodes will be consistent. In other words, all information eventually reaches all nodes, but there may be a delay. The time period for that delay will depend on available resources, the demand on those resources, and the duration of any network outages.

Existing Group Communication Systems

Group communication systems provide the communication medium between the nodes (users) in a network. They may be implemented over synchronous or asynchronous networks. We note the term asynchronous may have many meanings when used in connection with computer networks. As used herein to describe improvements of the invention disclosed herein, asynchronous means that transmission of a message is decoupled from receipt of said message. For example, in a synchronous network, the sender of a message transmits a message to a receiver only when the receiver is connected to the network and is currently ready to receive it (that is, the sender waits for the receiver to be ready). In an asynchronous network, the sender sends the message to the receiver without regard for whether the receiver is connected to the network or is ready to receive the message. A group communication system provides a communication layer between the sender and receiver, and ensures the messages are delivered accordingly with the desired properties (for example, synchronous or asynchronous semantics, message ordering, or other properties). There are some prominent group communication tools such as:

ISIS (Birman et al.)

Spread (Amir et al.)

JGroups (Commercial implementation in Java underlying the JBoss middleware)

Based on our review of ISIS, Spread, and JGroups, we believe that these provide group communication in a synchronous environment. They are built on the top of TCP/IP or UDP protocols. The key features they provide are virtual synchrony and consistency. Virtual synchrony is a property that allows nodes in a group communication system to form process groups for the purpose of organizing the transmittal of messages. Every node in a process group receives each message sent to the process group to which it belongs. Additionally, each message sent to a process group is received by each node in said process group in the same order in which said messages are sent. Group communications which implement virtual synchrony achieve the properties of data replication, fault tolerance, event notification and caching. Consistency as provided in these systems has the same meaning as described herein. That is, all the nodes in a network are consistent such that, when any node alters data in one node, the updated information is clearly visible to the other nodes in the network. It is our understanding that in these systems, each of the nodes will see the messages in the same order and that either all nodes receive a message or none of the nodes receive a message. Furthermore, if nodes are in a group, then if one node receives a message then each node in that group will receive that message; and, if any one node in a process group cannot receive a message, then no other node in the process group will receive the message. Thus, as we understand ISIS, Spread, and JGroups, they implement "all or nothing" semantics.

ISIS

The ISIS group communication tool is developed at Cornell University. It is our understanding that this tool implements a group communication system using the virtual synchrony approach. We understand that there are four different process groups implemented in ISIS, and each process group differs in how it implements group interactions. The four groups are: peer groups, client groups, diffusion groups and hierarchical groups.

Peer groups are comprised of processes which contain replicated data, which is given as input to algorithms processing concurrent data.

Client groups contain nodes which attempt to communicate with any process group with a group name and proper authorization. The process group makes that node a client to the group by registering it with the group. Nodes registered with a group may communicate with that group.

Diffusion groups are groups of nodes depicting the client server architecture. Client nodes interact with server nodes by giving input and getting desired output from the server nodes.

Hierarchical groups contain one or more process groups. There will be one base group root which can have other groups, called sub groups, under it.

ISIS nodes may or may not aware of one another. ISIS implements message delivery ordering rather than implementing the causal relationship between messages. As mentioned earlier, multiple modules are allowed to form a group under a group name and any message transmitted to the group will be received by all the nodes in that group.

Spread Group Communication Toolkit

The Spread wide area group communication system (Amir et al.) is developed at Johns Hopkins University. Spread comprises two low level protocols: ring and hop. The ring protocol is implemented on local area networks. The hop protocol is implemented on wide area networks. Furthermore, Spread implements a daemon-client architecture. In this architecture, group membership updates are done with minimal effort. When any node joins or leaves a group, this fact is communicated to others in the network via a single message. However, when there is network partition between nodes of a local area network, the membership update message causes a fully-fledged change in that node's group membership. We understand that Spread implements an "extended" form of virtual synchrony. This means that messages are transmitted even though messages may be lost using a variant of the alternating best protocol. Data is transmitted to the network via a necessary minimal set of components. Users have control over the Spread group communication system such that a message may be sent with priority over other messages transmitted in the network. Another prominent feature of this group communication system is that any node which is not a member of the group can transmit the message to the whole group.

JGroups

JGroups is a commercial implementation of a group communication system written in Java and is an underlying part of the JBoss middleware. JGroups is a group communication system which implements so called reliable multicast communication. In JGroups, groups containing nodes can be created and deleted. The nodes are spread across local area networks and wide area networks. When each node joins or leaves the group, all other nodes in a group are notified. Messages may be one of two types: node to node and node to group. JGroups can implement different protocols like User Datagram Protocol (UDP), Transmission Control Protocol (TCP) and Java Message Service (JMS). Large messages are subjected to fragmentation and are encrypted when required. If there is any message loss, then the message is retransmitted. Another important feature of JGroups is failure detection, which removes disconnected nodes from any groups to which they belong.

Problems with Existing Group Communication Systems

Group communication systems may have a large number of nodes and may have nodes which are connected by either local area networks (LAN), wide area networks (WAN), or other suitable networks as described herein. Group communication systems comprised of a large number of nodes connected via a network that may experience outages or congestion are inherently asynchronous and are therefore more suited for asynchronous communication systems. Accordingly, we have identified the following list of problems with existing group communications systems when used in such environments:

The existing group communication systems which are discussed above appear to us to be synchronous.

Existing group communications systems which are synchronous are not suitable for asynchronous environments.

The existing group communication systems which are discussed above appear to be centralized, having a single point of failure (i.e., failure of one node can cause failure of the whole system).

The existing group communication systems which are discussed above appear to us to have components which are not completely aware of all other components in the system. For example, in ISIS the nodes in the system may or may not know about the existence of other nodes in the system.

In the existing group communication systems discussed above, whenever a component gets disconnected, the messages directed to it may be lost during the disconnection. For example, as we understand the Spread, the Spread group communication system experiences the loss of messages due to component failure and other various reasons.

In the existing group communication systems discussed above, these systems have only two of the three properties discussed by Brewer's CAP theorem.

In addition to ISIS, Spread, and JGroups, which are described immediately above, there are a number of other projects and approaches to this type of middleware. These include Data Distribution Service (used by, for example, United States Navy state-of-practice); Reliable Multicast (used by, for example, Isis, SPREAD, and Astrolabe); BigTable (used by, for example, Google); Cassandra (used by, for example, Facebook); CouchDB (provided by, for example, the Apache Project); Distributed Hash Tables (in the form used by, for example, Kademlia, Chord, and Pastry); Dynamo (used and provided by, for example, Amazon); Gizzard (used by, for example, Twitter), and JGroups (used by, for example, Jboss). A summary of these middleware options and our view of their features is included below.

TABLE A-1

| Approach | Consistency | Availability | Partition Tolerance | Churn Tolerance | Reconfig-urability | Timely response |
| --- | --- | --- | --- | --- | --- | --- |
| Data Distribution Service | No | No | No | No | No | Yes |
| Reliable Multicast | Not available | No | Yes | No | Not available | Yes |
| BigTable | No | Yes | Yes | No | No | No |
| Cassandra | No | Yes | No | No | Yes | No |
| CouchDB | Yes | No | No | No | Yes | No |
| Distributed Hash Table | No | No | No | No | Yes | Yes |
| Dynamo | No | Yes | Yes | No | Yes | No |
| Gizzard | No | Yes | Yes | Yes | No | Yes |

The discussions herein commenting upon other projects and the characteristics thereof contain our opinion and are based on our own review of these projects.

Our improvement over existing middleware approaches is that portions of the invention as described herein have all the desired properties—consistency, availability, tolerance to network partitions, churn tolerance, reconfigurability, and timely response. In particular, when a group communication framework is implemented to utilize a GAS, the combination thereof has all of these properties and is an improvement over these currently-used approaches.

DETAILED DESCRIPTION OF THE DRAWINGS

As depicted in the figures, lines connecting components may designate a direction. These directional signals are provided to assist in the understanding of the invention, and are nonlimiting.

With reference to FIG. 1, in certain embodiments, a first system 10 includes one or more resource 20 and an output 30. The resources 20 can include any suitable input or source of information. For example, the resources 20 can include one or more services (whether stateless and/or stateful) or devices, such as online applications, software applications, computing elements, control stations, personal computers, personal electronic devices (such as personal digital assistants, smart phones, etc.), and/or input devices, such as, for example, keyboards, mouse devices, and/or physical sensors or other hardware devices configured to sense and, in some instances, to communicate one or more measurements and/or aspects of a physical property or physical action. The output 30 can include any suitable receiver of information or data output device. For example, the output 30 can include a client, an online application, software application, computing element, control station, personal computer, personal electronic device, display, and/or physical actuator. In some embodiments, the first system 10 includes multiple outputs 30.

The first system 10 further includes a layer, system, or control shell 40. In certain embodiments, the shell 40 allows for the satisfaction of policies, objectives and/or quality of service goals, each of which may be user-defined, of the system 10. For example, in some embodiments, the shell 40 is capable of automatically determining the availability of one or more of the resources 20, selecting among the resources 20 to obtain the most reliable, cogent, or timely information for delivery to the output 30, and delivering the information thus obtained to the output 30 in a suitable format. In some embodiments, principles of artificial intelligence and programming languages are used to construct the shell 40, as further described below.

In some embodiments, the shell 40 is distributed among one or more nodes 50 that are arranged in a network 60. For example, in the illustrated embodiment, the shell 40 is distributed among three nodes 50. Each node 50 can comprise a storage device capable of storing information in a tangible medium. In some embodiments, one or more nodes 50 comprise one or more resources 20 and/or one or more outputs 30.

Figure 2:
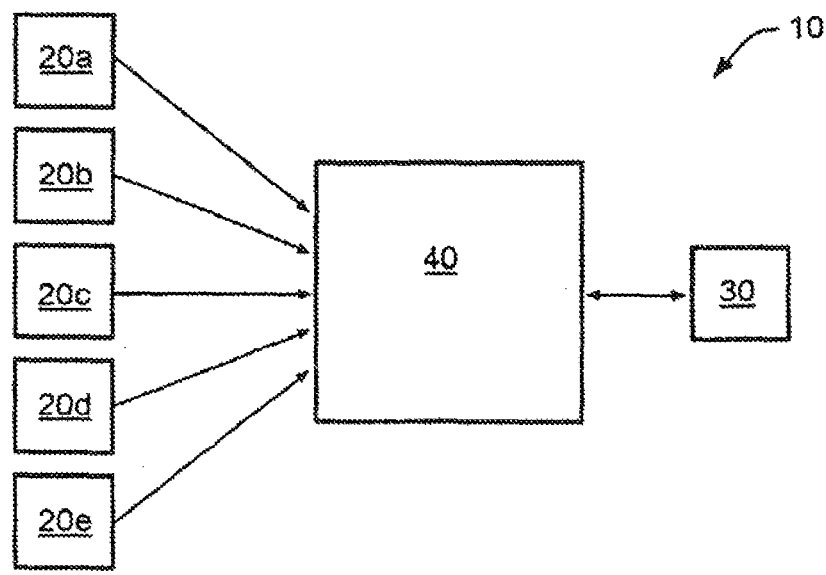
FIG. 2 is a block diagram of another embodiment of a shell for using network resources in connection with an output device.

As a non-limiting example, in the embodiment depicted in FIG. 2, the first system 10 can comprise a sprinkling system. The resources 20a-e of the sprinkling system can provide various forms of information regarding the landscaped property at which the sprinkling system is installed. For example, first resource 20a can comprise a first clock, second resource 20b can comprise a second clock, third resource 20c can comprise a moisture sensor in the soil of the property, fourth resource 20d can comprise a thermometer measuring the air temperature at the property, and fifth resource 20e can comprise an online weather forecast application. The output 30 can comprise an actuator configured to activate or deactivate the sprinkling system. Each of the first resource 20a, second resource 20b, third resource 20c, fourth resource 20d, fifth resource 20e, and the output 30 are in communication with the shell 40.

The shell 40 can include rules for instructing the output 30 to activate or deactivate the sprinkling system based on information received from one or more of: first resource 20a, second resource 20b, third resource 20c, fourth resource 20d, or fifth resource 20e. For example, the shell 40 can include a rule set for determining whether to activate the sprinkling system, such as the following:

1. Activate at 6:00 a.m. unless:
   a. moisture content of soil is above a threshold value;
   b. air temperature is below a threshold value; or
   c. heavy precipitation is predicted for the day;
2. Activate if moisture content of soil is below a threshold value;
3. Activate if air temperature has been above a threshold value for 12 hours; or
4. Activate if sprinkling system has been off for 12 hours and predicted peak temperature for the day is above threshold value and no precipitation is predicted for the day.

The shell 40 can gather information from first resource 20a, second resource 20b, third resource 20c, fourth resource 20d, and fifth resource 20e; and, based on the rule set, provide appropriate instructions to the output 30. Additionally, the shell 40 can monitor the availability and/or operational status of first resource 20a, second resource 20b, third resource 20c, fourth resource 20d, and fifth resource 20e and adapt the decision-making process in response to any changes that may occur to the system 10.

For example, the shell 40 can be configured to apply only the first rule of the rule set if one or more of the clocks (first resource 20*a* and second resource 20*b*) are available. If the shell 40 senses that the clock (first resource 20*a*) is unavailable or inaccurate, such as may result from a brief power outage or other resetting event, the shell 40 can instead use second resource 20*b* (also a clock). Additionally, the shell 40 can be configured to disregard the first rule and apply one or more of the second, third, and fourth rules if both first resource 20*a* and second resource 20*b* are unavailable or inaccurate.

In some embodiments, the shell 40 employs decentralized, context-aware programming models (further described below) that model workflows for processing of information regarding the current configuration (e.g., the state, status, or availability of one or more of the resources 20) of the first system 10 and for discovering and composing services in order to adapt to future configurations of the system 10. The workflows can comprise business process models that consist of partially ordered sequences of cooperating and coordinated tasks executed to meet the objectives of the first system 10 and/or the output 30.

Figure 3A:
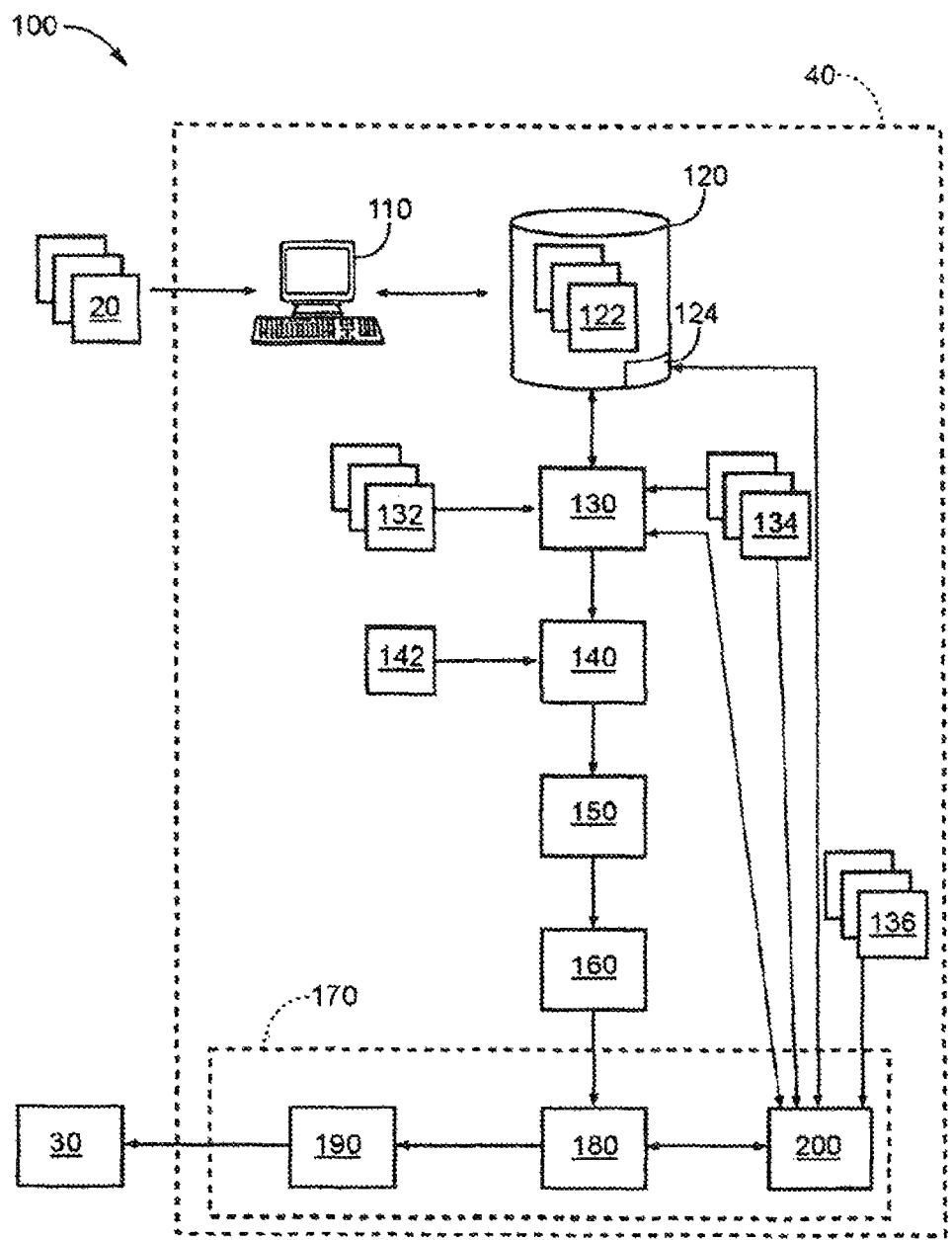
FIG. 3A is a block diagram of another embodiment of a shell for using network resources in connection with output devices, and depicts components of the shell.

With reference to FIG. 3A, in certain embodiments, a second system 100 such as the first system 10 comprises one or more resources 20 and an output 30 in communication with a shell 40. In other embodiments, the second system 100 can include multiple outputs 30. Components of the shell 40 can be distributed among one or more nodes of a network 60 (see FIG. 1) in any suitable manner. The shell 40 can include one or more gateways or control points 110 configured to communicate with the resources 20. Any suitable communication interface can be employed between the resources 20 and the control point 110, such as wired or wireless connections. The control point 110 can include any suitable device or system, and in some embodiments, comprises a computer.

In some embodiments, the control point 110 is in communication with a directory 120, and can be used to provide information to the directory 120. For example, information regarding the resources 20 can be provided to the directory 120 via the control point 110. The information for a particular resource 20 can include instructions for accessing the resource 20, a description of data available from the resource 20 (e.g., data that can be input to the shell 40 from the resource 20), instructions for providing data to the resource 20 (e.g., data that can be output from the shell 40 to the resource 20), instructions for processing data received from the resource 20, temporal behaviors of the resource 20 (e.g., real-time constraints, or actions performed over time, such as, for example, sending a message, operating a hardware device, etc.), and/or pre-call and post-call conditions of the resource 20. In some embodiments, the directory 120 thus can provide for communication with one or more resources 20 that comprise stateless and/or stateful services. In some embodiments, the directory 120 is an example of means for storing information regarding resources that are available to the system 100.

In some arrangements, the information can be entered into the directory 120 via the control point 110, such as via a computer keyboard. The control point 110 can include a graphical user interface, which in some arrangements includes icons and/or forms for facilitating entry of the information by a user. In some configurations, information regarding the resources 20 can be entered in the directory 120 automatically as the resources 20 are placed in communication with the control point 110. Similarly, in some arrangements, changes to the resources 20 can be automatically registered in the directory 120.

For example, the control point 110 can include a universal plug and play (UPnP) database comprising specifications or other information regarding resources 20 capable of connection with the control point 110. In some embodiments, the control point 110 automatically populates the directory 120 with the specification of and/or with other information regarding a resource 20 as the resource 20 is connected with the control point 110.

The UPnP database can be updated with changes to the resources 20, such as changes to the specifications or other information regarding the resources 20. For example, in some arrangements, a manufacturer of or service provider for a particular resource 20 can communicate with the control point 110 to update UPnP database, such as with a firmware upgrade for a device or sensor or a change in the input/output parameters of an online application.

In some embodiments, specifications of the resources 20 are stored in the directory 120 in a scripting language (e.g., in one or more scripts). The scripting language can be capable of describing various information regarding the resources 20, such as communication parameters, call/return parameters, real-time and/or space constraints, and/or descriptions regarding complex dynamic behavior of the resources 20, as discussed above, and in further embodiments, can specify the goals and constraints of the system 100, as discussed below. The scripting language can express temporal evolution, spatial relationships, communication parameters, departure from and joining of domains protected by firewalls, and/or network topologies. The scripting language can provide sufficient expressiveness to describe models of complex physical devices (e.g., physical sensors) and services (e.g., online applications) in a heterogeneous network.

The control point 110 can include a compiler for converting information into the scripting language for delivery to the directory 120. For example, the control point 110 can include a UPnP database and, upon detection of a resource 20 for which the specification is contained in the database, can deliver the specification to the compiler for conversion to the scripting language. The control point 110 can then pass the scripting language version of the specification to the directory 120, which can store the specification. Similarly, updates made to the UPnP database can be compiled into scripting language and delivered to the directory 120 such that the update is included in the directory 120. Such updating can be automatic.

In some instances, a user may be versed in the scripting language, and can enter information in the scripting language into the directory 120 without using the compiler of the control point 110. In other instances, the user can use the graphical user interface to enter information in a format more familiar to the user, which information is then converted to the scripting language.

As discussed below, in some embodiments, the scripting language delivered to the directory 120 forms one or more statements. A set of such statements can constitute a scripting language record 122, which may include one or more fields capable of being updated. For example, the UPnP specification of a resource 20 stored in the directory 120 can comprise a scripting language record 122 of that resource 20, and in some instances, the records 122 can be updated via the control point 110 in a manner such as discussed above.

In some embodiments, the directory 120 stores records 122 that detail which resources 20 are interchangeable or provide similar or substantially equivalent functionalities. For example, the records 122 can include information indicating that two or more resources 20 are logically equivalent. This information can be used for fault tolerance purposes. For example, if one service 20 becomes inaccessible (e.g., fails or is disconnected from the system 100), another service 20 may be used instead.

In some embodiments, the directory 120 contains one or more records 122 containing information regarding the topology of the system 100. The record or records 122 can be updated whenever the network topology changes. For example, if a node of a network were to fail or be compromised, the topology record or records 122 would be updated to reflect this change.

In some embodiments, the directory 120 stores records 122 for connecting the second system 100 with additional resources 20. For example, the records 122 can contain instructions for the control point 110 to connect with a supplemental resource 20 if one or more of the resources 20 fail. By way of illustration, the failed resources 20 can comprise, for example, online applications that provide information on a given topic without charge, and the supplemental resource 20 can comprise an online application that provides the same information, but which charges for the connection time during which the information is accessed. In such a scenario, the second system 100 may have as a goal to operate as inexpensively as possible such that the supplemental resource 20 is made available (e.g., a connection therewith is established) only when the free sources of information are unavailable.

The directory 120 can include an interface 124 through which it can communicate with one or more other components of the shell 40. For example, the directory 120 can communicate updates made to the records 122 and/or can receive instructions and/or updates via the interface 124, as further discussed below. As another example, the shell 40 can query the directory 120 through the interface 124. In some embodiments, the directory 120 can be replicated or backed up, such as for purposes of fault tolerance. Any suitable technique may be used for replication or backup, including those known in the art and those yet to be devised.

The shell 40 can include a model generator 130 configured to communicate with the directory 120. The model generator 130 can access or communicate with one or more generator records 132 or monitor records 134, which can be in the scripting language. The generator records 132 or monitor records 134 can be stored in any suitable manner. For example, the generator records 132 or monitor records 134 can be stored in one or more network nodes. In many arrangements, one or more of the generator records 132 or monitor records 134 are user-defined, and thus can be created in accordance with the goals the user may desire for the second system 100 to achieve and/or limitations the user may desire for the second system 100 to avoid. The generator records 132 or monitor records 134 can be entered via the control point 110.

The generator records 132 or monitor records 134 can comprise constraints on the second system 100 and can describe one or more objectives of the system 100. In various embodiments, the generator records 132 or monitor records 134 comprise one or more of the following: context-awareness policies, such as actions to be taken in the event that a resource 20 obtains a specific reading; failure-handling policies, such as actions to be taken in the event that a resource 20 fails or is disconnected; safety or security policies or parameters, such as a description of which resources 20 may be accessed for use with a particular output 30; distribution policies, such as the manner in which the shell 40 can deploy a computer-executable to a host (described below); timeliness constraints, such as the total amount of time the second system 100 is allowed to complete a task; goals; and/or general constraints or requirements of the system 100.

In some embodiments, the generator records 132 are only used by the model generator 130, and the monitor records 134 are used by both the model generator 130 and a system monitor 200 (which is described below). For example, in certain embodiments, the generator records 132 comprise failure-handling policies and context-awareness policies, while the monitor records 134 comprise timeliness constraints and general application requirements. In other embodiments, the second system 100 does not include generator records 132. For example, the second system 100 can include only monitor records 134.

In further embodiments, one or more monitor-only records 136 are accessible only by the monitor 200. The monitor-only records 136 can be written in the scripting language and can be entered via the control point 110. In some embodiments, the monitor-only records 136 comprise user-defined security policies of the system 100.

The model generator 130 can be configured to generate a proof based on information corresponding to the resources 20 (e.g., information contained in the generator records 122) and based on the constraints of the second system 100 (e.g., based on the generator records 132 and/or monitor records 134). For example, the model generator 130 can generate a model or constructive proof to determine whether the resources 20 are capable of satisfying the objective of the system 100. The constructive proof can contain instructions for using one or more of the resources 20 within one or more of the system constraints (e.g., in a manner consistent with the generator records 132 and/or monitor records 134).

In some embodiments, the model generator 130 comprises a deduction engine that can interpret the scripting language as theories, and can syntactically deduce the logical consequences of a set of scripts. For example, the scripts in the directory 120 and those in the generator records 132 or monitor records 134 can be interpreted as logical expressions or logical axioms. The deduction engine can synthesize a model from the deductions. Synthesis of the models can proceed in any suitable manner. For example, in some embodiments, a so-called Curry-Howard-style correspondence may be used in the synthesis by the model generator 130 to synthesize a model from a constructive proof. Other techniques for constructing such models include, without limitation, machine learning based on examples and combinatorial sketching.

As briefly mentioned, the scripts contained in the directory 120 can be viewed as a set of logical formulas or a set of axioms of a logical theory of available resources 20. Logical inferences based on such a theory can form a template for all available functionalities that can result from combining the capabilities of each available resource 20.

In some embodiments, to develop a model, the model generator 130 employs a forward-chaining natural deduction based on the axioms in the records 122, generator records 132, and/or monitor records 134. For example, the model generator 130 can query the directory 120 for available services and/or devices among the resources 20. From scripts returned as a result of the query, the model generator 130 can deduce whether the response thus received satisfies the system objective. If not, the model generator 130 can use the response to consult the directory 120 again for another resource 20 that will satisfy the system objective. As an end result of such a forward-chaining deduction process, the model generator 130 eventually develops a constructive proof by which the system objective can be satisfied, such as, for example, by triggering the output 30. The constructive proof can indicate that one or more of the resources 20 are sufficient to satisfy the system objective, and can include instructions for using the one or more resources 20 within one or more system constraints to satisfy the system objective. In other embodiments, the model generator 130 employs a backward-chaining deduction, which starts with the system objective, followed by one or more queries to the directory 120.

In some embodiments, the deduction is obtained from a finitely branching, finite deduction tree. The deduction tree can be built on an on-demand basis, thereby conserving space used in the deduction. Throughout the deduction, policies that are respected by the individual resources 20 and the constraints of the second system 100 can be used as constraints in the deduction steps. In such embodiments, the deduction process can be relatively inexpensive, in terms of computational resources.

The model generator 130 can also use information regarding the topology of the system 100, as obtained from the directory 120, to impose deployment constraints (e.g., constraints for deploying a computer-executable agent or computer-executable instructions, as described below) in the constructive proof. In some arrangements, in the event that a given record is inconsistent, whether intrinsically or with respect to the available resources 20, the model generator 130 will terminate, and will report the inconsistency. In the event that the available resources 20 are inadequate to implement the objective of the system 100, the model generator 130 can terminate and report the reason for the termination. Reporting of an inconsistency or termination can comprise updating one or more of the records 122, generator records 132, and monitor records 134.

The model generator 130 can automatically synthesize constructive proofs or models from the scripting language. Accordingly, the scripting language can be realizable, such that a model that satisfies the specification of a resource 20 can be constructed automatically from the scripting language version of the resource 20.

The models generated by the model generator 130 can be expressed as a modeling language. In some embodiments, the modeling language includes formal operational semantics and incorporates: communicating processes with external and internal actions, hierarchical group structure, group communication and logical and physical migration by processes. External actions can involve, for example, communication, logging into and out of groups, etc. Internal actions can involve, for example, invoking APIs provided by the resources 20. Additionally, the modeling language can communicate time constraints, space constraints, and/or failures, and can include constructs for flow controls. In some arrangements, the modeling language can be dynamically reconfigured, as further discussed below. Such dynamic reconfiguration can involve any suitable replacement method, such as, for example, those used in object oriented paradigms. The modeling language can provide for certification of the provenance of data exchanged via the shell.

In some embodiments, models generated by the model generator 130 can include various advantages. For example, because some models correspond to a proof of the goals or objectives of the second system 100 that is deduced both from information particular to the resources 20 and from constraints of the system 100, the model can include intrinsic certification that the system objectives are met, that the system constraints are respected, and that none of the policies of the resources 20 are violated. In some embodiments, the model generator 130 is an example of means for generating a constructive proof that a subset of the resources 20 that are available to the second system 100 is sufficient to satisfy the objective of the system 100.

In some embodiments, a model generated by the model generator 130 is passed to an analyzer 140. The analyzer 140 can also accept as input one or more analyzer records 142 of non-functional safety properties of the system 100. The safety properties can include, for example, deadlock freedom, data consistency, mutual exclusion, and freedom from race conditions, etc. The analyzer records 142 can be user-defined, and can be entered via the control point 110. In some embodiments, the analyzer records 142 are stored in the scripting language.

The analyzer 140 can determine whether the model received from the model generator 130 is in compliance with the safety properties of the system 100, as set forth in the analyzer records 142. For example, in some embodiments, the analyzer 140 includes a static analyzer (e.g., a type checker), which verifies that the model is expressed in the modeling language. A static analyzer can be a combination of a model checker, a type checker, or can implement other suitable program analysis techniques including, without limitation, data flow analysis, run time analysis, and simulation, to check conformance of the generated model with safety properties, such as mutual exclusion, absence of race conditions, data consistency, etc. The model/type checker takes as input the model and the one or more analyzer records 142 (e.g., the scripting language version of the specifications of the safety properties), and from these, automatically determines whether the model satisfies the specifications. The type checker automatically evaluates safety properties, such as, but not limited to, data consistency. In some embodiments, the analyzer 140 is an example of means for determining that a set of instructions violate a user-defined policy.

In certain embodiments, in the event that the analyzer 140 determines that the model does not satisfy the safety properties, the analyzer 140 sends a request to the model generator 130 for the model generator 130 to generate a new model in compliance with the one or more analyzer records 142. For example, the analyzer 140 can generate a counterexample in the scripting language. The counterexample is delivered to the model generator 130, which can produce a refined model based on the counterexample. Accordingly, the analyzer 140 can ensure that a model created by the model generator 130 satisfies the safety specifications of the system 100.

In some embodiments, the model is passed from the analyzer 140 to a compiler 150. The compiler 150 can convert the modeling language to a bytecode format in some embodiments. The compiler 150 thus can create a bytecode version of the model produced by the model generator 130 in such embodiments. In some embodiments, the compiler 150 compiles the model into Java bytecode.

The compiler 150 can deliver the converted model to a deployer 160, such as a distribution module. In some embodiments, the converted model includes deployment information that determines the manner in which the deployer 160 distributes the model. For example, in certain embodiments, one or more generator records 132 or monitor records 134 that the model generator 130 uses in creating a model can include distribution policies for a computer-executable agent or computer-executable set of instructions (e.g., the bytecode version of the model). These distribution policies can be included in the converted model, which is derived from the model generated by the model generator 130. In other embodiments, the deployer 160 directly accesses the one or more generator records 132 or monitor records 134 that contain the distribution policies.

The deployer 160 can deliver the converted model to one or more hosts 170 in compliance with the distribution policies. For example, in some embodiments in which the second system 100 comprises only two outputs 30, a first host 170 can be in communication with the first output 30 and a second host 170 can be in communication with the second output 30. If the second system 100 includes security constraints that prohibit communication between resources 20 used in developing a bytecode model and the first output 30, the deployer 160 will distribute the bytecode model only to the second host 170 (e.g., for communication with the second output 30).

The deployer 160 can deliver a converted model to the one or more hosts 170 in any suitable manner. For example, in some embodiments, the deployer 160 communicates the converted model via wireless connections. In other embodiments, the connections are wired. Accordingly, in some embodiments, the deployer 160 is an example of means for communicating instructions to a host 170.

The one or more hosts 170 can be distributed among a network, and in some embodiments, each host 170 corresponds with a node of the network. Each host 170 can be in communication with one or more outputs 30. In some embodiments, an output 30 comprises the host 170. For example, the output 30 can comprise physical actuator with an inbuilt processor capable of operating as a host 170. A host 170 can comprise one or more of a machine 180, a driver 190, and a monitor 200. In some embodiments, the host 170 comprises the machine 180 and the driver 190, but the monitor 200 is located elsewhere within the system 100. Other arrangements are also possible.

The machine 180 can comprise an abstract machine or other suitable module for automatically receiving and running the bytecode model. For example, in some embodiments, the machine 180 comprises a Java virtual machine configured to run a Java bytecode model. Abstract machines in different hosts can be connected to each other through a network environment. For some embodiments, the network environment can be a group communication system (as a nonlimiting example, the SPREAD toolkit provided by Spread Concepts, LLC) or an environment such as the Parallel Virtual Machine (PVM) software tool provided by Oak Ridge National Laboratory. The machine 180 can have formal semantics based on the semantics of the modeling language. Prior to operation, the machines can be formally verified for properties such as no message loss, no message reorder, etc. For example, a no message loss property can ensure that messages are not lost during transmission. Retransmission techniques combined with acknowledgements can accomplish this property, in some embodiments. A property of no message reorder can ensure that messages are received by a receiver in the same order in which the sender sent them. This property can be achieved, for example, through the use of timestamps. The machine 180 can include APIs through which processes running on the machine 180 can call services. In some embodiments, a plurality of machines 180 can communicate with each other over a network.

In some embodiments, the machine 180 interacts with an output 30 via the driver 190. For example, in running the converted model, the machine 180 can generate instructions, signals, or other output that is sent to the driver 190, which delivers the instructions, signals, or other output in a format suitable for the output 30. In some embodiments, the output 30 can comprise a physical actuator that is activated when a particular set of instructions is received via the driver 190. In other embodiments, the output 30 can comprise an online application that uses information received via the driver 190.

In certain embodiments, the host 170 runs a monitor 200 in parallel with the machine 180. The monitor 200 can receive input from the machine 180 and is configured to diagnose malfunctions in the operation of the machine 180. The monitor 200 can be in communication with the directory 120 and/or the model generator 130, and can issue one or more recovery actions if such malfunctions occur. For example, if a malfunction is detected (e.g., a process fails to verify the proof accompanying data it received), the monitor 200 can abort or roll back a transaction, dynamically quarantine the output 30 and/or the host 170 from the network, and/or dynamically quarantine one or more processes of the machine 180 (such as when the machine 180 has been compromised).

In some embodiments, the monitor 200 communicates with the directory 120 via the interface 124. The monitor 200 can be configured to detect changes made to the directory 120 (e.g., changes made to one or more of the records 122), and in response, to dynamically modify the execution of the computer-executable model by the machine 180.

For example, changes to the configuration of a resource 20 that are registered in the directory 120 can be reported to the monitor 200. In the event of such a change, which may prevent the host 170 from executing the converted model in such a manner as to satisfy a system objective, the monitor 200 can query the directory 120 for a resource 20 that is logically equivalent to the previous configuration of the changed resource 20. If such a replacement resource 20 exists, the monitor 200 can dynamically reconfigure the processes running in the machine 180 to utilize the replacement resource. The dynamic reconfiguration can employ runtime method updates. In some embodiments, the monitor 200 sends a request to the model generator 130 to utilize the replacement resource 20 in place of the changed resource 20 and to generate and redeploy a new computer-executable model. Accordingly, in some embodiments, the monitor 200 is an example of means for detecting a change in a subset of resources 20 available to the second system 100 that prevents the host 170 from executing computer-executable instructions to satisfy the objective of the system 100.

In some embodiments, the monitor 200 is configured to diagnose that a resource 20 and/or a network node has been compromised (e.g., violates the specification or policies of the resource 20 or the system 100). The diagnosis can be based on the behavior of one or more processes in the machine 180. In some embodiments, the diagnosis is abductive. For example, the behavior of the resource 20 can be compared with the model generated by the model generator 130 or with the record 122 that corresponds to the resource 20. The monitor 200 can update the record 122 of a resource 20 to indicate that the resource 20 has been compromised. Additionally, the monitor 200 can send a request to the model generator 130 to utilize a replacement resource 20 in place of the compromised resource.

The monitor 200 can update a topology record 122 to indicate that a network node has been compromised. In certain embodiments, as a result of an update to the topology record 122 made during runtime of the system 100, the directory 120 provides an updated topology record 122 to the monitor 200. In response, the monitor 200 can dynamically redeploy one or more processes under the new topology and can update the dynamic links for proper communication between the processes. Thus, in some arrangements, the monitor 200 can ensure that constraints (e.g., formal guarantees) provided in the models generated by the model generator 130 continue to hold at runtime, even under changing network environments.

As mentioned above, in some embodiments, executable bytecode models are generated in such a way that communication of messages between executable bytecode models either running on the same host or on different hosts is accompanied by (e.g., carries with it) a proof of generation of the message. The proof describes how the message was generated. A bytecode model sends a message to another bytecode model, packaging the message with the proof of its generation. Before accepting a message, a receiving bytecode model checks the proof that accompanies the message. The proof checking is done by comparing the proof with the "model" of the sending entity. In some embodiments, the activities generating the message as recorded in the proof correspond to the capabilities as recorded in the model of the sending entity. The failure of a proof raises a flag. This mechanism is used to certify the provenance or pedigree of the data and helps in preventing generation of spurious triggers for activating resources 20. In further embodiments, the second system 100 can subsume models of multilevel security, such as, for example, so-called Bell-La Padula models. In other words, Bell-La Paluda models are a specialized example of a security models provided by embodiments of the invention, but more rigorous security models may be used.

Figure 3B:
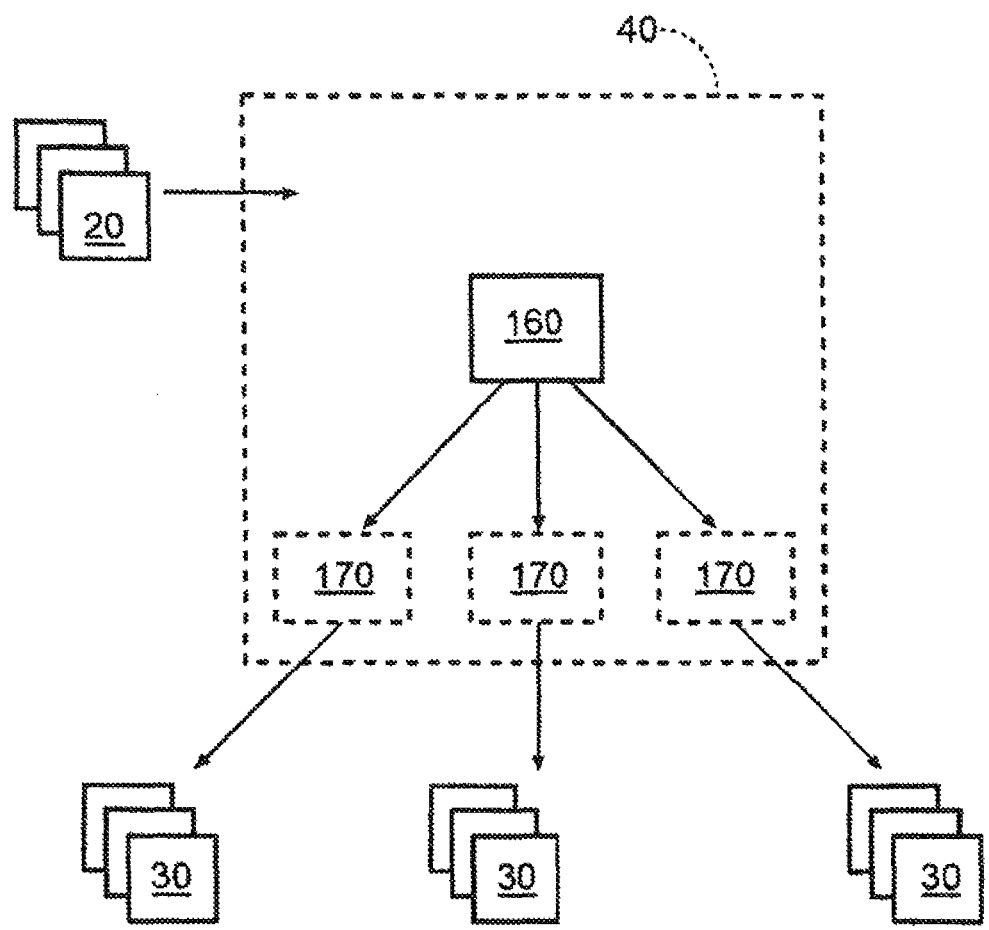
FIG. 3B is a block diagram of another embodiment of a shell for using network resources in connection with output devices.

FIG. 3B illustrates another embodiment of the system 100. As described above, in some embodiments, the second system 100 comprises one or more resources 20 in communication with the shell 40. The control shell 40 can comprise a deployer 160 that is configured to distribute converted models to one or more hosts 170. In further embodiments, each of the one or more hosts 170 can be in communication with one or more outputs 30. Other arrangements of the second system 100 are also possible.

Non-limiting examples of some systems that can employ methods and architectures such as described above are now provided. These examples are provided by way of illustration, and are in no way meant to limit the disclosure herein.

Example 1

Figure 4:
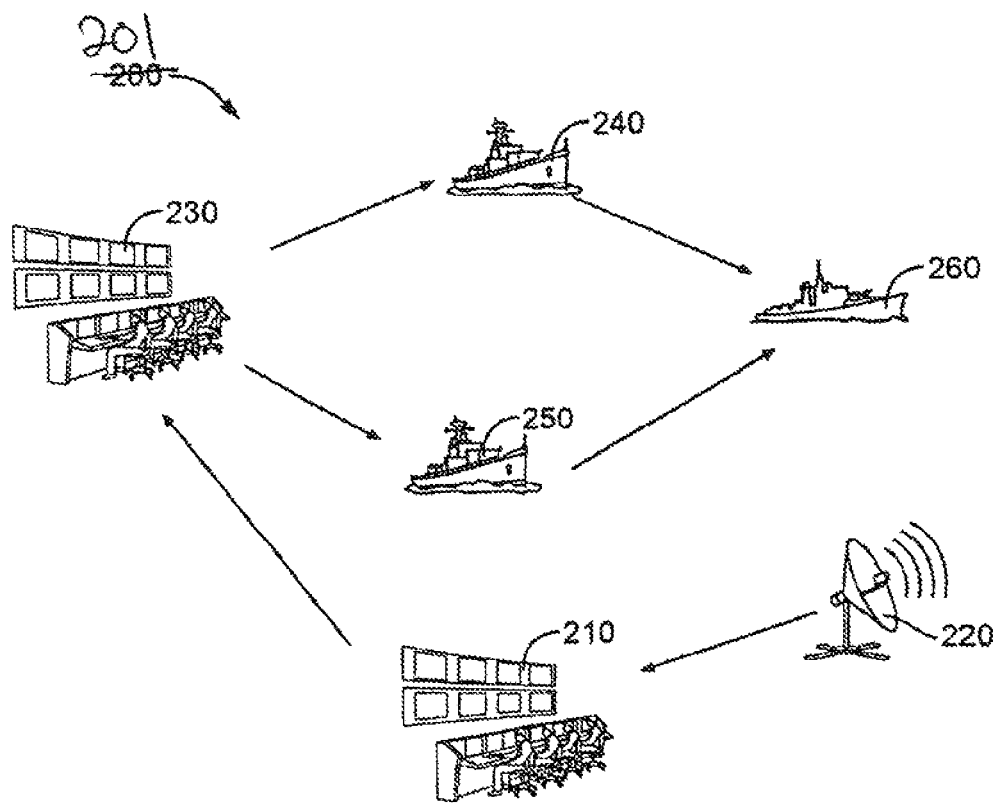
FIG. 4 is a schematic diagram of an embodiment of a coast guard system configured for coordinated use of network resources.

FIG. 4 represents an embodiment of a third system 201, such as first system 10 or second system 100. In the following, some resources are designated as services. In the present example, it is assumed that every resource has a unique address in a network. The third system 201 comprises a coast guard patrol fleet guarding a coastline. The third system 201 includes a surveying station 210 (also referred to as "SS") which has at its disposal a radar service that can be invoked using an API, which is exported by a central radar agency 220 ("CRA"), for detecting intruder vessels within the surveyed territory. The third system 201 further includes a command station 230 ("Command"), a first destroyer 240 ("Destroyed"), and a second destroyer 250 ("Destroyer2"). If the surveying station 210 detects an intruder vessel 260, it sends a report to the command station 230 informing of the intrusion as well as the location of the intruder 260. On receiving an intrusion report, the command station 230 sends information regarding the location of the intruding vessel 260 to the first destroyer 240 and also orders first destroyer 240 with the task of destruction of the intruding vessel 260.

Each of the first and second destroyers 240, 250 has access to an API provided by a missile resource that can be invoked to fire upon intruder vessels. The missile service is exported by a central ordnance service ("COS") (not shown). On receiving the order to destroy the intruder vessel 260 from the command station 230, the first destroyer 240 invokes the API provided by the missile service using the location information for the intruder vessel 260. The outcome of the firing (success/fail) is reported to the command station 230. If the first destroyer 240 fails to hit the intruder vessel 260, the command station 230 tasks the second destroyer 250 to destroy the intruder vessel.

In certain embodiments, the modeling language can be built on top of classical process calculus and provides a formal programming model for resource coordination. The syntax of one embodiment is provided below as recursive Extended Backus-Naur Form (EBNF). In this embodiment, the modeling language has operational semantics involving interactions between observable actions, communication, and silent computations. Additionally, the language can model timeouts and failures (e.g., in monadic style).

```
(Model)
M::=
    Ifp B (I)           (recursive model with an identifier)
    {N} M               (physical/logical host with name)
    M^M                 (two models spatially coexisting in a distributed network)
    N ::=
        x               (XML namespace)
        n               (name from an XML namespace)
(Bytecode Model)
B::=
    (local n) B         (restriction)
    dead                (dead bytecode model)
    B₁ comp B₂          (par. composition of bottom-level bytecode models)
    Id                  (bytecode model identifier)
    Ext;B               (Observable action)
    Sil;B               (Silent behavior)
    failure(Id)         (failure module)
    handle(Id);B        (failure handle notation)
    timeout t;B         (timeout)
    [a₁(x₁),...;...aₙ(xₙ)]   (API export)
Ext ::=                 (observable actions)
    Sec                 (Security)
    C                   (Comm.)
        C::=            (Comm.)
            Ch(x)       (input)
        Ch<Str>         (output of string Str)
        mcg(C₁,...,Cₙ)<Str>   (group multicast of string Str)
        Ch::= N         (Channel)
        Sec ::=
    login N             (login to a logical/physical host)
    logout N            (exit a boundary)
    Sil::=              (silent behavior)
        let x=S in Sil  (let reduction)
        if θ then B else B'   (control flow)
```

-continued

```
        modify(Id://a_i)         (reconfiguration by substituting resource)
            θ                    (constraint)
        fail(Id)                 (failed computation)
S::=
        Id://a_i(y)              (API exported by resource)
Id://a_i(y)::=
        pre_1~post_i[y]  (pre and post conditions for invoking an API)
θ::=
        x >=y+c
        x>y+c
        x =< y+c
        x<y+c
```

In this embodiment, a model can consist of several submodels, mutually recursive executable bytecode models (e.g., lfp is the least fixpoint), or a named logical or physical host that contains a running model inside. A recursive model can perform observable actions, exhibit silent behavior, detect and handle failures, and act as a resource exporting APIs that can be invoked by itself or other bytecode models. Observable action involves communication, logging in and out of physical and logical hosts. Silent computation takes place by calling APIs exported by resources. It can also involve failure handling and dynamic reconfiguration through substitution of one resource for another. APIs exported by resources are described by their interfaces, which include pre- and post-conditions that hold before and after invoking an API. The pre- and post-conditions can be simple type judgments (the types of the parameter passed) and arithmetic constraints. As an example, the workflow for the first destroyer 240 can be expressed as:

Ifp Destroyer1=
destroyer1 ("destroy", x);
let y=COS:/1missile(x) in
Command<y>; Destroyer1

In certain embodiments, the scripting language is based on an intuitionistic mathematical logic. The language can describe both temporal and spatial evolution and has atomic constructs for describing relations among variables. The basic syntax of one embodiment is provided below as EBNFs.

```
P::=
    defun prop        (property definition)
    OR(P1,P2)         (disjunction)
    &&(P1,P2)         (conjunction in infix notation)
    →(P1,P2)          (intuitionistic implication)
    ~ P               (intuitionistic negation)
    Finally P         (temporal evolution)
        I             (variable for participant identifier)
    Knows(u| Q)       (epistemic operator signifying knowledge of object)
    Invoke(u|v|Q 1|Q2|)   (invocation of API)
    Send(u,Q)         (message send)
        T             (constant true)
    Exists(l,P)       (quantification over participant identifiers)
prop::=
    ID Varlist
    ~ Var Constant
    ~::=> | < | ≤ | ≥
```

In this embodiment, the scripting language includes participant identifiers standing for states and constructs for expressing communication, resource description, knowledge, etc. Services are defined in terms of their properties using the defun construct (akin to Lisp). A property can be a predicate or a constraint (i.e., an identifier followed by a list of variables). In the above, Q's denote patterns. Patterns are strings and can be regular expressions. They can characterize both bytecode models and resources. For example, "Knows(u 1 Q)" above denotes that the bytecode model matching the pattern Q knows the object u. A bytecode model can know an object only if it has received a communication of it. "Invoke (u|v|Q1|Q2|I)" describes the properties of a resource declaratively. This phrase describes an API exported by a resource to which an object u is passed as parameter, returns object v, satisfies the pattern Q1, can be invoked by a bytecode model that matches the pattern Q2, and is exported by the entity identified by I (that includes the location of the entity).

As an example, consider the first destroyer 240 described above. If the first destroyer 240 bytecode model receives an intrusion report x along with a "destroy" command (i.e., comes to know of an intrusion report along with a "destroy" command) the destroyer 240 will use that report to fire a missile in an attempt to destroy the intruder vessel 260 by invoking some API exported by some resource. This can be specified in the scripting language as follows:

Knows(x, "destroy"|Destroyer1)→Finally(Invoke (x|missile_response|*.input: IntrusionReport.*|Destroyer1|W));

Here, W is a placeholder since the name of the service is not yet known, nor is the entity exporting the service known. Once these items are discovered, the proper pattern, as well as the proper nominal, will be instantiated by a model generator 130 (not shown) of the present, illustrative example. The phrase "*.input:IntrusionReport.*" is a regular pattern indicating that the service accepts the type "IntrusionReport" as input where * describes wildcard. A substantial variety of security policies and context-awareness requirements can be specified in the scripting language. The foregoing example of one embodiment of the scripting language is provided by way of illustration, and should in no way be interpreted as limiting the disclosure as claimed.

The third system 201 can have coordination requirements (e.g., system constraints) such as the following, which may be stored in one or more records such as the records 122 described above:

Finally(Invoke(|"intrudervessel", location|*input: null, output: IntrusionReport*|SS|U) && C0 && C1 && C2 && ... )

C0: Invoke(|"intrudervessel", location|*input: null*|SS|U)→Finally(Send("intrudervessel", location, SS))

C1: Send(x, SS)→Finally(Knows(x|COMMAND))

C2: Knows("intrudervessel", location;COMMAND)→Finally(Send("destroy", location, COMMAND))

C3: Send("destroy", location, COMMAND)→Finally (Knows("destroy", location|Destroyer1))

C4: Knows("destroy", location; Destroyer))→Finally(Invoke(location|missile_response|* input: intpair, output: Boolean *|Destroyer1|W))

. . .

These coordination requirements are referred to hereafter as "Cspec". In the foregoing, "IntrusionReport" represents a concatenation of the strings "intrudervessel" and the location of the intruder vessel 260. Additionally, "missile_response"

is a Boolean with values "success" and "failure". The specification Cspec states that the surveying station 210, or the SS "entity", will finally be able to obtain information about an intrusion by invoking some API exported by some resource and, if it obtains this information, will finally send it out as a message (e.g., C0). If the SS bytecode model sends a message, it should be finally received by the command station (C1). If the command station 230 comes to know of (i.e., receives) an intrusion report, then the command station 230 will finally send out a command ordering destruction of the intruding vessel (C2). If the command station 230 sends out a destroy command, this command will finally be heard by the first destroyer 240 (C3). If the first destroyer 240 receives a command to destroy an intruding vessel, then it will finally invoke some API exported by some resource to fire at the intruder vessel and destroy it (C4), and so on.

In this embodiment, the temporal "Finally" modality in the scripting language stands for branching time evolution. Additionally, the specifications are written in a possibilistic or "permissive" mode. For example, in C1, because of the branching time semantics of "Finally", it is only a possibility that the message will finally be received (i.e., there will exist a run in which this occurs). It is also possible that in some run the message will be lost in transit. The specification can be fashioned to deal with such situations. Workflows will be synthesized from such possibilistic specifications, thus enabling the synthesis of fault tolerant workflows. From the scripting language, the model generator 130 can synthesize the SS bytecode model as a model (as described hereafter).

Consider the radar service exported by the central radar agency 220. The service is specified by the following script:
Radar(, CRA, W)→Invoke(|"intrudervessel", location|*input: null, output: IntrusionReport*|W|CRA)

This script is referred to hereafter as S1. Here the service is exported by the resource CRA, and provides an API Radar whose invocation does not require any formal parameter to be passed and returns the type IntrusionReport that consists of a pair that consists of the string "intrudervessel" and a value of type location. From Cspec, when the model generator 130 of the present, illustrative example encounters
Invoke(|"intrudervessel", location|*input: null, output: IntrusionReport*|SS|U),
the model generator 130 starts a subtree for natural deduction. The model generator 130 assumes in natural deduction style, Radar(,CRA, SS). Using S1 and the implication elimination rule, the model generator 130 deduces
Invoke(|"intrudervessel", location|*input: null, output: IntrusionReport *|SS|CRA).
Using standard the implication-introduction rule in natural deduction, the model generator 130 deduces
Radar(, CRA, SS)→Invoke(|"intrudervessel", location|*input: null, output: IntrusionReport * |SS| CRA)

Based on this deduction the model generator 130 constructs the model for the surveying station 210 as
lfp SS=let y=CRA://Radar( ) in . . .
As shown, discovery of the "CRA://Radar( )" service is automated by the model generator 130 by using deduction. If multiple resources needed to be combined the natural deduction procedure would have correctly discovered the combination.

The basic deduction is conducted as a forward-chaining procedure, and whenever a goal involving an "Invoke" construct is encountered a companion proof tree is developed to discover the proper service. This companion deduction can be viewed as computing a logical interpolant. After the implication introduction, the assumption is discharged. The deduction, as well as the synthesis of bytecode models, can be carried out entirely automatically and can be implemented in software. From C0, the model generator 130 deduces "Send ("intrudervessel", location, SS)". From this and C1, the model generator 130 deduces "Knows(x|COMMAND)". From these two deductions, the model generator 130 refines the model for SS as "lfp SS=let y=CRA://Radar( ) in Command<y>; . . . ". In addition the model generator 130 constructs the COMMAND bytecode model as "lfp COMMAND=Command(y); . . . " Here, "Command" is a new channel. In this manner the model generator 130 continues the deduction and simultaneously synthesizes bytecode models until no additional new facts are produced.

The formal operational semantics of a machine 180 (not shown) of the present, illustrative example can be implemented in software. An example of the semantics are declaratively provided below. In the following it is assumed that ⌈ is an environment and that ⌈/I denotes the restriction of ⌈ to the bytecode model identified by the identifier I. In some embodiments, the environment can be implemented through a group communication system or a messaging platform like PVM.

⌈/I' |-I://$a_i$=pre~post[$x_i$] (Serv inv. 1)
⌈/I' |-I://$a_i$(y)→pre—post[y/$x_i$]
⌈/I',N |-pre[y/$x_i$]→true (Serv inv. 2)
⌈/I' |-pre~post[y/$x_i$]→post [y/$x_i$]
⌈/I' |-Complete(x) ⌈/I' |-val x=$t_f$/I' |-post::=(σ[x] p[x]) $x_1$(⌈/I' |-□N |-(σ[x] p[x]) [t/x]) (Serv. inv fail)
⌈∪{fail(I)} |-post→false The first rule (Serv. inv. 1) states that before a service invocation, the preconditions of the service are evaluated. The second rule (Serv inv. 2) states that service invocation proceeds if the pre-condition evaluates to true (true and false are constants). The third rule (Serv. inv. fail) describes the manner in which the failure of a service is registered by the environment. If the "Complete" predicate of the environment (which registers when a service invocation is completed) is true, the resulting value does not satisfy the post condition. As a result, it is registered that the resource exporting the API $a_i$ has failed. This information will be used for failure handling by other bytecode models. For example, as illustrated by the rule below, the bytecode model failure (Id) is executed whenever any other bytecode model I' makes reference to handler (I):

$$\frac{\Gamma \vdash \text{fail}(Id) \text{(failure composition)}}{\Gamma / I' \vdash \text{handle}(Id); P \to \text{failure}(Id)}$$

Wireless sensor networks can be advantageously employed in a wide variety of applications. Some wireless devices (which can also be referred to as "motes") that are capable of collecting data from a sensor and relaying that data wirelessly throughout a network via any suitable method can allow for autonomous collection and processing of environmental conditions over a given area. Certain of such motes can communicate via radio frequency ("RF") transmissions, and may communicate with other motes in the network.

Figure 5:
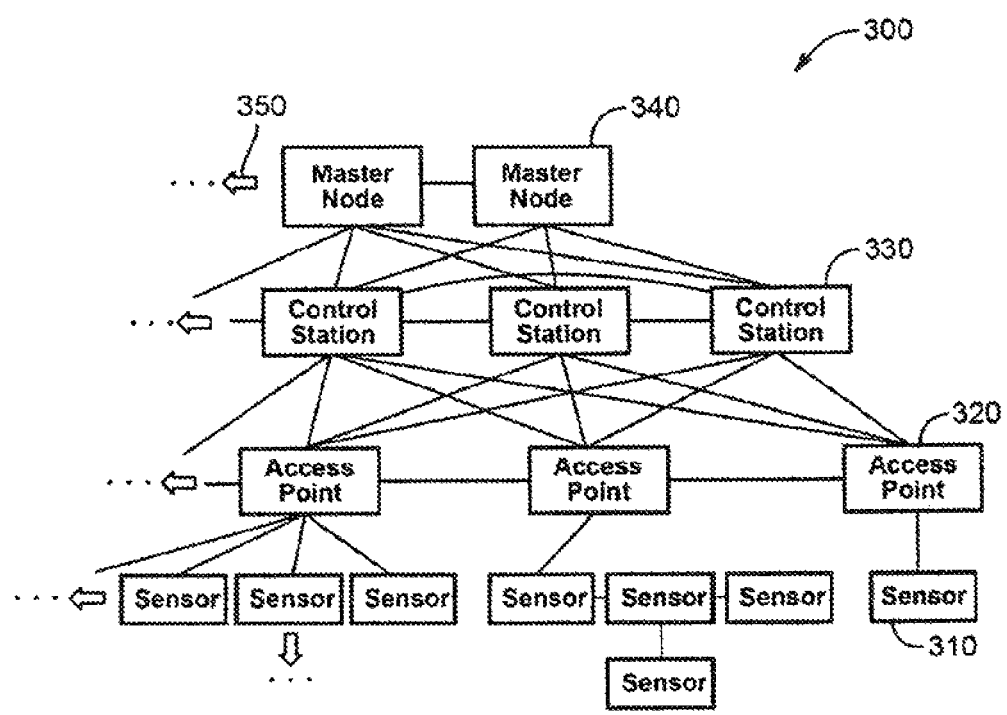
FIG. 5. is a block diagram of an embodiment of a multi-level system that includes a plurality of sensors.

FIG. 5 represents an embodiment of a fourth system 300, such as first system 10, second system 100, and third system 201, which can comprise a wireless sensor network. The fourth system 300 can be configured for use in intelligent monitoring and control of soil properties and irrigation. For example, in some arrangements, a watering system for a landscaped property comprises the fourth system 300.

Embodiments of the fourth system 300 can be adapted for use in other environments as well, as further described below.

In certain embodiments, the fourth system 300 includes one or more sensors 310 that are physically distributed throughout the landscaped property. The sensors 310 can be buried underground or otherwise situated as desired. In some embodiments, the sensors 310 are in communication with one or more access points 320, each of which can comprise one or more motes. Accordingly, the access points 320 may also be referred to hereafter as motes. In some embodiments, the access points 320 are in communication with one or more control stations 330, each of which, in turn, can be in communication with one or more master nodes 340 of a distributed network.

Figure 6:
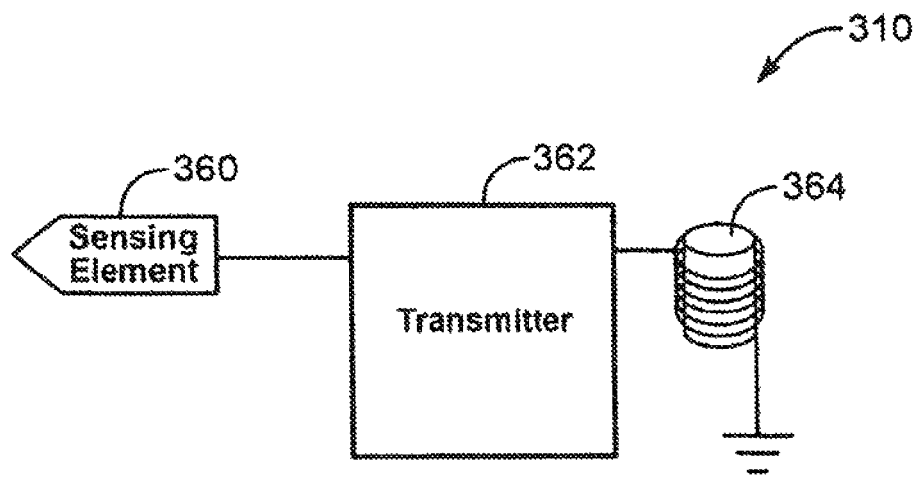
FIG. 6. is a block diagram illustrating at least a portion of an embodiment of a sensor that includes a wireless transmitter.

With reference to FIG. 6, in certain embodiments, one or more of the sensors 310 are configured to transmit data using magnetic induction ("MI") transmissions. MI transmission can be particularly advantageous in underground environments or other environments which can significantly attenuate and/or substantially block RF transmissions. For example, in comparison to RF transmission, MI transmission can be relatively unaffected by the medium through which it propagates (e.g., air, water, soil, rock, etc.).

In some embodiments, a sensor 310 comprises one or more sensing elements 360, such as, for example, a soil moisture probe. The sensing element 360 can be in communication with a transmitter 362. The transmitter 362 can receive information regarding a physical property of the soil, such as the moisture content of the soil, from the sensing element 360, and can transmit this information by MI transmission via a ferromagnetic coil 364. For example, the transmitter 362 can cause a signal of current to flow within the coil 364 in a manner that represents the information to be transmitted, which can generate a time-varying magnetic field.

Figure 7:
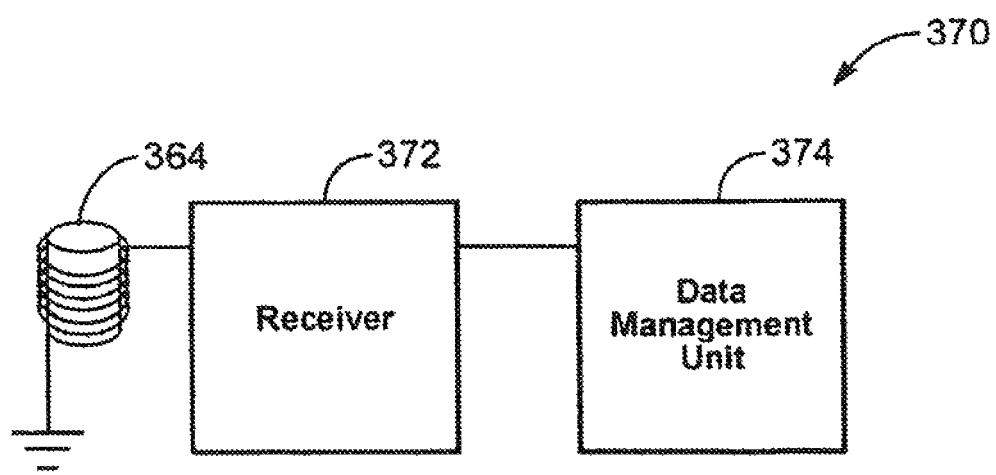
FIG. 7 is a block diagram illustrating an embodiment of a wireless receiver.

With reference to FIG. 7, in some embodiments, one or more of the sensors 310 comprises a receiving unit 370. For example, in some arrangements, one or more sensors 310 are configured to both send and receive MI signals, and can communicate with each other.

The receiving unit 370 can comprise a coil 364. When a signal in the form of a time-varying magnetic field is incident on the coil, a corresponding voltage can be induced. The receiving unit 370 can further comprise a receiver 372 for detecting the signal. For example, the receiving unit 370 can detect varied flow of current through the coil that may result from the induced voltage.

In some embodiments the receiving unit 370 includes a data management unit 374 in communication with the receiver 372. The data management unit 374 can be configured to store, convert, manipulate, or otherwise use information received from the receiver 372. For example, the data management unit 374 can include an LCD panel for displaying information regarding the transmitted information, an RF transmitter for relaying the information, a data logger for storing the information and/or some other suitable device. In some embodiments, the data management unit 374 can be in communication with the transmitter 362 (see FIG. 6) of a sensor 310, and can instruct the transmitter to send information to an access point 320, as further described below.

With reference again to FIG. 5, in certain embodiments, one or more sensors 310 each may communicate directly with an access point 320 via MI transmission, as illustrated by the leftmost grouping of sensors 310 and the leftmost access point 320. In other embodiments, one or more sensors 310 may be distanced sufficiently far from the access point 320 to substantially prevent effective direct communication between some of the sensors 310 due to a relatively small transmission range of the transmitters 362. In certain of such embodiments, a first sensor 310 may transmit data to a nearby second sensor 310, which in turn may transmit the received data (along with additional data that it has gathered, in some instances) to yet a third sensor 310 which is out of the range of the first sensor 310. The third sensor 310 may then transmit data received from the other sensors 310 and/or data it has gathered to an access point 320. An example of such a relay of sensors 310 is illustrated in the middle grouping of sensors 310 in FIG. 5, which are shown as communicating with the middle access point 320 via a single sensor 310. In various embodiments, the fourth system 300 can include hundreds, thousands, or even millions of sensors 310.

In some embodiments, the sensors 310 form a wireless network that employs only MI transmission. However, in other embodiments, the wireless network can use other suitable communication mechanisms instead of or in addition to MI transmission.

Figure 8:
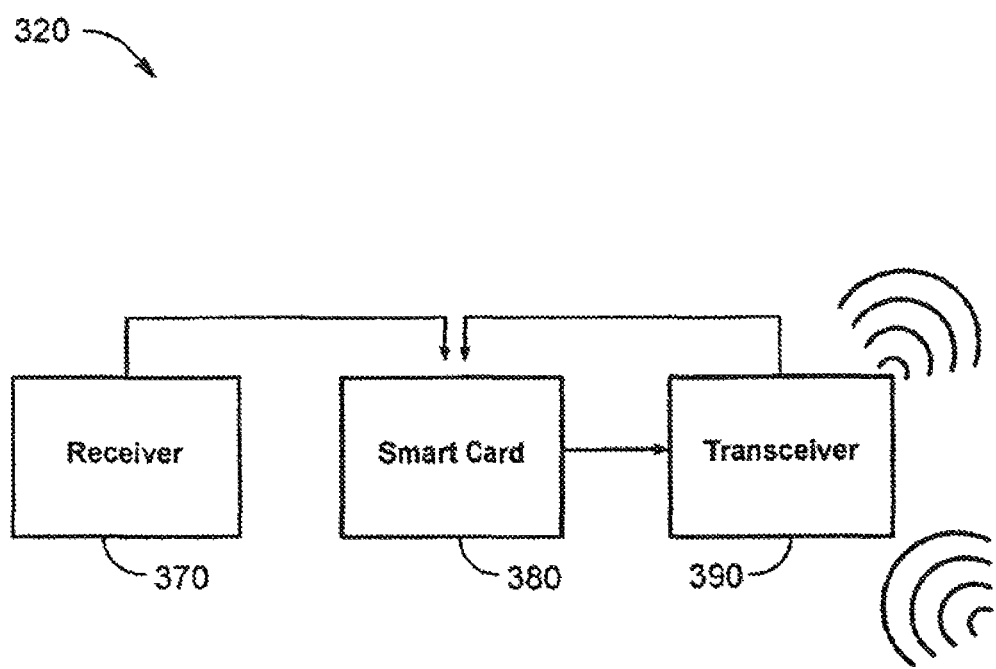
FIG. 8 is a block diagram of an embodiment of an access point that includes a wireless receiver, a smart card, and a transceiver.

With reference to FIG. 8, in certain embodiments, an access point 320 can comprise a receiver 370 such as described above, and thus can receive signals transmitted by one or more sensors 310. The receiver 370 can further include a smart card 380 or any other suitable computing element in communication with the receiver 370.

The smart card 380 can further be in communication with (e.g., can transmit information to and/or receive information from) a secondary communication device, such as a transceiver 390, that is configured to permit communication between the access point 320 and one or more additional elements of the fourth system 300. For example, in some embodiments, the access point 320 is configured to communicate with one or more other access points 320, one or more control stations 330, and/or one or more master nodes 340 via the transceiver 390 (see FIG. 5). In some embodiments, infrared transceivers, cables, wires, or other suitable communication media are used instead of or in addition to the transceiver 390.

With reference again to FIG. 5, in some embodiments, one or more of the access points 320 are positioned at or above ground level and are capable of communicating with one or more sensors 310 that are positioned underground. For example, each access point 320 may be in communication with a specific subset of sensors 310. The access points 320 can receive information from the sensors 310 and can communicate that information and/or additional information to one or more access points 320, control stations 330, and/or master nodes 340. In some embodiments, one or more access points 320 may be arranged in a relay such that a subset of access points 320 communicates with each other and a single access point 320 of the subset communicates with a control station 330 and/or a master node 340.

The control stations 330 can assimilate and manage information received from the access points 320, which may be used in decision making, data logging, or other desired tasks. The master nodes 340 can receive data from the control stations 330 and can make decisions on or otherwise utilize the data thus received.

Any other suitable arrangement is also possible. For example, in some embodiments, the access points 320 can communicate directly with the master nodes, thereby eliminating the control stations 330. In other embodiments, the network can comprise only sensors 310 and access points 320. For example, the access points 320 can include networking software and can serve as network nodes. In still other embodiments, layers in addition to those shown in FIG. 5 can be used. For example, devices may be inserted to communicate between the access points 320 and the control stations 330. Any suitable combination of the master nodes 340, control stations 330, access points 320, and/or sensors 310 can be positioned above or below ground or water, or may be suspended in air in any suitable manner (e.g., may be positioned on a pole, in an aircraft, etc.).

As illustrated by the arrows 350, the system 30 can include a much larger number of nodes 340, control stations 330, access points 320, and/or sensors 310 than those shown. A hybrid of communication techniques may also be used to connect any element in the network. For example, some sensors 310 may communicate via MI transmission, while others may use cable, RF, infrared, or other technologies. Similarly, the nodes 340, control stations 330, and/or access points 320 can use any suitable combination of such technologies to communicate.

The fourth system 300 can include one or more shells 40 (not shown in FIG. 5) such as described above in any suitable number and/or distribution. For example, in some embodiments, one or more nodes 340 and/or control stations 330 include one or more directories 120, model generators 130, analyzers 140, compilers 150, and/or deployers 160. In some embodiments, each access point 320 comprises a host 170. For example, the smart card 380 of a sensor 320 (see FIG. 8) can serve as a host 170 on which a converted model can be executed. Other elements of the fourth system 300 can also serve as hosts 170, including the nodes 340 and/or the control stations 330.

The sensors 310 can comprise resources 20 that are available to the fourth system 300. In some embodiments, the fourth system 300 utilizes information gathered from the sensors 310 to determine whether to actuate sprinklers via an output device 30 (not shown in FIG. 5), such as, for example, any suitable actuator such as one or more valves comprising solenoids.

In certain embodiments, the smart card 380 (see FIG. 8), which can be running a set of computer-executable instructions issued by a deployer 160, can receive information regarding the operational status of a sensor 310 and/or data regarding the moisture content of the soil from the sensor 310 via the receiver 370. This information and data can be delivered via the transceiver 390 to the appropriate location or locations (e.g., to one or more nodes 340 and/or control stations 330) within the distributed network of the fourth system 300 to update a directory 120, which can comprise a record 122 for the sensor 310. If the information received from the sensor 310 is sufficient to provide a trigger, in some embodiments a node 340 may actuate an output device 30 to turn on the sprinkling system.

In some embodiments, the smart card 380 comprises a Java Smart Card that comprises a Java virtual machine. Java Smart Cards can permit small Java-based applications to run securely on them by incorporating Java kilobyte virtual machines. A smart card can contain an embedded device (i.e., a microcontroller) that provides a user with the ability to program the card and assign specific tasks to occur as a result of given events. The computer-executable instructions thus can be issued in the form of Java bytecode that can run securely on top of the Java virtual machine.

In some embodiments, the smart card 380 is placed in communication with the receiver 370 via a serial I/O. The smart card can comprise a controller that includes electrical contacts that are connected to an output port of the receiver 370. A Java applet or application downloaded to the microcontroller can process incoming signals and can act accordingly by initiating commands to send data regarding the received signal to the transceiver 390. The data can be securely protected through an applet firewall that restricts and checks access of data elements from one applet to another.

By employing a control shell 40 such as described above, the fourth system 300 can include a scalable intelligent software-based coordination infrastructure. Distributed intelligent agents (e.g., instructions distributed by a model generator 130 and converted by a compiler 150) can use data from the sensors 310 and user-defined system management policies to generate real-time control of the fourth system 300. In some embodiments, the control decisions are delivered to appropriate personnel for manual intervention. For example, the decision can be delivered to a control point 110 comprising a graphical user interface via which a user can provide commands to the fourth system 300. In other embodiments, the decisions are made without manual intervention, and are delivered directly to an output device 30. The shell 40 can provide for intelligent monitoring and control of soil properties. As discussed, the shell 40 can include a software tool that provides policy-based, on-demand coordination of the fourth system 300, which can be an irrigation system. Other aspects and advantages of embodiments of the fourth system 300 will also be apparent to those of skill in the art from the disclosure herein.

In certain embodiments, access points 320 comprising Java Smart Cards, which can interpret data through bytecodes, can consume less power than known motes. Such access points 320 can also be relatively smaller and much cheaper than known mote devices, in some instances. For example, the cost of manufacturing some arrangements can be only slightly over 10% the cost of manufacturing known mote devices. Furthermore, unlike certain embodiments disclosed above, known motes are not configured to communicate with MI transmission devices, nor are they configured to communicate with a large number (e.g., thousands or millions) of sensors that are intelligently interconnected via dynamically changeable software, such as that provided by control shells 40.

Embodiments of the fourth system 300 can be employed in a variety of contexts. For example, in some embodiments, the fourth system 300 can comprise an underground network of soil moisture sensors which may be fully buried (e.g., no cables or protrusions extending to the surface). Such a network could be used in agriculture to control irrigation. In some embodiments, the fourth system 300 can comprise an underground network of pressure, vibration, movement, audio, and/or other sensors that could be a valuable defensive and monitoring system for military use. In other embodiments, the system can comprise an underwater network of sensors for monitoring water properties, such as temperature, quality, or quantity, plant or animal life and conditions, or a variety of other underwater applications. In some embodiments, the fourth system 300 can comprise a network of implanted biomedical sensors configured to coordinate the acquisition of certain vital signs or biological conditions of a patient. Such a network configuration can allow one sensor which detects a certain problem, such as a high fever or a heart condition, for example, to request other sensors to acquire relevant data immediately to assist in problem solving decision making. In other embodiments, the system can comprise a network through any medium in which short range communication is desirable. For example, a personal digital assistant, watch, cell phone, laptop, and personal computer can all synchronize to each other if within transmission range.

Various embodiments of first system 10, second system 100, third system 201, and fourth system 300 and/or golf course watering system 1200 include one or more advantageous features, such as the following. Certain embodiments provide for the reliable satisfaction of the goals (e.g., business goals) of a user, ensure that the quality of service constraints of the user are respected, and ensure that none of the policies imposed by individual services and devices of a system, nor those imposed by the system, are violated, even under rapidly changing environments, and some systems ensure that non-functional safety constraints of the system are satisfied. Certain of such embodiments can be particularly suited for deployment in mission-critical applications, such as patient monitoring or building security.

Some embodiments incorporate expressive yet tractable languages to describe models of complex heterogeneous physical devices, such as actuators or sensors. Some embodiments permit automatic synthesis of workflows from declarative specifications of the business logic and quality of service goals of a system and from models of available devices and services. Further embodiments provide models that are created and implemented in a manner that provides security features and that meets the quality of service goals of a system. Certain embodiments provide a mechanism for certifying the provenance of data exchanged between processes and prevent generation of spurious triggers for activating services and/or devices of a networked system.

Some embodiments provide for automatic and controlled deployment and running of bytecode models or computer-executable instructions obtained from constructive proofs. The bytecode models can be generated automatically from user-defined system constraints such that the system functions substantially autonomously and without any or without extensive software development by the user. Some embodiments provide for readily deployable systems that can be easily adapted to meet the system goals of a user. Further embodiments permit reconfiguration of a workflow at runtime, which reconfiguration can include substituting new services and/or devices for existing ones and/or can provide new functionalities in response to changing requirements of or changing resource availabilities to a system, even when such conditions change rapidly.

Some systems can be easily reconfigured, such as when a user wishes for the system to conform to new or different policies. In some embodiments, the user can readily enter these policy changes via a control point 110. Some systems can also be rapidly deployable, such that the system can begin operation soon after policies, goals, and system objectives are created.

Various embodiments may be advantageously employed in numerous contexts, such as those for which intelligent and/or reliable service coordination is important. For example, embodiments may be used for: generating mashup engines for intelligent location tracking and mapping; soil and water management and irrigation control for agricultural and environmental applications; intelligent distributed power control, such as control of a power grid; home entertainment and security; distributed intelligent control of Internet-based appliances; distributed robot control; intelligent control of manufacturing plants and inventory management; reliable and smart emergency management applications; on-line, flexible assembly of operationally responsive spacecrafts; intelligent and reliable control of guided missiles; tracking and monitoring for homeland security; cognitive antennas, including multiple input/multiple output (MIMO) systems that use numerous antennas to optimize communication; cognitive radars; cognitive radios; automatic hospital management and/or monitoring of the delivery of therapeutic drugs; and automated distributed fermentation control, as well as modulation of cellular metabolism. Other applications are also contemplated.

Figure 9:
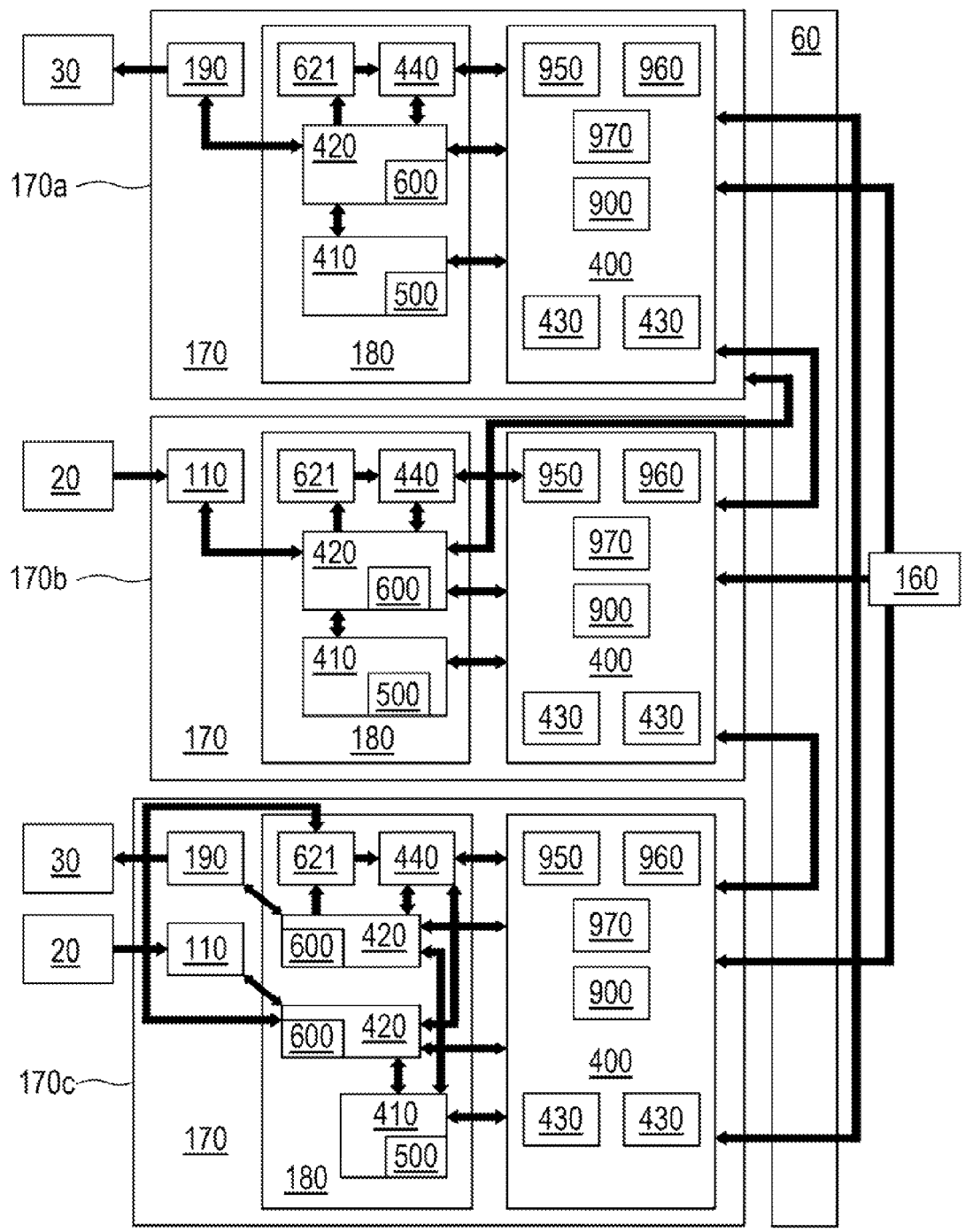
FIG. 9 is a block diagram depicting portions of an embodiment of a shell for using network resources in connection with output devices.
Figure 10:
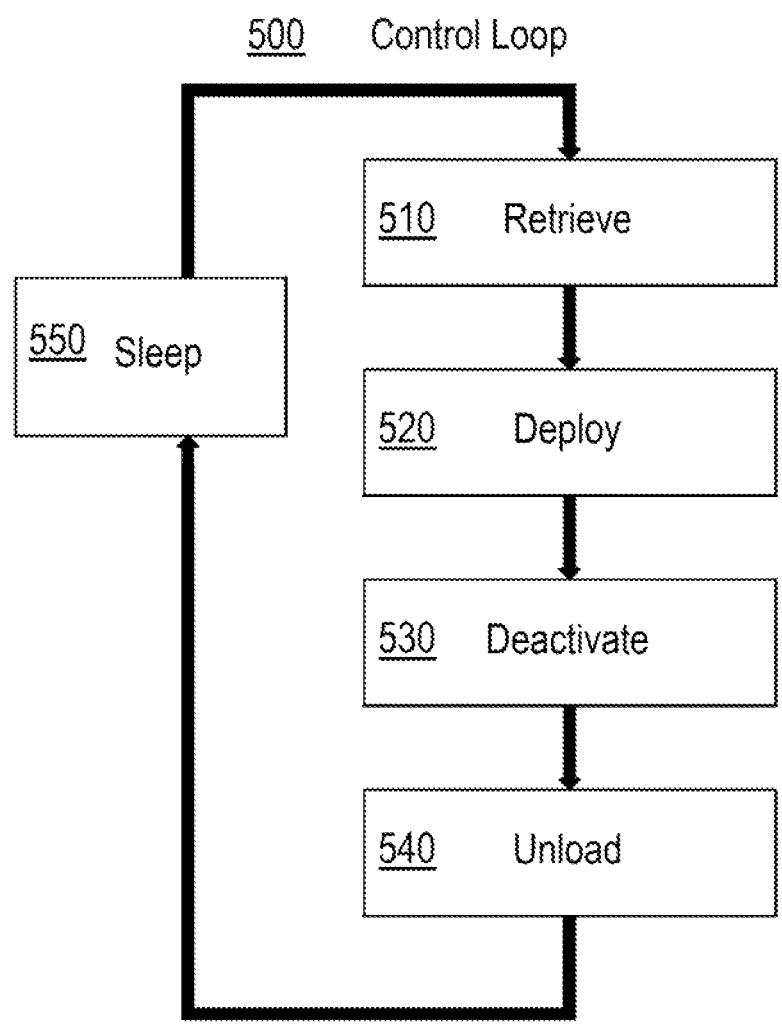
FIG. 10 is a flow chart showing a process by which a control process receives and acts on control messages.
Figure 11:
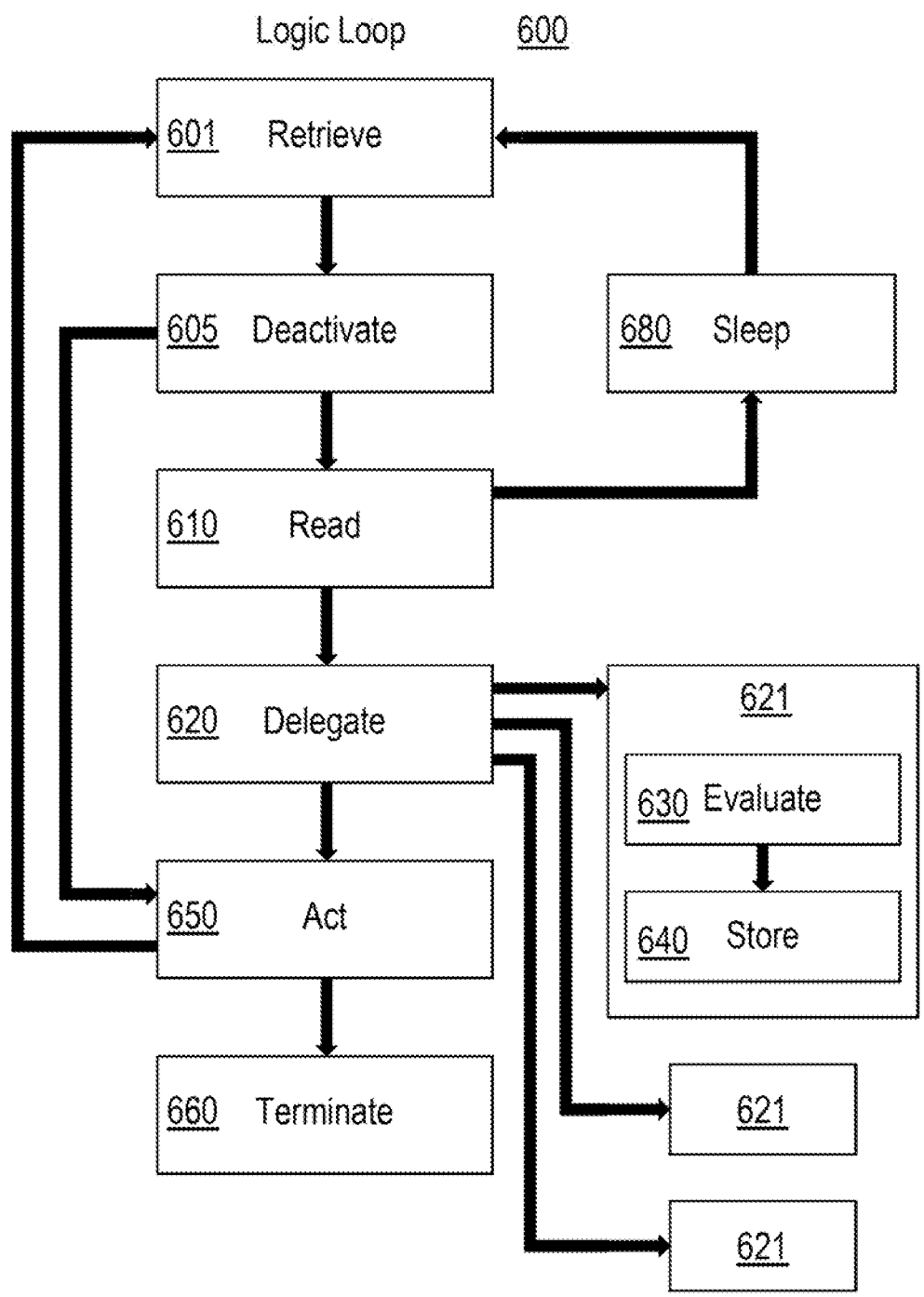
FIG. 11 is a flow chart showing a process by which a logic process receives, evaluates, and acts on information from sensors.
Figure 14:
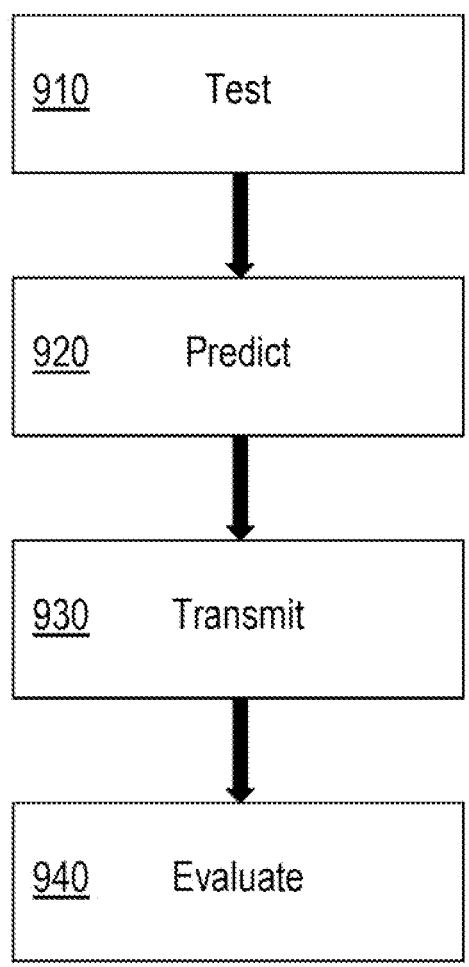
FIG. 14 is a flow chart illustrating a process used by a global address space for predicting network congestion.

With reference to FIG. 9, in certain embodiments, a host 170 further comprises a machine 180 and a data store 400, said data store 400 providing GAS access. FIG. 9 depicts three hosts 170 as 170*a*, 170*b*, and 170*c* (each host 170 having a communication system 440 and a logic process 440, showing that each data store 400 and each communication system 440 is capable of multi-instance distributed operation). The data store 400 may be a distributed key-value store or other DHT and may also be referred to as a distributed database. Data store 400 contains one or more data records 430. The directory 120 may be part of the data store 300, but the directory 120 may also be separate. In addition, the records 122 stored in the directory 120 may be data records 430. Generator records 132, monitor records 134, monitor-only records 136, and analyzer records 142 may be data records 430. The host 170 contains an operating system such as Ubuntu brand GNU/Linux. Machine 180 may be an abstract machine such as a Java virtual machine (JVM) or Machine 180 may be resources provided by the operating system on host 170. Machine 180 monitors and controls the execution and thread-level synchronization of control process 410, logic process 420, and evaluating process 621. Control process 410 contains control loop 500 (FIG. 10). Logic process 420 contains logic loop 600 (FIG. 11). Data store 400 contains network model 950, testing module 960, and learning module 970 (FIG. 14A) as well as learning process 900 (FIG. 14). Control process 410, logic process 420, and evaluating process 621 may be implemented as Java threads or via another multiprocess or concurrent execution system as may be provided by machine 180. Logic process 420 may be a converted model as prepared by model generator 130, analyzer 140, and compiler 150. Control process 410, logic process 420, and evaluating process 621 communicate with communication system 440 (as such, it is understood that communication system 440 is capable of multi-instance distributed operation). Communication system 440 communicates with (interfaces with) data store 400. Control process 410 and logic process 420 communicate with (interface with) data store 400. Control process 410 and logic process 420 may communicate with (interface with) the data store 400 on the host wherein control process 410 and logic process 420 reside, or they may communicate with (interface with) the data store 400 on another process. FIG. 9 depicts communication of logic process 420 on host 170*b* with the data store 400 on host 170*a*. Logic process 420 may direct a driver 190 to control an output 30. Logic process 420 may also be a control point 110, may receive information from an input 20, and may communicate information to (interface with) communication system 440 or data store 400. In certain embodiments, deployer 160 may send information to host 170, and in particular to a data store 400 on host 170. Control process 410 retrieves information from data store 400 sent by deployer 160. Although FIG. 9 only shows one control process 410 on each machine 180, it is understood that each machine 180 may contain any number of control processes 410. Host 170*c* depicts a host 170 and a machine 180 containing two logic processes 420. However, each machine 180 may contain any number of control processes 410 and any number of logic processes 420. In addition, a logic process 420 may communicate with more many outputs 30 (via one or more drivers 190) and with many inputs 20 (via one or more control points 110). As illustrated, components contained within a host 170 communicate with components contained within another host 170 via network 60.

FIG. 10 is a flow chart depicting control loop 500 showing how control process 410 receives and acts on control messages from deployer 160 via data store 400. Control loop 500 is a repeating loop that does not stop during normal operation of machine 180. In retrieving step 510, control process 410 retrieves any data records 430 contained in data store 400 which are control messages. In certain embodiments, control messages are sent to control process 410 by deployer 160. In deploying step 520, control process 410 examines the information retrieved in retrieving step 510. If said retrieved information instructs control process 410 to deploy a logic process 420, then control process causes machine 180 to begin execution of a logic process 420. In certain embodiments, executable Java bytecode as compiled into Java class files and compressed into a Java Archive (JAR) file is included in the information retrieved in retrieving step 510, and control process 410 causes machine 180 to load and execute instructions contained in said bytecode. However, it is understood that non-Java bytecode may be used. It is also understood that interpreted languages such as, but not limited to, Python may be used. In deactivation-instructing step 530, control process 410 examines the information retrieved in retrieving step 510. If said retrieved information instructs control process 410 to deactivate a logic process 420, then control process 410 instructs logic process 420 to deactivate. In certain embodiments, control process 410 may instruct logic process 420 to deactivate by communicating directly with control process 420. In other embodiments, control process 410 may instruct logic process 420 to deactivate by storing a message in data store 400, which is retrieved by logic process 420. In unloading step 540, control process 410 determines whether any logic processes 420 have completed deactivation. In the event that any logic processes 420 have completed deactivation, then control process 410 causes machine 180 to remove logic process 420 from machine 180. It is understood that the loading and removal of logic process 420 from machine 180 may be achieved by using the Reflection capabilities of the Java programming language and virtual machine technologies. However, it is understood that other technology may be used. In control-sleeping step 550, control process 410 stops execution for a predetermined amount of time, such as, for example, 100 milliseconds. During this period of time, machine 180 does not execute control process 410. When the predetermined amount of time has expired, machine 180 resumes execution of control process 410 and continues control loop 500 by proceeding to retrieving step 510. It is understood that control-sleeping step 550 is accomplished by using the Sleep function provided by the Java programming language. However, it is understood that control-sleeping step 550 specifically, and more generally, control process 410 and logic process 420, may be implemented using any suitable multiprocess, multithreading, or concurrent program execution technology. Accordingly, control process 420 and logic process 410 may be implemented as natively compiled programs which execute concurrently in a suitable operating system environment. In addition, in certain embodiments, control-sleeping step 550 may be omitted. In yet other embodiments, control-sleeping step 550 may be selectively omitted.

FIG. 11 is a flow chart depicting logic loop 600 showing how logic process 420 retrieves, evaluates, and acts on information from data store 400. Logic loop 600 is a repeating loop that does not stop unless control process 410 dictates logic process 420 to deactivate. Logic loop 600 is comprised of message-retrieving step 601, deactivating step 605, reading step 610, delegating step 620, acting step 650, terminating step 660, and sleeping step 680. Delegating step 620 causes machine 180 to begin execution of a non-repeating evaluating process 621. Evaluating process 621 comprises evaluating step 630 and storing step 640.

In message-retrieving step 601, logic process 420 accesses information transmitted by control process 410. Said information may be stored in logic process 420 or it may be stored in data store 400. It is understood that any number of inter-process communication techniques may be used to accomplish transmittal of information from control process 410 to logic process 420 or from logic process 420 to control process 410. After completing message-retrieving step 601, logic process 420 proceeds to deactivating step 605.

In deactivating step 605, logic process 420 analyzes information accessed in message-retrieving step 601. If said information indicates that control process 410 has instructed logic process 420 to terminate, logic process 420 records that it has received a termination instruction and proceeds to acting step 650. If said information does not indicate that control process 410 has instructed logic process 420 to terminate, logic process 420 proceeds to reading step 610.

In reading step 610, logic process 420 attempts to retrieve one or more data records 430 from data store 400. If a requested record is available, logic process 420 proceeds to delegating step 620. If a requested record is not available, logic process 420 proceeds to sleeping step 680.

In sleeping step 680, logic process 420 stops execution for a predetermined amount of time, such as, for example, 100 milliseconds. During this period of time, machine 180 does not execute logic process 420. When the predetermined amount of time has expired, machine 180 resumes execution of logic process 420 and continues logic loop 600 by proceeding to message-retrieving step 601. It is understood that sleeping step 680 is accomplished by using the Sleep function provided by the Java programming language; however, as described elsewhere herein, any suitable concurrent programming technique may be used to accomplish this step. In addition, in certain embodiments, sleeping step 680 may be omitted.

In delegating step 620, logic process 420 causes machine 180 to begin execution of evaluating process 621. Logic process 420 also records information associated with evaluating process 621 for use in acting step 650. In certain embodiments, delegating step 620 provides information available from logic process 420 or from data store 400 to evaluating process 621. After performing delegating step 620, logic process 420 proceeds to acting step 650.

Evaluating process 621 operates concurrently with logic process 420 and control process 410, and in certain embodiments, delegating step 620 causes a new Java thread to begin execution in machine 180. However, it is understood that evaluating process 621 may operate using any technology that may be used by logic process 420 or control process 410. As may be appreciated, evaluating process 621 may not be complete when logic loop 600 returns to delegating step 620 and thereby delegates another evaluating process. In such a situation, multiple evaluating processes 621 may be executing concurrently, thereby taking advantage of resources provided by host 170 which allow for concurrent execution of instructions. It is understood that host 170 may include multiple microprocessors or microprocessors containing multiple physical or logical cores. The one or more concurrently executing evaluating processes 621 may utilize the resources which may be provided by host 170 for concurrent execution of instructions.

It is understood that information available to evaluating process 621 and logic process 420 from data store 400 may have been acquired from one or more inputs 20 or may have been synthesized by one or more evaluating processes 621 delegated by one or more logic processes 420 on one or more hosts 170.

In evaluating step 630, evaluating process 621 analyzes information from data store 400 according to instructions created and provided by model generator 130, analyzer 140, and compiler 150. The instructions may be in the form of bytecode or other machine executable object code. In certain embodiments, evaluating step 630 executes a purely functional method. It is understood in the art that a purely functional method causes no change in program state, and merely returns a value based on evaluating a series of logical instructions and mathematical calculations.

In storing step 640, evaluating process 621 may communicate information synthesized in evaluating step 630 to logic process 420. After completion of storing step 640, evaluating process 621 terminates.

In acting step 650, logic process 420 controls one or more outputs 30 via driver 190. Also, logic process 420 stores information in data store 400 that has been synthesized by evaluating process 421 subsequent to any previous executions of acting step 650 by logic process 420.

After completion of acting step 650, logic process 420 determines whether to proceed to message-retrieving step 601 or to terminating step 660. If logic process 420 has recorded that it has received a termination instruction, then logic process 420 proceeds to terminating step 660. Otherwise, logic process 420 proceeds to message-retrieving step 601.

In terminating step 660, logic process 420 communicates with control process 410 the fact that logic process 420 has completed termination. Logic process 420 then ceases execution.

As may be observed, logic process 420 does not perform sleeping step 680 after acting step 650. Sleeping step 680 may be skipped. We think that it is better to perform sleeping step 680 when temporarily ceasing execution achieves an efficiency, such as where no information is available to logic process 420 in reading step 610. However, it is understood that certain embodiments of the invention may reorder steps in logic loop 600.

In the embodiment described in FIG. 11, evaluating step 630 and storing step 640 are performed in parallel to logic loop 600. However, it is understood that evaluating step 630 and storing step 640 may be performed as steps in logic loop 600.

In certain embodiments, some of the steps in logic loop 600 steps may be performed in parallel, or not as part of, logic loop 600. For example, reading step 610, delegating step 620, and acting step 650 may be performed as a non-repeating process in addition to or as an alternative to being performed as part of logic loop 600. It is understood that in certain embodiments, reading step 610, delegating step 620, and acting step 650 may be implemented such that they can be executed by machine 180 either in a thread containing other steps in logic loop 600 or in a thread containing only reading step 610, delegating step 620, and acting step 650.

As may be observed, where logic process 420 implements logic loop 600 and includes sleeping step 680, the amount of time that logic process 420 spends in sleeping step 680 influences resource utilization of host 170 and also influences the reaction time of logic process 420. For example, during sleeping step 680, resources of host 170 are not used by logic process 420, and machine 180 may execute instructions from other processes on host 170, such as control process 410 or evaluating process 621. This allows, for example, machine 180 to complete evaluating process 621 more quickly and leads to more efficient utilization of resources. On the other hand, when the time spent in sleeping step 680 is long, logic process 420 may execute reading step 610 a significant amount of time after data store 400 on any host 170 receives updated information. For example, if logic process 420 spends 100 milliseconds in sleeping step 680 and data store 400 receives updated information twenty milliseconds after logic process 420 enters sleeping step 680, then logic process 420 will not receive the updated information until at least eighty milliseconds after it is received by data store 400.

Certain embodiments achieve greater efficiency and increased reaction time by configuring data store 400 to communicate with, or trigger, logic process 420 on or by the existence of newly arrived information. In such an embodiment, when data store 400 receives updated information that logic process 420 should receive, data store 400 attempts to communicate with logic process 420 to indicate that logic process 420 should retrieve information from data store 400. In addition, in these embodiments, reading step 610, delegating step 620, and acting step 650 are executed by machine 180 in a separate process that is not part of logic loop 600.

In certain embodiments, the attempt by data store 400 to communicate with logic process 420 may fail (as a nonlimiting example, because resource use of host 170 is too high), and logic process 420 will eventually retrieve the newly updated information from data store 400 via reading step 610 in logic loop 600.

As shown in FIG. 9, data store 400 on one host 170 may communicate with logic process 420 on another host 170. In certain embodiments, such triggering may be from a data store 400 on one host 170 to a logic process 420 on another host 170, either in addition to, or instead of, triggering from a data store 400 on the same host as the triggered logic process 420.

Figure 12:
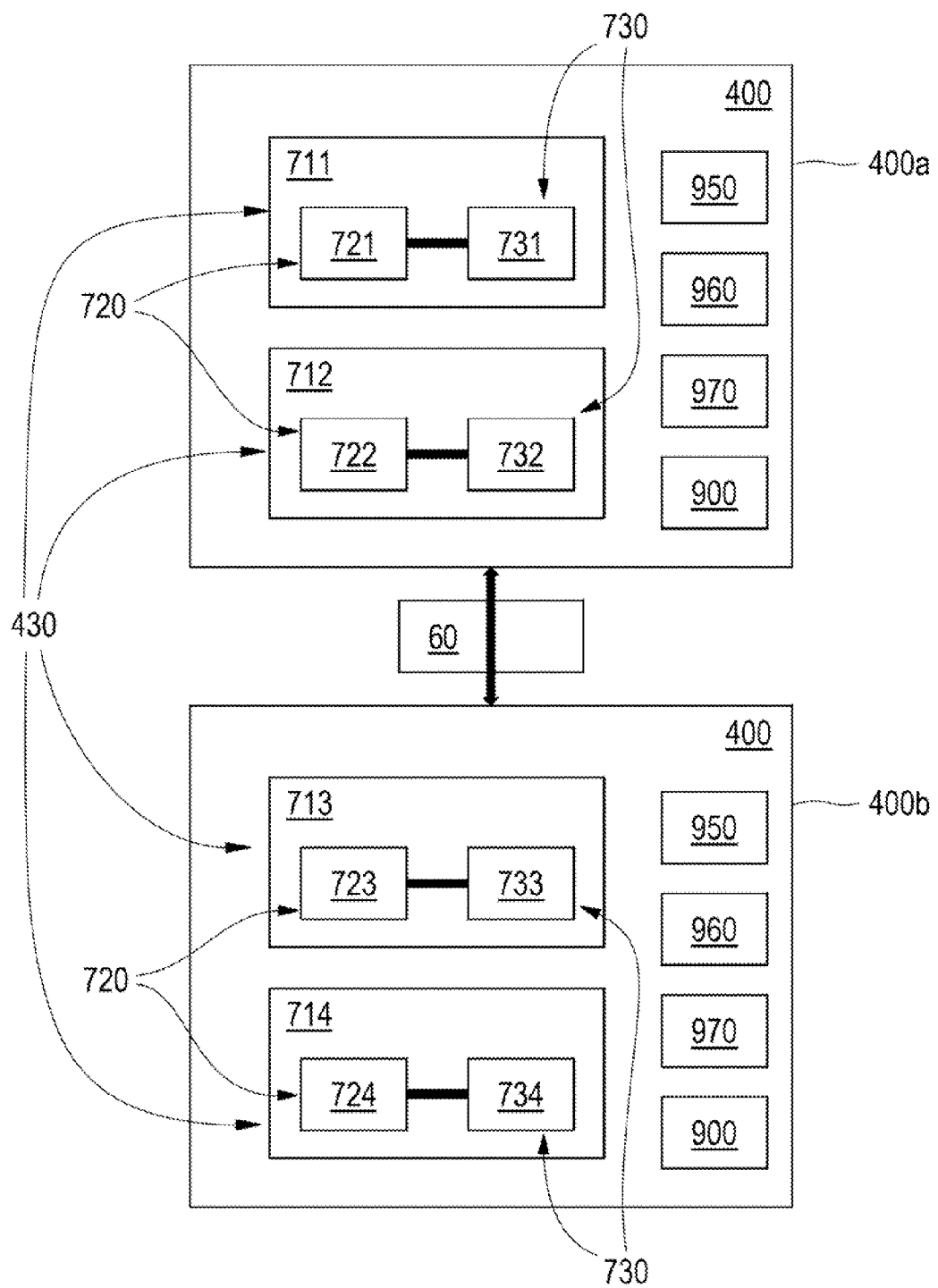
FIG. 12 is a block diagram depicting an embodiment of values stored in a global address space.

FIG. 12 further illustrates an embodiment of data store 400 with respect to records stored in data store 400 and the communication between two data stores 400 on two hosts 170 (and further demonstrates how data store 400 is capable of multi-instance distributed operation). Data stores 400a and 400b also contain network model 950, testing module 960, and learning module 970 (FIG. 14A) as well as learning process 900 (FIG. 14). Data store 400a and data store 400b communicate via network 60. Each data store 400 may contain any number of data records 430. Each data record 430 contains a key 720 and a value 730. First record 711 contains first key 721 and first value 731. Second record 712 contains second key 722 and second value 732. Third record 713 contains third key 723 and third value 733. Fourth record 714 contains fourth key 724 and fourth value 734. Each value 730 may implement any type of suitable data structure, such as without limitation, primitive types (including, without limitation, boolean, character, float, double, and integer values); composite types (including, without limitation, tuples, structs, and composites thereof); and abstract types (including, without limitation, containers, queues, maps, associative arrays, dictionaries, multimaps, sets, multisets, priority queues, double-ended queues, stacks, strings, trees, graphs, hashsets, and hashtables). It is understood that, in addition to the data structures described, any type of data structure that can be converted into one of these data structures may also be used. This includes any type of data structure or value that can be serialized (for example, into a string). A process may request the value 730 for one or more keys 720, and data store 400 retrieves the value in the same data record 430 as the requested key 720. It is understood that any number of technologies may be used to accomplish key-value retrieval. A nonlimiting list of exemplar technologies includes Project Voldemort, Ringo, Kai, Dynomite, Dynamo, MemcacheDB, ThruDB, CouchDB, Cassandra, HBase, Hazelcase, nmdb, Chord, Bigtable, Keyspace, and Hypertable.

The data stores 400 are configured such that when a data record 430 (a key value pair) is added or deleted, or when a value 730 in a data record 430 is altered, the data stores 400 make the updated information available on all of the data stores 400. In certain embodiments, information is made available on all of the data stores 400 by containing all information in one or more data records 430 stored locally on each data store 400. As illustrated in FIG. 12, first record 711 corresponds with third record 713 and second record 712 corresponds with fourth record 714. Accordingly, first key 721 and third key 723 contain the same information; and second key 722 and fourth key 724 contain the same information. So, if a process updates first record 711 by changing first value 731 associated with first key 721, then data store 400*a* communicates via network 60 with data store 400*b*, and data store 400*b* updates its corresponding third value 733 associated with third key 723 to match first value 731. The process may work in either direction. So, if a process updates fourth record 714 by changing fourth value 734 associated with fourth key 724, then data store 400*b* communicates via network 60 with data store 400*a*, and data store 400*a* updates its corresponding second value 732 associated with second key 722 to match second value 734. Although FIG. 12 shows two data stores 400, any number of data stores 400 may be used. By making information available on each data store 400, use of a global address space (such as a distributed database or a distributed key-value store) allows said information to be available to processes such as logic process 420 contained on the same host 170 as data store 400 in the event that host 170 becomes temporarily disconnected from network 60. As explained more fully in the description of FIGS. 16A and 16B, the addition of a communication system 440 and a data store 400 to shell 40 improves shell 40 by allowing shell 40 to operate in unreliable network environments.

Figure 13:
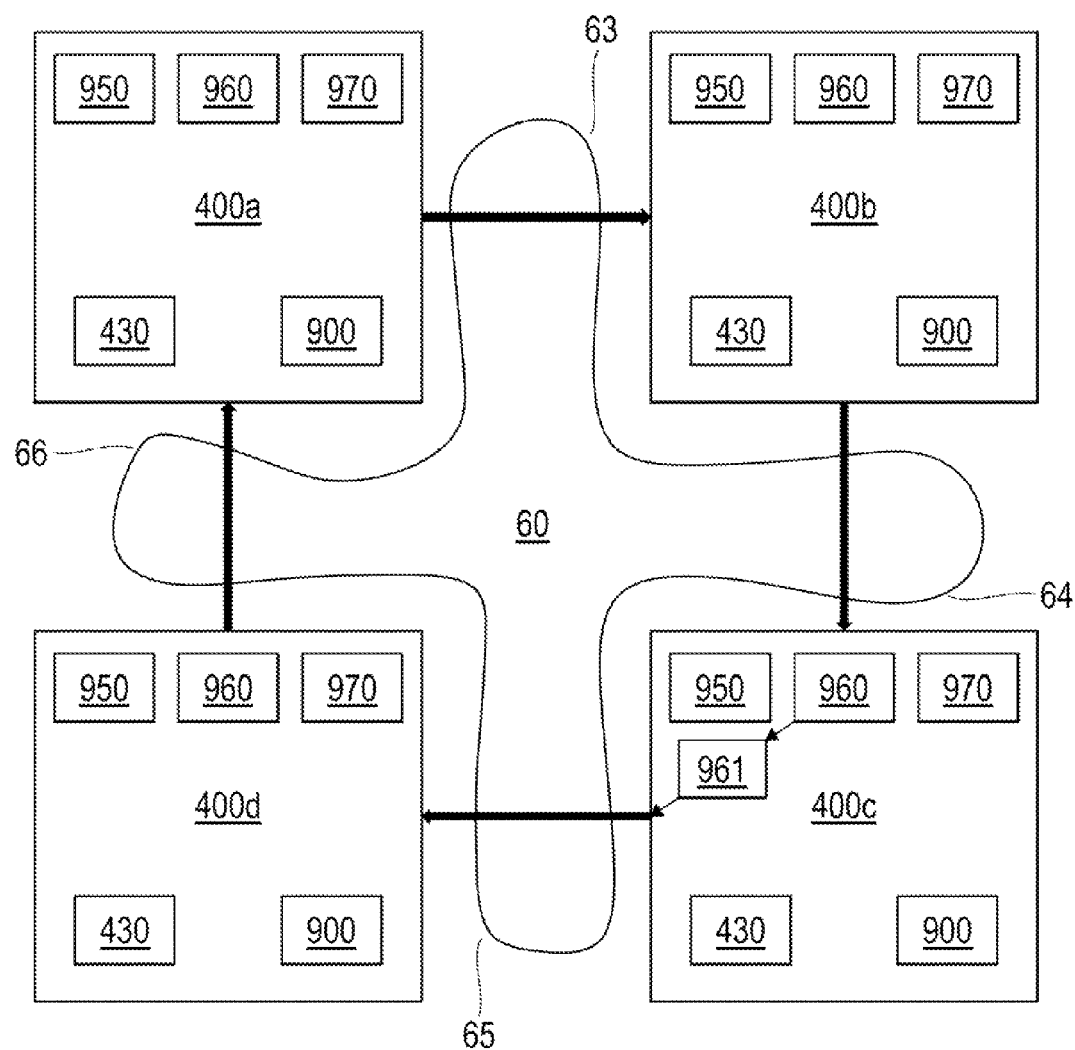
FIG. 13 is a block diagram depicting an embodiment of a global address space configured in a ring pattern.

FIG. 13 illustrates an embodiment of the invention in which many data stores 400 are configured in a ring 800. Each data store 400 resides in a host 170 (not shown), but one host may contain more than one data store 400. Data stores 400 communicate with each other over network 60. Data stores 400*a*, 400*b*, 400*c*, and 400*d* also contain one or more data records 430, network model 950, testing module 960, and learning module 970 (FIG. 14A) as well as learning process 900 (FIG. 14). Although in some embodiments, the ring 800 illustrated in FIG. 13 may correspond to a physical embodiment, it is understood that in many embodiments the ring 800 represents a logical configuration of data stores 400. In an embodiment, data stores 400*a*, 400*b*, 400*c*, and 400*d* are connected to form a ring 800 in which each data store 400 receives information from only one other data store 400 and sends information to only one other data store 400, but the data stores 400 are collectively all connected to each other. Data store 400*a* and data store 400*b* are in communication via first connection 63. Data store 400*b* and data store 400*c* are in communication via second connection 64. Data store 400*c* and data store 400*d* are in communication via third connection 65. Data store 400*d* and data store 400*a* are in communication via fourth connection 66. Connections 63, 64, 65, and 66 are made through network 60. In many embodiments, connections 63, 64, 65, and 66 represent logical, rather than physical, connections. The information transmitted among the data stores 400 includes the addition, deletion, or alteration of data records 430. As illustrated by FIG. 13, when, for example, a data record 430 is altered in data store 400*a*, data store 400*a* transmits information to data store 400*b* via first connection 63, instructing data store 400*b* to alter the appropriate record in data store 400*b*. Data store 400*b* then makes the appropriate change in its own copy of said data record 430; and in turn, data store 400*b* instructs data store 400*c* via second connection 64. Data store 400*c* then repeats the same process, by making the appropriate change in its own copy of said data record 430 and instructing data store 400*d* to do the same via third connection 65. Data store 400*d* then notifies data store 400*a* that all data stores 400 have received the updated information via fourth connection 66.

In certain situations, embodiments of the invention may experience periods of high usage. In such a situation, it can be advantageous to configure data stores 400 configured into ring 800 to determine when resource use is high, and, when said resource use is high, temporarily refrain from communicating with other data stores 400. Accordingly, in certain embodiments, each data store 400 tests its host 170 and network 60 conditions before sending information (for example, information updating a data record 430) to another data store 400 in ring 800. By reducing network 60 and host 170 resource use during periods of high usage, this improvement enhances the performance and scalability of ring 800, and as a result, improves the performance or reduces the resource requirements necessary for any host 170 that is part of an embodiment of the invention.

FIG. 13 also illustrates data stores 400*a*, 400*b*, 400*c*, and 400*d* each containing a respective network model 950, testing module 960, and learning module 970. Data stores 400*a*, 400*b*, 400*c*, and 400*d* are all a data store 400. A testing module 960 tests resource utilization of hosts 170 and network 60 in ring 800 by sending a number of relatively small test packets 961 of information to the next data store 400 in the ring 800. FIG. 13 illustrates the testing module 960 in data sore 400*c* sending a test packet 961 to data store 400*d* via third connection 65 over network 60. When a data store 400 communicates with another data store 400 regarding a data record 430, if communication fails, each data store 400 will continue to attempt said communication until successful. However, when a data store 400 sends a test packet 961, data store 400 will not attempt to retransmit a test packet 961 if communications fail. This is because the failure of communications may be used as an indicator of network congestion. Each data store 400 in ring 800 will transmit any test packets 961 received by said data store 400 to the next data store 400 in ring 800 until each test packet 961 returns to the data store 400 which originated the test.

In certain embodiments, before a data store 400 transmits a test packet 961 it has received to the next data store 400 in ring 800, the data store 400 will measure the resource utilization of the host 170 on which data store 400 resides and record said resource utilization in the test packet 961. In this manner, if the test packet 961 returns to the data store 400 which originated the test, said data store 400 will receive a measurement of the current resource utilization for each data store 400 in ring 800. The resource utilization measurement may be the Unix-style load average, but it is understood that any similar type of measurement may be used. As each test packet 961 returns to the data store 400 which originated the test, said data store 400 measures the time taken by that test packet 961 to traverse ring 800. Said data store 400 which originated the test also records the total number of returning test packets 961 for the current network test.

Once all the test packets 961 have returned or data store 400 determines that any unreturned test packets 961 will not return, then data store 400 evaluates whether the resource utilization is too high to send information to the next data store in ring 800. If resource use is too high, data store 400 will wait for a preconfigured amount of time (as a nonlimiting example, 100 milliseconds) before attempting another test. In certain embodiments, data store 400 determines whether overall resource use is too high by measuring (1) the total time it takes for each test packet 961 to return to the originating data store 400; (2) how many test packets 961 return to the originating data store 400; and (3) the measured resource utilization as measured by each data store 400 and recorded in each test packet 961.

In certain embodiments, testing module 960 may use learning module 970 and network model 950 to predict future overall resource utilization. Thus, in certain embodiments, the measurements of overall resource use described herein are recorded in network model 950 and used by data store 400 to determine whether to send information to the next data store 400 in ring 800.

In certain embodiments, learning module 970 uses learning process 900, testing module 960, and network model 950 to predict future overall resource utilization and to determine whether to send information to the next data store in ring 800.

FIG. 14 is a flow chart illustrating an embodiment of learning process 900, in which data store 400 and learning module 970 use network model 950 and testing module 960 to predict future resource use and updates network model 950 based on the evaluation of said predictions. After each step in learning process 900, learning module 970 proceeds to the next step in learning process 900. In testing step 910, testing module 960 initiates a test of overall resource utilization. In predicting step 920, learning module 970 uses network model 950 and the results of the test performed by testing module 960 in testing step 910 to predict future overall resource utilization. In transmitting step 930, data store 400 either transmits information or does not transmit information based on the prediction made by learning module 970 in predicting step 920. In either case, data store 400, via testing module 950, tests overall resource utilization again in transmitting step 930. In feedback-evaluating step 940, learning module 970 updates network model 950. It is understood that learning module 970 and learning process 900 use machine learning techniques to perform predictions and update network model 950. Feedback-evaluating step 940 provides feedback to the learning algorithm used. In certain embodiments, the learning algorithm is Vapnik's SVM algorithm. However, a wide variety of machine learning algorithms may be used such as, for example, non-probabilistic binary linear classifiers, nonlinear classifiers, Bayesian classifiers, hidden Markov models, and neural networks. Also, machine learning algorithms enabled by Waikato Environment for Knowledge Analysis (WEKA) may be used. We believe that Vapnik's SVM algorithm works well in certain embodiments of the invention because it works well in a high-dimensional setting. High-dimensional settings are settings where there are many variables.

Because we speculate that a ring 800 performs better when a ring 800 is comprised of no more than eighty data stores 400, certain embodiments of the invention overcome this limitation by configuring into multiple communications rings, or multirings. As can be observed, this embodiment reduces the time required to transmit a message to each data store 400 in the network. An embodiment of such a configuration is illustrated in FIG. 15.

Figure 15:
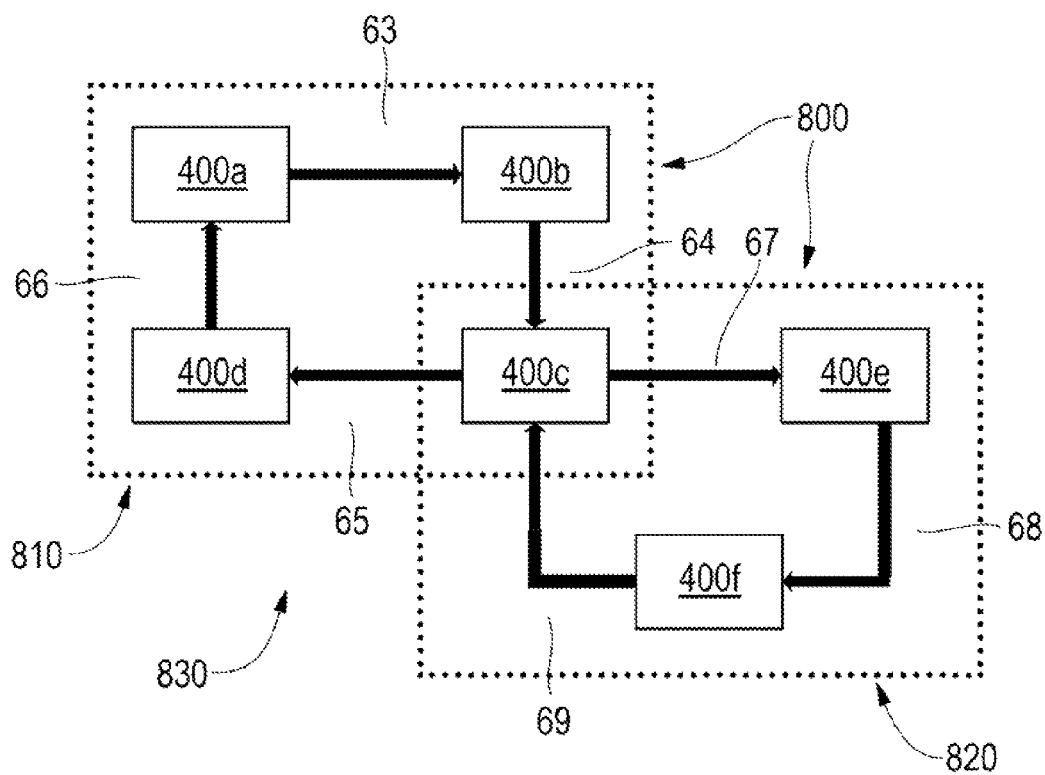
FIG. 15 is a block diagram depicting an embodiment of a global address space configured in a multi-ring pattern.

FIG. 15 illustrates certain embodiments of the invention in which the data stores 400 are configured such that they communicate through multiple rings 800. First ring 810 and second ring 820 are each a ring 800, and are connected to form a multiring 830. As shown in FIG. 15, first ring 810 contains data stores 400*a*, 400*b*, 400*c*, and 400*d*; and second ring 820 contains data stores 400*c*, 400*e*, and 400*f*. Data stores 400*a*-400*f* are all data stores 400. Data store 400*a* and data store 400*b* are in communication via first connection 63. Data store 400*b* and data store 400*c* are in communication via second connection 64. Data store 400*c* and data store 400*d* are in communication via third connection 65. Data store 400*d* and data store 400*a* are in communication via fourth connection 66. Data store 400*c* and data store 400*e* are in communication via fifth connection 67. Data store 400*e* and data store 400*f* are in communication via sixth connection 68. Data store 400*f* and data store 400*c* are in communication via seventh connection 69. Connections 63, 64, 65, 66, 67, 68, and 69 are made through network 60. In many embodiments, connections 63, 64, 65, 66, 67, 68, and 69 represent logical, rather than physical, connections.

Information may be received by a logic process 420 or synthesized by an evaluating process 621. Either logic process 420 or evaluating process 621 may directly access a data store 400, and either may indirectly access a data store 400 via a communication system 440 (further demonstrating the multi-instance distributed operation of communication system 440 and data store 400). When either a logic process 420 or an evaluating process 621 accesses a data store 400 in such a fashion that alters one or more data records 430 contained in data store 400, said data store 400 may communicate that change to a data record 430 throughout multiring 830. The process by which data records 430 are updated is described more fully in connection with FIG. 12. As described in the following paragraph, a change may occur first on data store 400*a*, but a change may occur first on any data store 400.

If a change occurs first on data store 400*a*, data store 400*a* begins the process by sending information to data store 400*b* via first connection 63. In turn, data store 400*b* sends said information to data store 400*c* via second connection 64. Data store 400*c* then sends said information to data store 400*d* via third connection 65 and to data store 400*e* via fifth connection 67. Data store 400*d* then sends, via fourth connection 66, confirming information to data store 400*a* that all data stores 400 in first ring 810 have received the information. After data store 400*e* receives the information, data store 400*e* sends said information to data store 400*f* via sixth connection 68. Data store 400*f* then sends, via seventh connection 69, confirming information to data store 400*c* that all data stores 400 in second ring 820 have received the information. In this fashion, a data store 400 can send information to each other data store 400 in multiring 830.

In certain embodiments, data stores 400 may be configured to form multiring 830 and may perform the network testing and load prediction techniques described herein.

In certain embodiments, the data stores 400 are configured to automatically assemble into rings 800 forming multiring 830. In such an embodiment, data stores 400*a*, 400*b*, 400*c*, and 400*d* join first ring 810 until a predetermined maximum number of data stores 400 join first ring 810. FIG. 15 implies that the maximum number is 4, but any number may be used. After a first ring 810 contains the maximum number of data stores 400, the next data store 400 to attempt to join multiring 830 forms a second ring 820 containing the newly joining data store 400 and one data store 400 that is contained in a first ring 810. As shown by FIG. 15, when data store 400*e* attempts to join multiring 830, data store 400*e* creates second ring 820 containing only data stores 400*c* and 400*e*. Data store 400*e*, or any data store creating a new ring 800, may use any suitable selection technique for selecting which preexisting data store to choose. After second ring 820 is created, newly joining data stores 400 join second ring 820. As shown by FIG. 15, when data store 400*f* attempts to join multiring 830, data store 400*f* joins second ring 820. In this process, first ring 810 is a so-called first level ring, and second ring 820 is a so-called second level ring. New data stores 400 may join multiring 830 until each data store 400 in a first level ring is also a member of a second level ring. Then, when new data stores 400 attempt to join multiring 830, a new ring 800 is created containing only the new data store 400 and a data store 400 contained in a second level ring, thereby creating a third level ring. This process may be repeated ad infinatum, as permitted by available host and network resources.

As used herein, the term "supernode" means a data store 400 that is a member of more than one ring (for example, by being a member of a first level ring and a second level ring). As an example, data store 400c in FIG. 15 is a supernode.

It is understood that supernodes must use more resources than non-supernodes to communicate information to other data stores 400. This is shown, for example, in FIG. 15, whereby data store 400c must send information to both data store 400d and data store 400e. It is also understood that a data store 400 may run on a host 170 along with other processes described herein as running on a host 170. Different hosts 170 may be configured to have different resources available. For example, some hosts 170 may have faster or a greater number of processors, more memory, or may be connected to higher speed or less congested portions of network 60. Alternatively, the processes running on some hosts 170 may require more system resources than the processes running on other hosts 170. Therefore, it is desirable to reconfigure multiring 830 such that multiring 830 does not necessitate that a host 170 with low available resources be a supernode.

Certain embodiments automatically detect underutilized and overutilized hosts 170 and reconfigure multiring 830 to make underutilized hosts 170 supernodes and to make overutilized hosts 170 which are supernodes not act as supernodes.

Using FIG. 15 as an example, if data store 400c is overutilized and data store 400e is underutilized, multiring 830 may swap data store 400c and data store 400e. In this process, data store 400e becomes a member of ring 810. Then, data store 400c becomes a member of ring 820 and is removed from ring 810. By this process, data store 400e becomes a supernode.

Although FIG. 15 shows two rings 800, any number of rings 800 may be used, and each ring 800 may contain any number of data stores 400. However, we speculate that the performance of ring 800 is better if a ring 800 contains not more than eighty data stores 400.

Figure 16A:
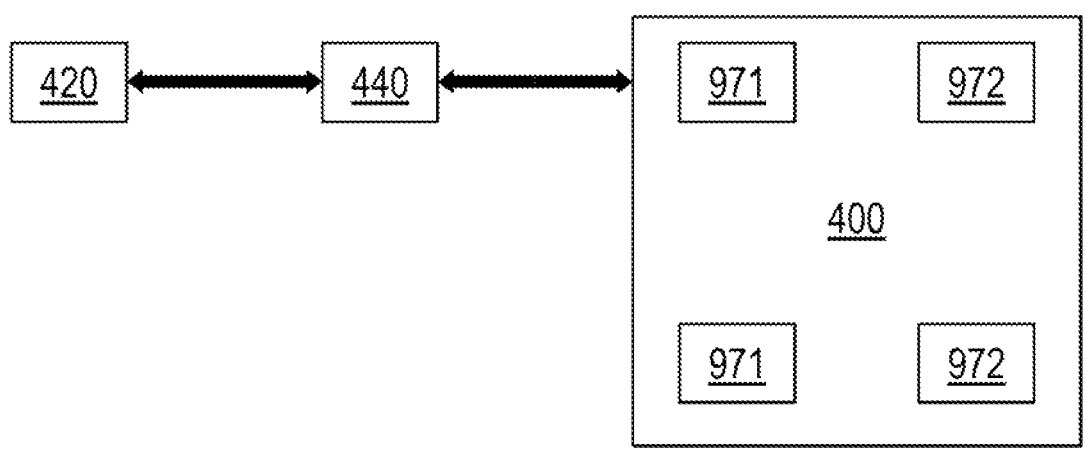
FIG. 16A is a block diagram illustrating a logic process communicating with a data store via a communication system.

FIG. 16A illustrates an embodiment of the invention where logic process 420 communicates with (interfaces with) data store 400 using (through) communication system 440. Logic process 420 requests or transmits information to communication system 440. Communication system 440 analyzes the information communicated to it by logic process 420, and adds, updates, alters, or retrieves information to or from data store 400. Communication system 440 then communicates to logic process 420 a response to said request or transmittal of information. As discussed more fully in the description of FIG. 16B, the data store 400 may contain one or more topics 971 and one or more communicative-values 972. Topics 971 and communicative-values 972 may be stored in one or more data records 430, which may be variable records 770.

Figure 16B:
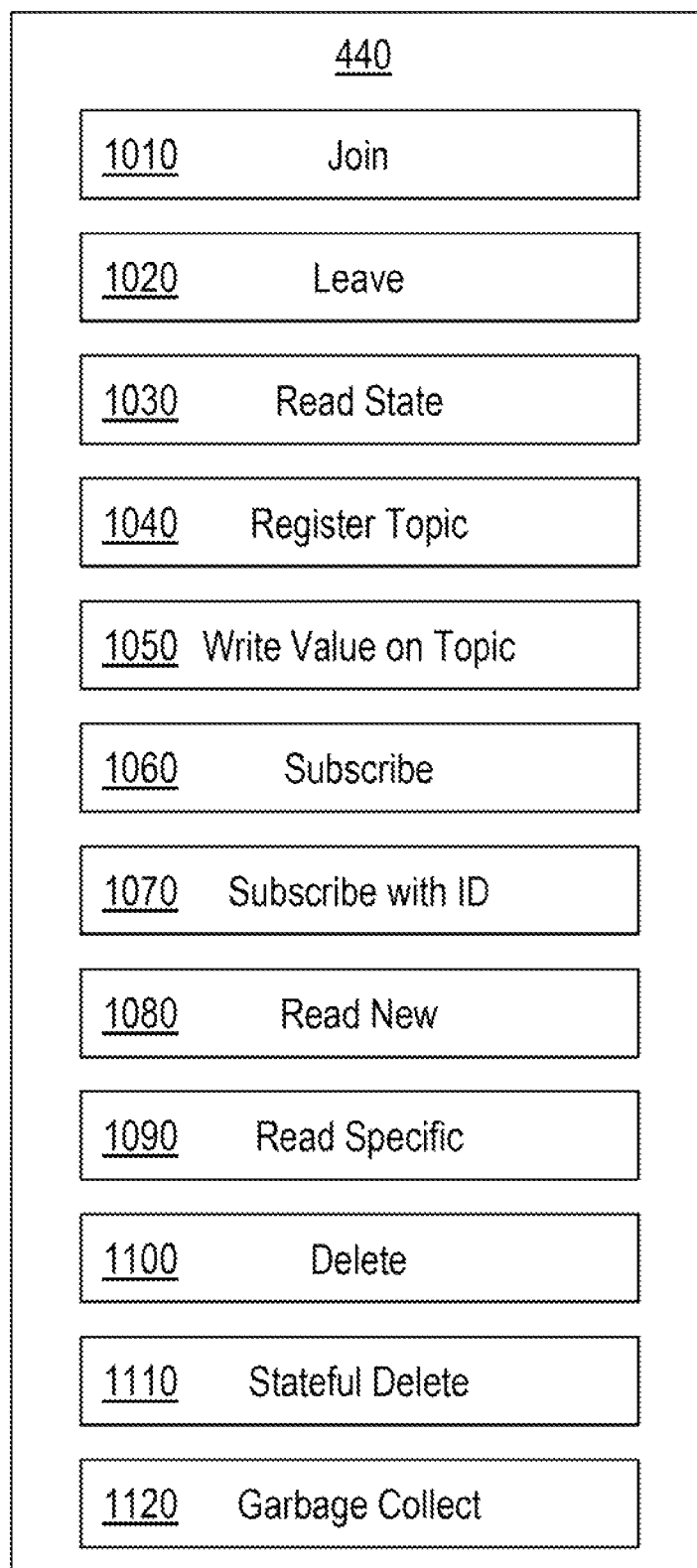
FIG. 16B is a block diagram illustrating a group communication system.

FIG. 16B is a diagram showing a group communication framework, and further illustrates how logic process 420 communicates with data store 400 via communication system 440. It is understood that each step depicted by FIG. 16B is performed when logic process 420 requests or transmits information to communication system 440. The actions that correspond to steps 1010 through 1120 cause information to be stored in one or more data records 430 in data store 400. In particular, topics 971 and communicative-values 972 may be stored in one or more data records 430. It is also understood that there may be multiple hosts 170 each containing one or more logic processes 420 and one or more communication systems 440. It is understood that a logic process 420 may communicate with another logic process 420 by sending information to communication system 440, which in turn sends information to data store 400, which in turn may communicate information with other data stores 400, thereby making said information available to the other communication systems 440 and in turn to other logic processes 420. In certain embodiments, steps 1010 through 1120 are all Java API methods available to be called or executed by code running in a logic process 420. It is understood that the group communication framework may also be a publish-subscribe framework.

Figure 16C:
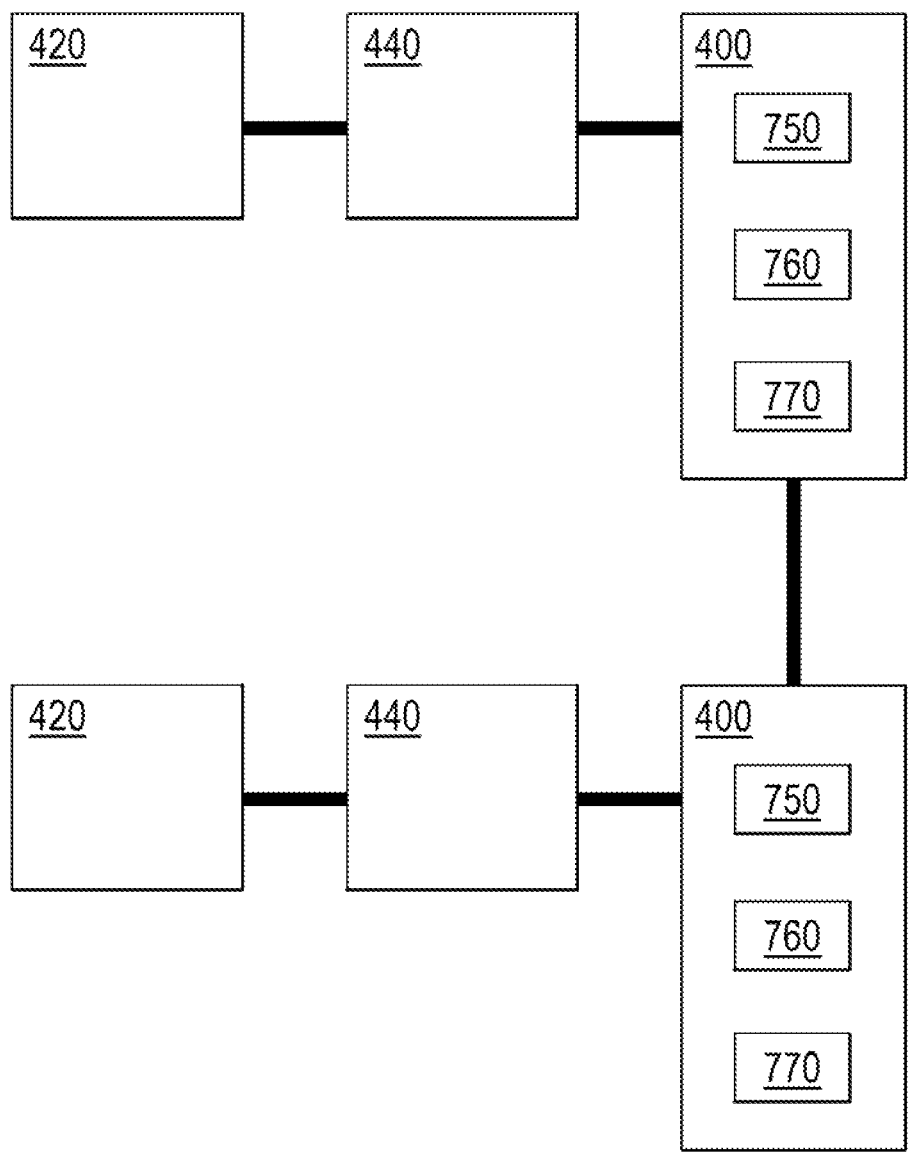
FIG. 16C is a block diagram illustrating how a group communication system uses a global address space.

In joining step 1010, logic process 420 joins a group. In certain embodiments, each group has a name, a list of members, a list of readers, and a list of changemakers (members which have requested addition to or removal from the group). These attributes are stored by communication system 440 in data store 400 in group record 750 (FIG. 16C). Group record 750 stores information which represents whether the group membership has changed. Group state may be "stable" or "unstable." When a logic process 420 requests to join a group, communication system 440 adds logic process 420 to a list containing group membership information—the list of members. Communication system 440 also adds logic process 420 to a list of changemakers, sets the group state to be unstable, and removes all entries from the list of readers.

In leaving step 1020, logic process 420 leaves a group. When a logic process 420 requests to leave a group, communication system 440 updates group record 750 (FIG. 16C) to remove logic process 420 from the list containing group membership information in group record 750. Communication system 440 also updates record 750 by adding logic process 420 to a list of changemakers, setting the group state to be unstable, and removing all entries from the list of readers.

In group state reading step 1030, logic process 420 requests the current state of the group from communication system 440, which retrieves information related to the group from group record 750 (FIG. 16C) stored in data store 400. After retrieving said information, communication system 440, sends said information to logic process 420, which then reads said information representing the state of the group for which information was requested. In certain embodiments, logic processes 420 periodically check the current state of a group via communication system 440. If the group state read by logic process 420, after retrieval by communication system 440, is stable, communication system 440 takes no further action. If group state is unstable, then communication system 440 examines and records the then current changemakers list. If the then current changemakers list indicates that the group membership has changed since the last time logic process 420 has accessed group state (for example, if there are more entries in the changemakers list than previously recorded), then communication system 440 reads the current membership of the group and adds logic process 420 to the list of readers. If the changemakers list indicates that the group membership has not changed since the last time logic process 420 has accessed group state, then communication system 440 does not read the current membership of the group.

In registering step 1040, logic process 420 registers a topic 971. Communication system 440 assigns a unique number with a topic 971 and records the name of the topic 971, along with other information necessary to carry out the functions communication system 440, in data store 400. This may be recorded in, for example, a data record 430 such as variable 770 (FIG. 16C). Accordingly, other logic processes 420 may access topic 971 (including any information stored in said data record 430 associated with said topic 971). Any number of topics 971 may be registered by the communication system 440.

In publishing step 1050, logic process 420 transmits a communicative-value 972 corresponding to a topic 971. After a topic 971 is registered in communication system 440, logic process 420 may transmit newly measured or synthesized data associated with said topic 971 to communication system 440 by publishing a communicative-value 972 on a topic 971. Communication system 440 ensures that logic process 420 is permitted to publish communicative-values 972 on said topic 971. Communication system 440 records the total number of communicative-values 972 published on each topic 971, sequentially orders published communicative-values 972, and associates a sequence number with each published communicative-value 972 corresponding to the order in which the communicative-values 972 were published. Communication system 440 then transmits information to data store 400, which stores including said information and said sequence number in a value 971. Data store 400 records one or more values 971 in one or more data records 430 which may be variable records 770 (FIG. 16C). It is understood that logic process 420 may publish a first communicative-value 972 on a topic 971, a second communicative-value 972 on a topic 971, and so on. The first communicative-value 972 published on a topic 971 may be associated with the number, one; and the second value published on a topic may be associated with the number, two. Accordingly, communication system 440 records the ordering of the sequence of communicative-values 972 published on a topic 971.

In subscribing step 1060, logic process 420 subscribes to a published topic 971 by requesting a subscription from communication system 440. Logic process 420 also provides a variable representing time duration to communication system 440 indicating the period of time for which logic process 420 requires communication system 440 to retain information for use by logic process 420. This is called a lease period. Lease periods, time of publication, and other time values are synchronized in the network using any suitable time synchronization method such as NTP or DNT algorithms including, without limitation, Mattern's GVT algorithm. Communication system 440 ensures that logic process 420 is permitted to access said topic 971 and communicative-values 972 published on said topic 971. If so, communication system 440 records that fact and permits logic process 420 to subscribe. In addition, communication system 440 generates a unique number to identify the subscription of logic process 420 to said topic. The subscription information is recorded in a data record 430 such as variable record 770 (FIG. 16C).

In alternate subscribing step 1070, logic process 420 subscribes to a published topic 971 by requesting a subscription from communication system 440. Alternate subscribing step 1070 differs from subscribing step 1060 in that logic process 420 provides to communication system 440 the unique identifier that has already been created to associate logic process 420 with said topic 971. Communication system 440 verifies that the lease period for logic process 420 has not expired and retrieves the appropriate state record 760 from data store 400. Communication system 440 then transmits the state information stored in state record 760 to logic process 420 along with the sequence number of the most recently evaluated and processed value. Alternate subscribing step 1060 may be used where a logic process 420 is terminated and a replacement logic process 420 is deployed by deployer 160. This step is used by embodiments of the invention to achieve the property of reconfigurability described herein.

In new value reading step 1080, logic process 420 requests and communication system 440 provides, if available, the newest communicative-value 972 published on a requested topic 971. Communication system 440 provides this information by accessing the appropriate communicative-value 972 along with any appropriate variable records 770 from data store 400. Communication system 440 uses information it retrieves from communicative-value 972 and any retrieved variable records 770 to verify that logic process 420 is permitted to access communicative-values 972 associated with said topic 971. Communication system 440 also records the fact that logic process 420 has read said communicative-value 972 on said topic 971 in a variable record 770 in data store 400.

In certain embodiments, if a communicative-value 972 associated with the next expected sequence number to be published on a topic 971 does not yet exist in data store 400 as apparent to communication system 440, then the sequence number associated with the most recently published communicative-value 972 on said topic 971 is retrieved. This is the then maximum sequence number. If the then maximum sequence number is greater than or equal to the next expected sequence number, then communication system 440 deduces that the next expected sequence number has already been removed from the communications system 440 and data store 400 by the communications system 440 in garbage collecting step 1110. If the then maximum sequence number is less than the next expected sequence number, then the next expected sequence number has not been published yet. If the next expected sequence number exists, then the communicative-value 972 associated with said sequence number may be retrieved and transmitted to logic process 420 by communication system 440.

In ordered value reading step 1090, logic process 420 requests and communication system 440 provides, if available, the communicative-value 972 published on a requested topic 971 associated with a particular sequential order number associated with said communicative-value 972. In this step, logic process 420, for example, may request the fifth communicative-value 972 published on a topic 971. Communication system 440 then retrieves, if available, the appropriate communicative-value 972 and variable records 770 from data store 400. If appropriate information is available, communication system 440 provides to logic process 420 the fifth communicative-value 972 that was published. Communication system 440 also verifies that logic process 420 is permitted to access communicative-values 972 associated with said topic 971 by accessing and analyzing the contents of the communicative-value 972 and one or more retrieved variable records 770 from data store 400. Communication system 440 also records in one or more variable records 770 in data store 400 the fact that logic process 420 has read said communicative-value 972 on said topic 971. This process may be performed for any of the sequentially published values.

In deleting step 1100, logic process 420 indicates that it has finished using a communicative-value 972. More than one logic process 420 may be required to read and process any given communicative-value 972. After logic process 420 has read and processed a communicative-value 972, then it communicates to communication system 440 that it has finished processing said communicative-value 972. Communication system 440 then records the fact that logic process 420 has finished processing said communicative-value 972 in a variable record 770 in data store 400. Communication system 440 does not delete data during deleting step 1100, but merely indicates that the data is no longer needed by the particular logic process 420. Data is actually removed from data store 400 in garbage collecting step 1120.

In stateful deleting step 1110, a logic process 420 indicates that it has finished using a value and directs communication system 440 to store its state. Stateful deleting step 1110 and deleting step 1100 may be performed independently, and certain embodiments of the invention may implement stateful deleting step 1110 without implementing deleting step 1100. In addition to performing all the steps of deleting step 1100, in stateful deleting step 1110, communication system 440 also records the state of logic process 420 in data store 400 in a state record 760. As can be understood, stateful deleting step 1110 and alternate subscribing step 1070 are logically linked. Stateful deleting step 1110 stores the state of logic process 420 in a state record 760 in data store 400. Alternate deleting step 1070 is the counterpart of stateful deleting step 1110 in that, in alternate deleting step 1070, a prior state of logic process 420 is retrieved from (and is loaded into) logic process 420. The combination of alternate deleting step 1070 and stateful deleting step 1110 effectively provide the property of reconfigurability by allowing the behavior of hosts 170 to be altered by replacing logic processes 420 on hosts 170.

It is understood that all of, or a portion of, the information stored in logic process 420 is considered the "state" of said logic process 420. In certain embodiments, the state of a logic process 420 may include current or past values that have been published on topics to which logic process 420 subscribes and has read via subscribing step 1060 or alternate subscribing step 1070. These values may be information obtained via an input 20 or synthesized by logic process 420 in evaluating process 621, and more specifically in evaluating step 630. It is understood that in storing step 640, logic process 420 performs publishing step 1050. It is also understood that logic process 420 can serialize its state into a single variable. In certain embodiments, this is accomplished by encoding all of the variables comprising the state of logic process 420 into a single string variable. Any suitable encoding and decoding scheme may be used.

It is understood that in alternate subscribing step 1070, logic process 420 retrieves a state for logic process 420. In certain embodiments, logic process 420 decodes the state retrieved in subscribing step 1070 and sets the current value of each variable of logic process 420 to the value stored in the retrieved state. In this fashion, control process 410 may turn off a logic process 420 (see FIGS. 10 and 11), receive a new logic process 420 with different properties from deployer 160 and turn on the new logic process 420. The new logic process 420 can then load all of the information that was previously contained in the old logic process 420 into the new logic process 420.

In garbage collecting step 1120, a process removes any values stored in data store 400 that are no longer needed by communication system 440. A value is no longer needed by communication system 440 if all logic processes 420 that have subscribed to the topic on which a value was published no longer need that value. A logic process 420 does not need a value if either (1) that logic process indicated that it has finished using said value by performing deleting step 1100; or (2) the lease period has expired for said topic subscription for said logic process 420. In other words, communication system 440 does not need a value if enough time has passed or if all logic processes 420 have finished using a communicative-value 972. As can be appreciated, garbage collecting step 1120 allows the communication system 440 to publish only one communicative-value 972 for each newly acquired or synthesized piece of information. This is because deletion of any such communicative-value 972 does not occur until after logic processes 420 have finished using said communicative-value 972. This step allows for more efficient use of resources.

FIG. 16C describes how communication system 440 updates records in 430 in data store 400 to accomplish the steps described in FIG. 16B. Data store 400 contains any number of data records 430. Group record 750, state record 760, and variable record 770 are all data records 430. Data store 400 may contain any number of group records 750, state records 760, or variable records 770.

Example 3

Figure 17:
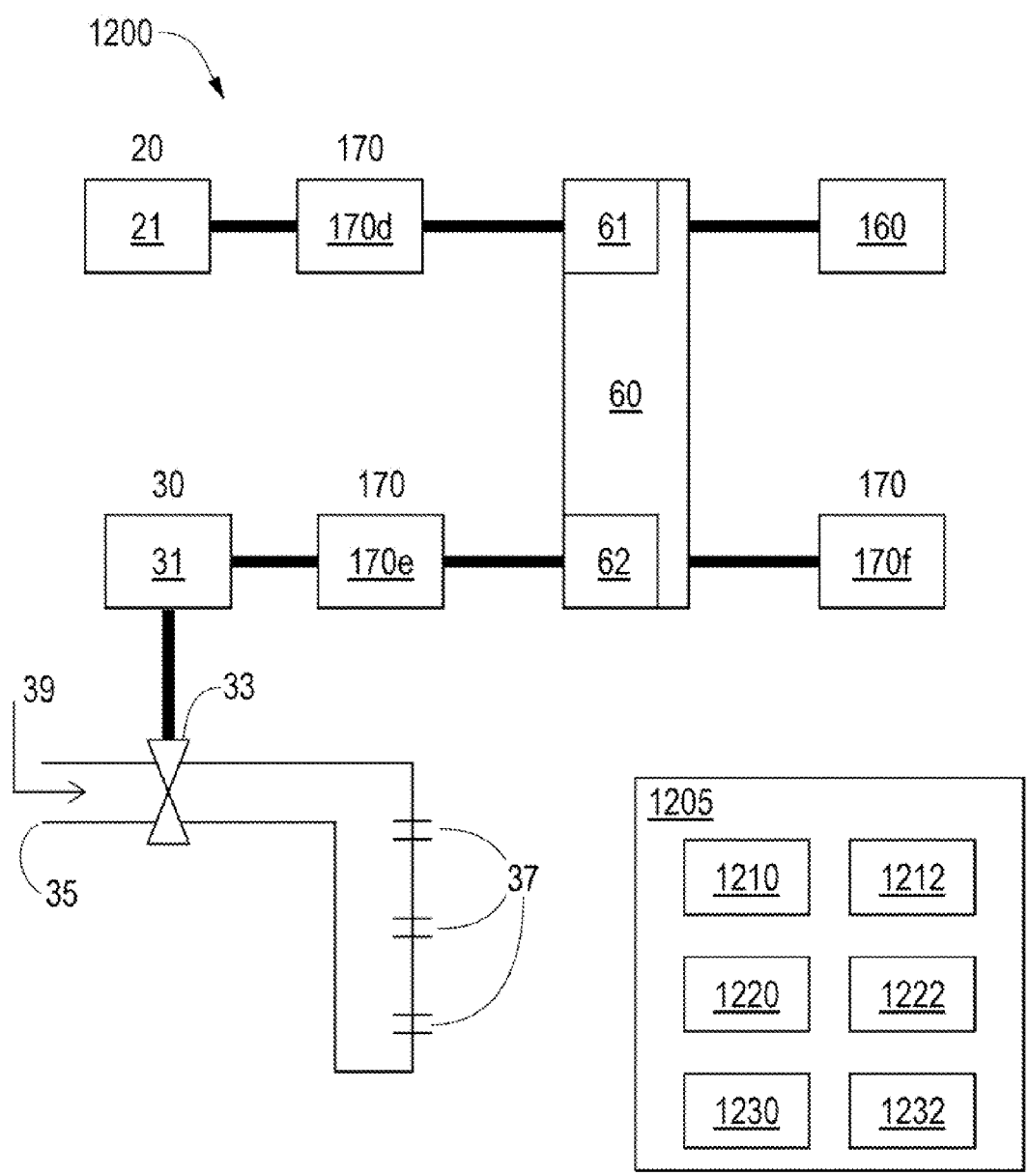
FIG. 17 a schematic diagram of an exemplar embodiment.

FIG. 17 illustrates an exemplar golf course watering system 1200 (demonstrating how a logic process 420 can communicate with another logic process 420 through the use of data stores 400 as enabled by communication system 440). Instrument 21 is an input 20 that measures soil moisture content. Hosts 170d, 170e, and 170f are hosts 170 and are each connected to network 60. Host 170d is connected to first subnetwork 61. Host 170e is connected to second subnetwork 62. First subnetwork 61 and second subnetwork 62 are wireless networks which form part of network 60. Although not shown, each host 170 contains a data store 400, a communication system 440, a control process 410, a logic process 420, an evaluating process 621 and other components as disclosed herein. Host 170d is connected to instrument 21. Golf course data store 1205 represents, collectively, the data stores 400 of hosts 170d, 170e, and 170f. Deployer 160 is connected to network 60. Although not shown, deployer 160 may be connected to a model generator 130, analyzer 140, and compiler 150. Solenoid 31 is an output 30. Solenoid 31 is connected to host 170e. Solenoid 31 is also connected to valve 33. Valve 33 is coupled to pipe 35. Sprinklers 37 are connected to pipe 35. Water 39 flows into pipe 35. When valve 33 is open, water 39 flows through sprinklers 37 to irrigate golf course grounds. This example 3 shows how golf course watering system 1200 measures soil moisture content to control valve 33; how a logic process 420 may be redeployed; and how golf course watering system 1200 operates in the event that first subnetwork 61 becomes unoperational.

Hosts 170d and 170e are ARM-based embedded linux systems powered by lithium ion battery power and solar power.

Host 170d and 170e, as well as first subnetwork 61 and second subnetwork 62 are in the outside environment, whereas network 60, deployer 160, and host 170f may be in a data room under controlled conditions.

Deployer 160 deploys unique logic processes 420 to hosts 170d, 170e, and 170f. A control process 410 on each host loads the appropriate deployed logic process 420 into machine 180.

Hosts 170d, 170e, and 170f each use their respective communication system 440 to join a group. It is understood that a logic process 420 performs this operation, as is disclosed elsewhere herein. For convenience, this example will state that hosts 170d, 170e, and 170f are perform actions, although it is understood that such actions are performed by components contained within each host, as described more fully elsewhere herein. Additionally, the term "communication system" 440 in example 3 refers collectively to each communication system 440 (and accompanying data store 400) residing on each host 170.

Host 170d registers moisture topic 1210 in communication system 440. Host 170d begins to take repeating measurements of soil moisture using instrument 21. For each measurement of soil moisture, host 170d publishes a corresponding moisture value 1212 to moisture topic 1210 using communication system 440. After each moisture value 1212 is published using communication system 440 (and transmitted to data store 400), the published moisture value 1212 will propagate to each data store 400 (as disclosed elsewhere herein).

Host 170*f* registers sprinkler control topic 1220 in communication system 440.

Host 170*e* subscribes to sprinkler control topic 1220 using communication system 440.

Host 170*f* subscribes to moisture topic 1210 using communication system 440, and repeatedly receives each moisture value 1212 published by host 170*d*. New moisture values 1212 are received and processed according to logic loop 600 (FIG. 11). Each time host 170*f* receives a new moisture value 1212, the moisture value 1212 is evaluated by evaluating process 621. In this example, host 170*f* evaluates (in evaluating process 621) the current time, the currently received moisture value 1212, as well as previously received moisture values 1212 and associated times. Said evaluation is performed in evaluating process 621 according to logic determined by model generator 130, analyzer 140, and compiler 150. The evaluation may be, for example, "if moisture content has been below a threshold amount for more than eight hours, and the current time is after 6:00 P.M., then publish 'on' to the sprinkler control topic." If, based on said evaluation, host 170*f* determines that it should publish a new sprinkler control value 1222, it does so. Thus, host 170*f* evaluates the moisture content of the soil, determines whether to turn the sprinkler on or off, and possibly publishes a sprinkler control value 1222 on sprinkler control topic 1220.

As it has subscribed to sprinkler control topic 1220, host 170*e* repeatedly receives each sprinkler control value 1222 published by host 170*f*. New sprinkler control values 1222 are received and processed according to logic loop 600 (FIG. 11). Each time host 170*e* receives a new sprinkler control value 1222, the sprinkler control value 1222 is evaluated by evaluating process 621. In this example, the evaluating logic in evaluating process 621 determines whether host 170*f* has instructed sprinklers 37 to be on or off. If evaluating process 621 in host 170*e* determines that it has been instructed to turn the sprinkler on, host 170*e* directs solenoid 31 to open valve 33, allowing water 39 to flow to the sprinklers 37. If evaluating process 621 in host 170*e* determines that it has been instructed to turn the sprinkler off, host 170*e* direct solenoid 31 to close valve 33, restricting the flow of water 39 to the sprinklers 37.

Host 170*e* may also register solenoid status topic 1230 to which host 170*f* subscribes. Host 170*e* repeatedly measures the status of solenoid 31 and publishes a solenoid status value 1232 on solenoid status topic 1230. Host 170*f* then, effectively, can receive direct feedback from the solenoid 31 and indirect feedback from instrument 21. Accordingly, host 170*f* may have other actions it can take when solenoid 31 become unoperational. For example, host 170*f* could send an email or text message to a supervising groundskeeper. Alternatively, in other embodiments, there may be more than one solenoid 31, valve 33, pipe 35, connected to sprinklers 37. If one solenoid 31 is unable to open and provide water 39, then other solenoids 31 could be directed to open a valve 33, allowing the golf course watering system 1200 to operate in the event of equipment failure.

As may be observed this example may apply to other situations, such as situations where other resources are used (including, without limitation, electricity and oil), there may be varying costs associated with use of each resource. Thus, evaluating process 621 may be configured such that, where a lower cost resource may be used, it will be used. The cost of such resources may be published to the communication system 440. Therefore, evaluating process may continually reevaluate the availability and cost of resources to achieve a desired goal.

Unreliable Network

Example 3 operates under potentially unreliable conditions. For example, host 170*d* (or 170*e*) may run out of battery power and the then currently available solar power may not be enough to power host 170*d*. Therefore, host 170*d* could remain shut off for a period of time. Additionally, first subnetwork 61 (or second subnetwork 62) may have interference which temporarily interrupts communications. In either case, there is the possibility that, during the operation of system 1200, that portions of system 1200 may become disconnected.

In the event that first subnetwork 61 becomes unoperational, host 170*d* will continue to measure soil moisture and publish new moisture values 1212 on the moisture topic 1210 via communication system 440 to its local data store 400. However, the newly published moisture values 1212 will not be received (and thus, not read) by host 170*f*. However, host 170*f* will continue to evaluate newly published solenoid status values 1232 and will continue to publish new sprinkler control values 1222.

As an example, if first subnetwork 61 becomes unoperational after host 170*f* has published a sprinkler control value 1222 on sprinkler control topic 1220, instructing solenoid 31 to open valve 33, host 170*f* may, in addition to evaluating newly published moisture values 1212, evaluate the period of time solenoid 31 has been in a state causing valve 33 to allow water 39 to flow through pipe 35. Thus, host 170*f* may publish a sprinkler control value 1222 to sprinkler control topic 1220 directing solenoid 31 to close valve 33 based on the fact that solenoid 31 has been open for too long.

Redeployment

For any number of reasons, it may be desirable to have the logic on host 170*f* changed. For example, a new host 170 may be added to the system 1200 with, for example, new inputs or outputs. Alternately, a groundskeeper may desire to alter the operational logic of host 170*f* because, for example, the seasons change or a course needs repair. Host 170*f* may be altered without restarting host 170*f* and without resetting any operational information that host 170*f* has stored locally. The redeployment process is described in more detail in connection with FIGS. 10, 11, and 16B.

In example 3, after host 170*f* reads, evaluates, and acts on a newly published value, it saves its current state, as is described more fully in stateful deleting step 1110. If host 170*f* receives a message from deployer 160 instructing host 170*f* to execute new logic, new logic may be deployed. Host 170*f* then retrieves the appropriate state of its logic, as is described more fully in alternate subscribing step 1070. Host 170*f* may then continue to process newly published values.

If, for example, deployer 160 instructs host 170*f* to deploy new logic when valve 33 is open, the new logic deployed in host 170*f*, has all of the same knowledge has the previously deployed logic. Thus, host 170*f* knows, for example, how long water 39 has been flowing through sprinklers 37. If host 170*f* did not retrieve the state as it does, host 170*f* may keep water 39 flowing through sprinklers 37 for too long.

Example 3 is provided as an instructional example. As precise operation becomes increasingly important (for example, in the control of operations in a nuclear power plant or in the control of military weapons systems or critical enterprise resource systems), the importance of the intelligent redeployment described herein becomes apparent.

The foregoing description of the embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

Embodiments of the systems 10, 100, 201, 300, and 1200 and/or components thereof, can be implemented in hardware and/or software. Further, it will be obvious to those having skill in the art that many changes may be made to the details of the above-described embodiments without departing from the underlying principles of the invention. For example, any suitable combination of the components of the systems 10, 100, 201, 300 and/or 1200 is possible. The scope of the present invention should, therefore, be determined only by the following claims.

What is claimed is:

1. A system comprising:
   a first networked node comprising: a first computer, a first data store, a first control process, a first one or more logic processes, a first one or more evaluating processes, and a first communication system, said first control process having a capability to deploy said first one or more logic processes, and said first one or more logic processes each having a capability to cause said first one or more evaluating processes to begin,
   said first data store, said first control process, said first one or more logic processes, said first evaluating process, and said first communication system operating on said first computer, and
   a second networked node comprising: a second computer, a second data store, a second control process, a second one or more logic processes, a second one or more evaluating processes, and a second communication system, said second control process having a capability to deploy said second one or more logic processes, and said second one or more logic processes each having a capability to cause said second one or more evaluating processes to begin, said second data store, said second control process, said second one or more logic processes, said second one or more evaluating processes, and said second communication system operating on said second computer, and
   wherein said first data store provides access to a global address space and said second data store provides access to said global address space,
   wherein data is available in said global address space,
   wherein said first networked node and said second networked node are networked together, and
   wherein said first one or more logic processes is capable of retrieving said data from said global address space via said first communication system,
   wherein said second one or more logic processes is capable of retrieving said data from said global address space via said second communication system,
   wherein said first control process is capable of deploying a first one of said first one or more logic processes with a first set of instructions,
   wherein said first one of said first one or more logic processes is capable of causing a first one of said first one or more evaluating processes to begin executing said first set of instructions, and
   wherein said first one of said first one or more evaluating processes is capable of evaluating said data to synthesize a first result using said first set of instructions,
   wherein said first one of said first one or more evaluating processes is capable of storing said first result as said data in said global address space via said first communication system,
   wherein said first one of said first one or more logic processes is capable of causing a second one of said first one or more evaluating processes to begin executing said first set of instructions.

2. The system according to claim 1, wherein said first data store and said second data store operate as key-value stores.

3. The system according to claim 2, wherein said global address space operates as a key-value store.

4. The system according to claim 1, wherein said first one or more logic processes is capable of altering said data in said global address space via said first communication system, wherein said second one or more logic processes is capable of altering said data in said global address space via said second communication system, and
   wherein said first communication system and said second communication system are publish-subscribe communication systems.

5. The system according to claim 1, wherein said first data store contains a first local copy of said data available in said global address space and said second data store contains a second local copy of said data available in said global address space.

6. The system according to claim 5, wherein when first information of said data available in said global address space is altered in said first data store, said second local copy of said data available in said global address space in said second data store is updated correspondingly with altered said first information.

7. The system according to claim 6, further comprising a plurality of additional networked nodes, each additional networked node comprising an additional computer and an additional data store, each of said plurality of additional data stores providing access to said global address space, wherein said first networked node, said second networked node, and said plurality of additional networked nodes are networked together.

8. The system according to claim 7, wherein said plurality of additional data stores each contain an additional local copy of said data available in said global address space.

9. The system according to claim 8, wherein when said first information of said data is altered in said first data store, each of said additional local copies is updated correspondingly with said altered first information.

10. The system according to claim 9, wherein when second information of said data available in said global address space is altered in said second data store, said first local copy and said additional local copy in each of said plurality of additional data stores are updated correspondingly with said altered second information.

11. The system according to claim 10, wherein said first data store, said second data store, and said plurality of additional data stores are configured to cause updates of said first local copy and said additional local copy in each of said plurality of additional data stores to propagate according to a pattern.

12. The system according to claim 11, wherein said pattern is a ring.

13. The system according to claim 11, wherein said pattern is a multiring.

14. The system according to claim 13, wherein said first data store, said second data store, and said plurality of additional data stores, collectively, have a capability to reconfigure said pattern.

15. The system according to claim 14, wherein said reconfiguration capability can be selectively invoked to swap a selected two of said first data store, said second data store, and said plurality of additional data stores.

16. The system according to claim 15, wherein said reconfiguration capability also includes a capability to select said selected two of said first data store, said second data store, and said plurality of additional data stores.

17. The system according to claim 12, wherein said first data store, said second data store, and said plurality of additional data stores each further comprises respectively a testing module, wherein said testing modules have the capability to collectively perform a test of resources available to a set of ringed computers selected from the group comprised of said first computer, said second computer, and said plurality of additional computers, each respective one of said set of computers associated with a respective one of said testing modules, and wherein an initiating one of said testing modules in said set of ringed computers has the capability to initiate said test for testing in other ringed computers in said set of ringed computers and to calculate a result based on said test.

18. The system according to claim 13, wherein said first data store, said second data store, and said plurality of additional data stores each further comprises respectively a testing module, wherein said testing modules have the capability to collectively perform a test of resources available to a set of ringed computers selected from the group comprised of said first computer, said second computer, and said plurality of additional computers, each respective one of said set of computers associated with a respective one of said testing modules, and wherein an initiating one of said testing modules in said set of ringed computers has the capability to initiate said test for testing in other ringed computers in said set of ringed computers and to calculate a result based on said test.

19. The system according to claim 1, wherein said first communication system and said second communication system communicate via said global address space.

20. The system according to claim 19,
wherein said first control process is capable of deploying a second one of said first one or more logic processes with a next set of instructions, wherein said second one of said first one or more logic processes is capable of causing a second one of said first one or more evaluating processes to begin executing said next set of instructions,
wherein said first one of said first one or more logic processes further comprises a first state and said execution of said first set of instructions by said first one of said first one or more evaluating processes is stateful,
wherein said second one of said first one or more logic processes further comprises a second state and said execution of said next set of instructions by said second one of said first one or more evaluating processes is stateful.

21. The system according to claim 20,
wherein prior to executing said next set of instructions, said second one of said first one or more logic processes copies said first state into said second state and said first one of said first one or more logic processes causes said first one of said first one or more evaluating processes to stop executing said first set of instructions.

22. The system according to claim 1, wherein said second one of said first one or more evaluating processes is capable of evaluating said data to synthesize a next result using said first set of instructions.

23. The system according to claim 22, wherein said second one of said first one or more evaluating processes is capable of storing said next result as said data in said global address space via said first communication system.

24. The system according to claim 1, wherein said second control process is capable of deploying a first one of said second one or more logic processes with a second set of instructions, and wherein said first one of said second one or more logic processes is capable of causing a first one of said second one or more evaluating processes to begin executing said second set of instructions.

25. The system according to claim 24, wherein said first one of said second one or more evaluating processes is capable of evaluating said data to synthesize a second result using said second set of instructions.

26. The system according to claim 25, wherein said first one of said second one or more evaluating processes is capable of storing said second result as said data in said global address space via said second communication system.

27. The system according to claim 1, wherein said first control process has a capability to deactivate said first one or more logic processes.

28. The system according to claim 26, wherein said first control process has a capability to deactivate said first one or more logic processes.

29. The system according to claim 27, wherein said first control process is capable of deploying a second one of said first one or more logic processes with a next set of instructions, wherein said second one of said first one or more logic processes is capable of causing a second one of said first one or more evaluating processes to begin executing said next set of instructions.

30. The system according to claim 28, wherein said first control process is capable of deploying a second one of said first one or more logic processes with a next set of instructions, wherein said second one of said first one or more logic processes is capable of causing a second one of said first one or more evaluating processes to begin executing said next set of instructions.

31. The system according to claim 29, wherein said second one of said first one or more logic processes can replace said first one of said first one or more logic processes without loss of information.

32. The system according to claim 30, wherein said second one of said first one or more logic processes can replace said first one of said first one or more logic processes without loss of information.

33. A system comprising:
a first networked node comprising: a first computer, a first data store, a first control process, a first one or more logic processes, a first one or more evaluating processes, and a first communication system, said first control process having a capability to deploy said first one or more logic processes, and said first one or more logic processes each having a capability to cause said first one or more evaluating processes to begin, said first data store, said first control process, said first one or more logic processes, said first evaluating process, and said first communication system operating on said first computer, and a second networked node comprising: a second computer, a second data store, a second control process, a second one or more logic processes, a second one or more evaluating processes, and a second communication system, said second control process having a capability to deploy said second one or more logic processes, and said second one or more logic processes each having a capability to cause said second one or more evaluating processes to begin, said second data store, said second control process, said second one or more logic processes, said second one or more evaluating processes, and said second communication system operating on said second computer, and wherein said first data store provides access to a global address space and said second data store provides access to said global address space, wherein data is available in said global address space, wherein said first networked node and said second networked node are networked together, wherein said first control process receives one or more control messages from a deployer, wherein said deployer is external to said first networked node and is external to said second networked node, wherein said one or more control messages may contain code, and wherein said first control process has the capability to deploy said code as said first one or more logic processes in response to said one or more control messages and to deactivate said first one or more logic processes in response to said one or more control messages, wherein said first communication system and said second communication system communicate via said global address space, wherein said first one or more logic processes is capable of retrieving said data from said global address space via said first communication system and wherein said second one or more logic processes is capable of retrieving said data from said global address space via said second communication system, wherein said first control process is capable of deploying a first one of said first one or more logic processes with a first set of instructions, and wherein said first one of said first one or more logic processes is capable of causing a first one of said first one or more evaluating processes to begin executing said first set of instructions, wherein said first one of said first one or more evaluating processes is capable of evaluating said data to synthesize a first result using said first set of instructions, wherein said first one of said first one or more evaluating processes is capable of storing said first result as said data in said global address space via said first communication system, wherein said first one of said first one or more logic processes is capable of causing a second one of said first one or more evaluating processes to begin executing said first set of instructions.

34. The system according to claim 33, wherein said first data store and said second data store operate as key-value stores.

35. The system according to claim 34, wherein said global address space operates as a key-value store.

36. The system according to claim 33,
wherein said first one or more logic processes is capable of retrieving said data from said global address space via said first communication system,
wherein said second one or more logic processes is capable of retrieving said data from said global address space via said second communication system,
wherein said first one or more logic processes is capable of altering said data in said global address space via said first communication system,
wherein said second one or more logic processes is capable of altering said data in said global address space via said second communication system, and
wherein said first communication system and said second communication system are publish-subscribe communication systems.

37. The system according to claim 33, wherein said first data store contains a first local copy of said data available in said global address space and said second data store contains a second local copy of said data available in said global address space.

38. The system according to claim 37, wherein when first information of said data available in said global address space is altered in said first data store, said second local copy of said data available in said global address space in said second data store is updated correspondingly with altered said first information.

39. The system according to claim 38, further comprising a plurality of additional networked nodes, each additional networked node comprising an additional computer and an additional data store, each of said plurality of additional data stores providing access to said global address space, wherein said first networked node, said second networked node, and said plurality of additional networked nodes are networked together.

40. The system according to claim 39, wherein said plurality of additional data stores each contain an additional local copy of said data available in said global address space.

41. The system according to claim 40, wherein when said first information of said data is altered in said first data store, each of said additional local copies is updated correspondingly with said altered first information.

42. The system according to claim 41, wherein when second information of said data available in said global address space is altered in said second data store, said first local copy and said additional local copy in each of said plurality of additional data stores are updated correspondingly with said altered second information.

43. The system according to claim 42, wherein said first data store, said second data store, and said plurality of additional data stores are configured to cause updates of said first local copy and said additional local copy in each of said plurality of additional data stores to propagate according to a pattern.

44. The system according to claim 43, wherein said pattern is a ring.

45. The system according to claim 43, wherein said pattern is a multiring.

46. The system according to claim 45, wherein said first data store, said second data store, and said plurality of additional data stores, collectively, have a capability to reconfigure said pattern.

47. The system according to claim 46, wherein said reconfiguration capability can be selectively invoked to swap a selected two of said first data store, said second data store, and said plurality of additional data stores.

48. The system according to claim 47, wherein said reconfiguration capability also includes a capability to select said selected two of said first data store, said second data store, and said plurality of additional data stores.

49. The system according to claim 44, wherein said first data store, said second data store, and said plurality of additional data stores each further comprises respectively a testing module, wherein said testing modules have the capability to collectively perform a test of resources available to a set of ringed computers selected from the group comprised of said first computer, said second computer, and said plurality of additional computers, each respective one of said set of computers associated with a respective one of said testing modules, and wherein an initiating one of said testing modules in said set of ringed computers has the capability to initiate said test for testing in other ringed computers in said set of ringed computers and to calculate a result based on said test.

50. The system according to claim 45, wherein said first data store, said second data store, and said plurality of additional data stores each further comprises respectively a testing module, wherein said testing modules have the capability to collectively perform a test of resources available to a set of ringed computers selected from the group comprised of said first computer, said second computer, and said plurality of additional computers, each respective one of said set of computers associated with a respective one of said testing modules, and wherein an initiating one of said testing modules in said set of ringed computers has the capability to initiate said test for testing in other ringed computers in said set of ringed computers and to calculate a result based on said test.

51. The system according to claim 33, wherein said second one of said first one or more evaluating processes is capable of evaluating said data to synthesize a next result using said first set of instructions.

52. The system according to claim 51, wherein said second one of said first one or more evaluating processes is capable of storing said next result as said data in said global address space via said first communication system.

53. The system according to claim 33, wherein said second control process is capable of deploying a first one of said second one or more logic processes with a second set of instructions, and wherein said first one of said second one or more logic processes is capable of causing a first one of said second one or more evaluating processes to begin executing said second set of instructions.

54. The system according to claim 53, wherein said first one of said second one or more evaluating processes is capable of evaluating said data to synthesize a second result using said second set of instructions.

55. The system according to claim 54, wherein said first one of said second one or more evaluating processes is capable of storing said second result as said data in said global address space via said second communication system.

56. The system according to claim 33, wherein said first control process has a capability to deactivate said first one or more logic processes.

57. The system according to claim 55, wherein said first control process has a capability to deactivate said first one or more logic processes.

58. The system according to claim 56, wherein said first control process is capable of deploying a second one of said first one or more logic processes with a next set of instructions, wherein said second one of said first one or more logic processes is capable of causing a second one of said first one or more evaluating processes to begin executing said next set of instructions.

59. The system according to claim 57, wherein said first control process is capable of deploying a second one of said first one or more logic processes with a next set of instructions, wherein said second one of said first one or more logic processes is capable of causing a second one of said first one or more evaluating processes to begin executing said next set of instructions.

60. The system according to claim 58, wherein said second one of said first one or more logic processes can replace said first one of said first one or more logic processes without loss of information.

61. The system according to claim 59, wherein said second one of said first one or more logic processes can replace said first one of said first one or more logic processes without loss of information.

62. The system according to claim 33, wherein said deployer sends said one or more control messages to said first control process via said global address space.

63. The system according to claim 33, wherein said code is compiled code.

64. The system according to claim 63, wherein said compiled code is java bytecode.

65. The system according to claim 33, wherein said code is uncompiled source code.

66. The system according to claim 33, wherein said first control process is capable of deploying a second one of said first one or more logic processes with a next set of instructions, wherein said second one of said first one or more logic processes is capable of causing a second one of said first one or more evaluating processes to begin executing said next set of instructions.

67. The system according to claim 66, wherein said second one of said first one or more logic processes can replace said first one of said first one or more logic processes without loss of information.

68. The system according to claim 1, further comprising a plurality of additional networked nodes, each additional networked node comprising an additional computer and an additional data store, each of said plurality of additional data stores providing access to said global address space, wherein said first networked node, said second networked node, and said plurality of additional networked nodes are networked together.

69. The system according to claim 68, wherein when altered data is input into said data in any one of said first data store, said second data store, and said plurality of additional data stores, then said altered data is transmitted according to a pattern to all other of said first data store, said second data store, and said plurality of additional data stores.

70. The system according to claim 69, wherein said first data store, said second data store, and said plurality of additional data stores each further comprises respectively a testing module, wherein said testing modules have the capability to collectively perform a test of resources available to a set of ringed computers selected from the group comprised of said first computer, said second computer, and said plurality of additional computers, each respective one of said set of computers associated with a respective one of said testing modules, and wherein an initiating one of said testing modules in said set of ringed computers has the capability to initiate said test for testing in other ringed computers in said set of ringed computers and to calculate a result based on said test.

71. The system according to claim 70, wherein each of said first data store, said second data store, and said plurality of additional data stores has a capability to temporarily prevent said transmission of said altered data from occurring.

72. The system according to claim 70, wherein each of said first data store, said second data store, and said plurality of additional data stores has a capability to use said result to determine whether to invoke said capability to temporarily prevent said transmission of said altered data from occurring.

73. The system according to claim 72, wherein said test comprises the steps of:
- (1) initiating said test and recording a current time in said initiating one of said testing modules;
- (2) attempting transmission of one or more initiated test packets to a first one of said testing modules associated with a first other ringed computer;
- (3) repeating, for each additional one of said testing modules of said other ringed computers:
  - (a) receiving a received one or more of said initiated test packets by a current one of said testing modules of said other ringed computers;
  - (b) measuring, for each received test packet, availability of resources to a current one of said other ringed computers associated with said current testing module;
  - (c) recording, in each of said received test packets, a resource measurement representing said availability of resources; and
  - (d) attempting transmission of each received test packet to a next one of said testing modules of said other ringed computers according to said pattern;
- (4) receiving, by said initiating one of said testing modules, a set of returned test packets of said one or more initiated test packets;
- (5) measuring, for each of said returned test packets, an amount of time representing time elapsed after initiation of said test; and
- (6) calculating said result using said amount of time associated with each of said returned test packets and using each of said resource measurements associated with each of said returned test packets.

74. The system according to claim 73, wherein said first data store, said second data store, and said plurality of additional data stores each further comprising a learning module, wherein each of said learning modules has a capability to learn from said tests.

75. The system according to claim 74, wherein each of said learning modules has a capability to make predictions about resource utilization.

76. The system according to claim 75, wherein said first data store, said second data store, and said plurality of additional data stores have a capability to use said predictions in determining whether to temporarily prevent communications from being initiated.

77. The system according to claim 76, wherein said learning module learns using an algorithm suitable for a high-dimensional setting.

78. The system according to claim 77, wherein said algorithm is Vapnik's Support Vector Machine algorithm.

* * * * *